(12) United States Patent
Chan-Bauza et al.

(10) Patent No.: US 11,144,928 B2
(45) Date of Patent: *Oct. 12, 2021

(54) AUTHENTICATION AND FRAUD PREVENTION IN PROVISIONING A MOBILE WALLET

(71) Applicant: Early Warning Services, LLC, Scottsdale, AZ (US)

(72) Inventors: Betty Chan-Bauza, Scottsdale, AZ (US); James R. Mortensen, Chandler, AZ (US); Aaron Bartrim, Scottsdale, AZ (US); Eric Woodward, New York, NY (US); Hal Granoff, Scottsdale, AZ (US); Mark Pender, Rockville Center, NY (US); Ryan Riveland, Elkhorn, NE (US)

(73) Assignee: EARLY WARNING SERVICES, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/709,156

(22) Filed: Sep. 19, 2017

(65) Prior Publication Data
US 2018/0082302 A1    Mar. 22, 2018

Related U.S. Application Data

(60) Provisional application No. 62/396,684, filed on Sep. 19, 2016.

(51) Int. Cl.
*G06Q 20/00* (2012.01)
*G06Q 20/40* (2012.01)
(Continued)

(52) U.S. Cl.
CPC ....... *G06Q 20/4016* (2013.01); *G06Q 20/322* (2013.01); *G06Q 20/36* (2013.01); *G06Q 20/3821* (2013.01); *G06Q 10/067* (2013.01)

(58) Field of Classification Search
None
See application file for complete search history.

(56) References Cited

U.S. PATENT DOCUMENTS 2,011,032 A  8/1935  Blanchard
5,229,764 A  7/1993  Matchett et al.
(Continued)

FOREIGN PATENT DOCUMENTS

AU  4034997   3/1998
AU  1757201   5/2001
(Continued)

OTHER PUBLICATIONS

P. Garner, R. Edwards and P. Coulton, "Card-based Macropayment for Mobile Phones," 2006 International Conference on Mobile Business, 2006, pp. 4-4, (Macropayments). (Year: 2006).*
(Continued)

*Primary Examiner* — Chikaodinaka Ojiaku
(74) *Attorney, Agent, or Firm* — Bryan Cave Leighton Paisner LLP

(57) ABSTRACT

A method including receiving a request from a mobile wallet operating on a mobile device to perform a provisioning of an account to the mobile wallet. The method also can include generating account information about the account. The method additionally can include generating device information about the mobile device. The method further can include sending an inquiry to a risk determination system to authenticate the provisioning of the account to the mobile wallet. The risk determination system can generate a fraud risk level by applying business rules and one or more statistical modeling techniques. The method additionally can include receiving from the risk determination system a first response based on the fraud risk level. The method further can include determining whether to proceed with the provisioning of the account to the mobile wallet or to perform
(Continued)

an additional verification based at least in part on the first response received from the risk determination system. The method additionally can include sending a second response to the mobile wallet in response to the request to perform the provisioning of the account to the mobile wallet. Other embodiments are provided.

20 Claims, 11 Drawing Sheets

(51) Int. Cl.
  *G06Q 20/32* (2012.01)
  *G06Q 20/36* (2012.01)
  *G06Q 20/38* (2012.01)
  *G06Q 10/06* (2012.01)

(56) References Cited

U.S. PATENT DOCUMENTS

| | | |
|---|---|---|
| 5,265,007 A | 11/1993 | Barnhard, Jr. et al. |
| 5,282,249 A | 1/1994 | Cohen et al. |
| 5,283,829 A | 2/1994 | Anderson |
| 5,329,589 A | 7/1994 | Fraser et al. |
| 5,383,113 A | 1/1995 | Kight et al. |
| 5,453,601 A | 9/1995 | Rosen |
| 5,455,407 A | 10/1995 | Rosen |
| 5,465,206 A | 11/1995 | Hilt et al. |
| 5,481,609 A | 1/1996 | Cohen et al. |
| 5,619,657 A | 4/1997 | Sudama et al. |
| 5,642,419 A | 6/1997 | Rosen |
| 5,649,117 A | 7/1997 | Landry |
| 5,652,786 A | 7/1997 | Rogers |
| 5,671,280 A | 9/1997 | Rosen |
| 5,677,955 A | 10/1997 | Doggett et al. |
| 5,699,528 A | 12/1997 | Hogan |
| 5,703,344 A | 12/1997 | Bezy et al. |
| 5,729,594 A | 3/1998 | Klingman |
| 5,745,886 A | 4/1998 | Rosen |
| 5,781,723 A | 7/1998 | Yee et al. |
| 5,790,677 A | 8/1998 | Fox et al. |
| 5,826,241 A | 10/1998 | Stein et al. |
| 5,832,460 A | 11/1998 | Bednar et al. |
| 5,848,161 A | 12/1998 | Luneau et al. |
| 5,848,400 A | 12/1998 | Chang |
| 5,870,473 A | 2/1999 | Boesch et al. |
| 5,873,072 A | 2/1999 | Kight et al. |
| 5,878,141 A | 3/1999 | Daly et al. |
| 5,884,288 A | 3/1999 | Chang et al. |
| 5,884,289 A | 3/1999 | Anderson et al. |
| 5,889,863 A | 3/1999 | Weber |
| 5,892,900 A | 4/1999 | Ginter et al. |
| 5,903,721 A | 5/1999 | Sixtus |
| 5,913,203 A | 6/1999 | Wong et al. |
| 5,915,023 A | 6/1999 | Bernstein |
| 5,920,847 A | 7/1999 | Kolling et al. |
| 5,920,848 A | 7/1999 | Schutzer et al. |
| 5,946,669 A | 8/1999 | Polk |
| 5,956,700 A | 9/1999 | Landry |
| 5,970,475 A | 10/1999 | Barnes et al. |
| 5,978,840 A | 11/1999 | Nguyen et al. |
| 5,983,208 A | 11/1999 | Haller et al. |
| 5,987,132 A | 11/1999 | Rowney |
| 5,987,140 A | 11/1999 | Rowney et al. |
| 5,996,076 A | 11/1999 | Rowney et al. |
| 5,999,625 A | 12/1999 | Bellare et al. |
| 6,002,767 A | 12/1999 | Kramer |
| 6,016,484 A | 1/2000 | Williams et al. |
| 6,029,150 A | 2/2000 | Kravitz |
| 6,032,133 A | 2/2000 | Hilt et al. |
| 6,035,285 A | 3/2000 | Schlect et al. |
| 6,039,250 A | 3/2000 | Ito et al. |
| 6,044,362 A | 3/2000 | Neely |
| 6,049,786 A | 4/2000 | Smorodinsky |
| 6,058,380 A | 5/2000 | Anderson et al. |
| 6,061,665 A | 5/2000 | Bahreman |
| 6,070,150 A | 5/2000 | Remington et al. |
| 6,072,870 A | 6/2000 | Nguyen et al. |
| 6,078,907 A | 6/2000 | Lamm |
| 6,081,790 A | 6/2000 | Rosen |
| 6,085,168 A | 7/2000 | Mori et al. |
| 6,094,643 A | 7/2000 | Anderson et al. |
| 6,112,181 A | 8/2000 | Shear et al. |
| 6,119,101 A | 9/2000 | Peckover |
| 6,119,106 A | 9/2000 | Mersky et al. |
| 6,119,107 A | 9/2000 | Polk |
| 6,125,352 A | 9/2000 | Franklin et al. |
| 6,128,603 A | 10/2000 | Dent et al. |
| 6,130,937 A | 10/2000 | Fotta |
| 6,138,107 A | 10/2000 | Elgamal |
| 6,145,738 A | 11/2000 | Stinson et al. |
| 6,167,378 A | 12/2000 | Webber, Jr. |
| 6,173,272 B1 | 1/2001 | Thomas et al. |
| 6,236,981 B1 | 5/2001 | Hill |
| 6,246,996 B1 | 6/2001 | Stein et al. |
| 6,260,024 B1 | 7/2001 | Shkedy |
| 6,285,991 B1 | 9/2001 | Powar |
| 6,289,322 B1 | 9/2001 | Kitchen et al. |
| 6,292,211 B1 | 9/2001 | Pena |
| 6,292,789 B1 | 9/2001 | Schutzer |
| 6,304,857 B1 | 10/2001 | Heindel et al. |
| 6,304,860 B1 | 10/2001 | Martin, Jr. et al. |
| 6,311,170 B1 | 10/2001 | Embrey |
| 6,317,745 B1 | 11/2001 | Thomas et al. |
| 6,334,116 B1 | 12/2001 | Ganesan et al. |
| 6,381,582 B1 | 4/2002 | Walker et al. |
| 6,385,595 B1 | 5/2002 | Kolling |
| 6,411,942 B1 | 6/2002 | Fujimoto |
| 6,438,527 B1 | 8/2002 | Powar |
| 6,446,051 B1 | 9/2002 | Gupta |
| 6,488,203 B1 | 12/2002 | Stoutenburg et al. |
| 6,502,747 B1 | 1/2003 | Stoutenburg et al. |
| 6,578,015 B1 | 6/2003 | Haseltine et al. |
| 6,584,467 B1 | 6/2003 | Haught et al. |
| 6,587,550 B2 | 7/2003 | Council et al. |
| 6,594,647 B1 | 7/2003 | Randle et al. |
| 6,609,114 B1 | 8/2003 | Gressel et al. |
| 6,647,376 B1 | 11/2003 | Farrar et al. |
| 6,678,664 B1 | 1/2004 | Ganesan |
| 6,783,065 B2 | 8/2004 | Spitz et al. |
| 6,839,687 B1 | 1/2005 | Dent et al. |
| 6,847,708 B1 | 1/2005 | Abbasi et al. |
| 6,868,391 B1 | 3/2005 | Hultgren |
| 6,882,986 B1 | 4/2005 | Heinemann et al. |
| 6,891,953 B1 | 5/2005 | DeMello et al. |
| 6,968,319 B1 | 11/2005 | Remington et al. |
| 6,996,542 B1 | 2/2006 | Landry |
| 7,003,480 B2 | 2/2006 | Fox et al. |
| 7,004,382 B2 | 2/2006 | Sandru |
| 7,010,512 B1 | 3/2006 | Gillin et al. |
| 7,031,939 B1 | 4/2006 | Gallagher et al. |
| 7,035,821 B1 | 4/2006 | Smith, II et al. |
| 7,039,951 B1 | 5/2006 | Chaudhari et al. |
| 7,051,001 B1 | 5/2006 | Slater |
| 7,089,208 B1 | 8/2006 | Levchin et al. |
| 7,098,783 B2 | 8/2006 | Crichlow |
| 7,103,261 B2 | 9/2006 | Grecia |
| 7,120,606 B1 | 10/2006 | Ranzini et al. |
| 7,120,608 B1 | 10/2006 | Gallagher et al. |
| 7,133,835 B1 | 11/2006 | Fusz et al. |
| 7,184,980 B2 | 2/2007 | Allen-Rouman et al. |
| 7,191,151 B1 | 3/2007 | Nosek |
| 7,200,551 B1 | 4/2007 | Senez |
| 7,206,938 B2 | 4/2007 | Bender et al. |
| 7,227,950 B2 | 6/2007 | Faith et al. |
| 7,240,031 B1 | 7/2007 | Kight et al. |
| 7,249,098 B2 | 7/2007 | Milberger et al. |
| 7,254,235 B2 | 8/2007 | Boudreault et al. |
| 7,263,506 B2 | 8/2007 | Lee et al. |
| 7,287,009 B1 | 10/2007 | Liebermann |
| 7,296,004 B1 | 11/2007 | Garrison et al. |
| 7,302,411 B2 | 11/2007 | Ganesan et al. |
| 7,319,855 B1 | 1/2008 | Brune et al. |

(56) References Cited

U.S. PATENT DOCUMENTS

| | | | |
|---|---|---|---|
| 7,321,874 | B2 | 1/2008 | Dilip et al. |
| 7,321,875 | B2 | 1/2008 | Dilip et al. |
| 7,333,953 | B1 | 2/2008 | Banaugh et al. |
| 7,343,014 | B2 | 3/2008 | Sovio et al. |
| 7,349,871 | B2 | 3/2008 | Labrou et al. |
| 7,353,203 | B1 | 4/2008 | Kriplani et al. |
| 7,366,695 | B1 | 4/2008 | Allen-Rouman et al. |
| 7,370,014 | B1 | 5/2008 | Vasavada et al. |
| 7,376,587 | B1 | 5/2008 | Neofytides et al. |
| 7,383,223 | B1 | 6/2008 | Dilip et al. |
| 7,383,226 | B2 | 6/2008 | Kight et al. |
| 7,389,917 | B2 | 6/2008 | Abraham et al. |
| 7,392,223 | B1 | 6/2008 | Ganesan et al. |
| 7,395,241 | B1 | 7/2008 | Cook et al. |
| 7,398,252 | B2 | 7/2008 | Neofytides et al. |
| 7,403,922 | B1 | 7/2008 | Lewis et al. |
| 7,426,492 | B1 | 9/2008 | Bishop et al. |
| 7,450,010 | B1 | 11/2008 | Gravelle et al. |
| 7,451,114 | B1 | 11/2008 | Matsuda et al. |
| 7,475,039 | B2 | 1/2009 | Remington et al. |
| 7,475,808 | B1 | 1/2009 | Bishop et al. |
| 7,478,066 | B2 | 1/2009 | Remington et al. |
| 7,499,887 | B2 * | 3/2009 | Boyle ............... G06Q 20/02 705/40 |
| 7,505,937 | B2 | 3/2009 | Dilip et al. |
| 7,519,560 | B2 | 4/2009 | Lam et al. |
| 7,526,650 | B1 | 4/2009 | Wimmer |
| 7,532,122 | B2 | 5/2009 | Aull et al. |
| 7,536,722 | B1 | 5/2009 | Saltz et al. |
| 7,596,701 | B2 | 9/2009 | Varghese et al. |
| 7,603,311 | B1 | 10/2009 | Yadav-Ranjan |
| 7,606,734 | B2 | 10/2009 | Baig et al. |
| 7,606,787 | B2 | 10/2009 | Keown et al. |
| 7,610,245 | B2 | 10/2009 | Dent et al. |
| 7,613,653 | B2 | 11/2009 | Milberger et al. |
| 7,620,602 | B2 | 11/2009 | Jakstadt et al. |
| 7,644,037 | B1 | 1/2010 | Ostrovsky |
| 7,653,591 | B1 | 1/2010 | Dabney |
| 7,657,497 | B2 | 2/2010 | Nandy |
| 7,677,438 | B2 | 3/2010 | DeJean et al. |
| 7,685,067 | B1 | 3/2010 | Britto et al. |
| 7,689,482 | B2 | 3/2010 | Lam et al. |
| 7,693,791 | B2 | 4/2010 | Hahn-Carlson et al. |
| 7,702,579 | B2 | 4/2010 | Neely et al. |
| 7,707,082 | B1 | 4/2010 | Lapstun et al. |
| 7,707,107 | B2 | 4/2010 | Gebb et al. |
| 7,711,690 | B1 | 5/2010 | Garrison et al. |
| 7,716,127 | B2 | 5/2010 | Gebb et al. |
| 7,716,132 | B1 | 5/2010 | Spies et al. |
| 7,720,754 | B1 | 5/2010 | Gutierrez-Sheris |
| 7,720,756 | B2 | 5/2010 | Kavounas |
| 7,734,543 | B2 | 6/2010 | Braco |
| 7,752,130 | B2 | 7/2010 | Byrd et al. |
| 7,756,785 | B2 | 7/2010 | Gebb et al. |
| 7,756,786 | B2 | 7/2010 | Trende et al. |
| 7,765,156 | B2 | 7/2010 | Staniar et al. |
| 7,769,687 | B2 | 8/2010 | Gebb et al. |
| 7,769,998 | B2 | 8/2010 | Lynch et al. |
| 7,774,271 | B1 | 8/2010 | Edwards et al. |
| 7,778,901 | B2 | 8/2010 | Ganesan et al. |
| 7,783,567 | B1 | 8/2010 | Kleiman et al. |
| 7,792,749 | B2 | 9/2010 | Ganesan |
| 7,809,650 | B2 | 10/2010 | Bruesewitz et al. |
| 7,840,520 | B2 | 11/2010 | Nandy |
| 7,848,972 | B1 | 12/2010 | Sharma |
| 7,856,384 | B1 | 12/2010 | Kulasooriya et al. |
| 7,870,070 | B2 | 1/2011 | Meier et al. |
| 7,873,573 | B2 | 1/2011 | Realini |
| 7,877,325 | B2 | 1/2011 | Bishop et al. |
| 7,885,869 | B2 | 2/2011 | Uehara et al. |
| 7,899,744 | B2 | 3/2011 | Bishop et al. |
| 7,904,385 | B2 | 3/2011 | Bishop et al. |
| 7,908,214 | B2 | 3/2011 | Bishop et al. |
| 7,925,585 | B2 | 4/2011 | Bishop et al. |
| 7,937,312 | B1 | 5/2011 | Woolston |
| 7,941,367 | B2 | 5/2011 | Bishop et al. |
| 7,941,372 | B2 | 5/2011 | Bishop et al. |
| 7,942,321 | B2 | 5/2011 | Linton et al. |
| 7,945,491 | B2 | 5/2011 | Sharma |
| 7,953,660 | B2 | 5/2011 | Ganesan et al. |
| 7,958,030 | B2 | 6/2011 | Kemper et al. |
| 7,958,049 | B2 | 6/2011 | Jamison et al. |
| 7,962,406 | B2 | 6/2011 | Bishop et al. |
| 7,962,407 | B2 | 6/2011 | Bishop et al. |
| 7,962,408 | B2 | 6/2011 | Bishop et al. |
| 7,970,706 | B2 | 6/2011 | Keene |
| 7,979,348 | B2 | 7/2011 | Thomas et al. |
| 7,979,349 | B2 | 7/2011 | Bishop et al. |
| 7,996,307 | B2 | 8/2011 | Bishop et al. |
| 7,996,310 | B1 | 8/2011 | Edwards et al. |
| 8,001,612 | B1 | 8/2011 | Wieder |
| 8,020,005 | B2 | 9/2011 | Mani et al. |
| 8,041,606 | B2 | 10/2011 | Mascavage, III et al. |
| 8,050,997 | B1 | 11/2011 | Nosek et al. |
| 8,060,389 | B2 | 11/2011 | Johnson |
| 8,065,233 | B2 | 11/2011 | Lee et al. |
| 8,069,115 | B2 | 11/2011 | Schoenberg et al. |
| 8,073,772 | B2 | 12/2011 | Bishop et al. |
| 8,073,773 | B2 | 12/2011 | Kozee et al. |
| 8,086,497 | B1 | 12/2011 | Oakes, III |
| 8,103,584 | B2 | 1/2012 | Bishop et al. |
| 8,103,585 | B2 | 1/2012 | Bishop et al. |
| 8,112,354 | B2 | 2/2012 | Lalwani |
| 8,121,894 | B2 | 2/2012 | Mason |
| 8,121,945 | B2 | 2/2012 | Rackley et al. |
| 8,123,124 | B2 | 2/2012 | Salazar et al. |
| 8,126,793 | B2 | 2/2012 | Jones |
| 8,165,934 | B2 | 4/2012 | Manista et al. |
| 8,165,958 | B1 | 4/2012 | McLaughlin et al. |
| 8,180,706 | B2 | 5/2012 | Bishop et al. |
| 8,190,514 | B2 | 5/2012 | Bishop et al. |
| 8,195,565 | B2 | 6/2012 | Bishop et al. |
| 8,229,850 | B2 | 7/2012 | Dilip et al. |
| 8,234,212 | B2 | 7/2012 | Bishop et al. |
| 8,244,609 | B2 | 8/2012 | Prakash et al. |
| 8,249,965 | B2 | 8/2012 | Tumminaro |
| 8,249,983 | B2 | 8/2012 | Dilip et al. |
| 8,255,278 | B1 | 8/2012 | Young et al. |
| 8,255,327 | B2 | 8/2012 | Kemper et al. |
| 8,255,336 | B2 | 8/2012 | Dilip et al. |
| 8,256,666 | B2 * | 9/2012 | Dixon ............... G06Q 20/382 235/380 |
| 8,266,028 | B2 | 9/2012 | Bulman et al. |
| 8,266,065 | B2 | 9/2012 | Dilip et al. |
| 8,275,704 | B2 | 9/2012 | Bishop et al. |
| 8,290,835 | B2 | 10/2012 | Homer et al. |
| 8,290,862 | B2 | 10/2012 | Sheehan et al. |
| 8,290,863 | B2 | 10/2012 | Sheehan et al. |
| 8,311,913 | B2 | 11/2012 | Marchetti et al. |
| 8,311,914 | B2 | 11/2012 | Marchetti et al. |
| 8,311,937 | B2 | 11/2012 | Marchetti et al. |
| 8,311,942 | B1 | 11/2012 | Mason |
| 8,321,341 | B2 | 11/2012 | Nandy |
| 8,310,346 | B2 | 12/2012 | Burbridge et al. |
| 8,341,046 | B2 | 12/2012 | Marchetti et al. |
| 8,342,407 | B2 | 1/2013 | Williams et al. |
| 8,352,365 | B1 | 1/2013 | Goldberg et al. |
| 8,370,639 | B2 | 2/2013 | Azar et al. |
| 8,374,932 | B2 | 2/2013 | Marchetti et al. |
| 8,380,177 | B2 | 2/2013 | Laracey |
| 8,380,591 | B1 | 2/2013 | Kazenas et al. |
| 8,380,622 | B2 | 2/2013 | Bushman et al. |
| 8,401,939 | B2 | 3/2013 | Lam et al. |
| 8,402,555 | B2 | 3/2013 | Grecia |
| 8,407,082 | B2 * | 3/2013 | Dixon ............... G06Q 20/4016 705/13 |
| 8,407,124 | B2 | 3/2013 | Uehara et al. |
| 8,407,141 | B2 | 3/2013 | Mullen et al. |
| 8,412,640 | B2 * | 4/2013 | Dixon ............... G06Q 20/085 705/76 |
| 8,417,628 | B2 | 4/2013 | Poplawski et al. |
| 8,423,460 | B2 | 4/2013 | Kay et al. |
| 8,433,629 | B2 | 4/2013 | Murtaugh et al. |

(56) References Cited

U.S. PATENT DOCUMENTS

| | | | |
|---|---|---|---|
| 8,448,852 B2 * | 5/2013 | Dixon | G06Q 20/04 |
| | | | 235/380 |
| 8,458,086 B2 | 6/2013 | Bishop et al. | |
| 8,458,774 B2 | 6/2013 | Ganesan | |
| 8,467,766 B2 | 6/2013 | Rackley et al. | |
| 8,484,104 B1 | 7/2013 | Hurlbutt et al. | |
| 8,498,914 B2 | 7/2013 | Hazelhurst | |
| 8,521,657 B2 | 8/2013 | Kuebert et al. | |
| 8,527,413 B2 | 9/2013 | Heller | |
| 8,532,021 B2 | 9/2013 | Tumminaro | |
| 8,533,079 B2 | 9/2013 | Sharma | |
| 8,533,860 B1 | 9/2013 | Grecia | |
| 8,549,601 B2 | 10/2013 | Ganesan | |
| 8,560,417 B2 | 10/2013 | Mullen et al. | |
| 8,596,527 B2 | 12/2013 | Bishop et al. | |
| 8,600,872 B1 | 12/2013 | Yan | |
| 8,606,640 B2 | 12/2013 | Brody et al. | |
| 8,615,457 B2 | 12/2013 | Mullen et al. | |
| 8,634,559 B2 | 1/2014 | Brown et al. | |
| 8,646,685 B2 | 2/2014 | Bishop et al. | |
| 8,666,865 B2 | 3/2014 | Mullen et al. | |
| 8,706,641 B2 | 4/2014 | Bruesewitz et al. | |
| 8,713,325 B2 | 4/2014 | Ganesan | |
| 8,719,905 B2 | 5/2014 | Ganesan | |
| 8,738,526 B2 | 5/2014 | Nosek et al. | |
| 8,745,699 B2 | 6/2014 | Ganesan | |
| 8,746,556 B2 * | 6/2014 | Dixon | G06Q 20/3821 |
| | | | 235/380 |
| 8,751,347 B2 | 6/2014 | Mullen et al. | |
| 8,768,838 B1 | 7/2014 | Hoffman | |
| 8,769,784 B2 | 7/2014 | Ganesan et al. | |
| 8,775,306 B2 | 7/2014 | Nosek et al. | |
| 8,789,153 B2 | 7/2014 | Ganesan | |
| 8,794,509 B2 | 8/2014 | Bishop et al. | |
| 8,806,592 B2 | 8/2014 | Ganesan | |
| 8,814,039 B2 | 8/2014 | Bishop et al. | |
| 8,820,633 B2 | 9/2014 | Bishop et al. | |
| 8,887,247 B2 | 11/2014 | Ganesan | |
| 8,887,308 B2 | 11/2014 | Grecia | |
| 8,893,237 B2 | 11/2014 | Ganesan | |
| 8,938,787 B2 | 1/2015 | Turgeman | |
| 8,973,818 B2 * | 3/2015 | Dixon | G06Q 20/20 |
| | | | 235/380 |
| 9,230,066 B1 | 1/2016 | Bailey et al. | |
| 9,256,875 B2 * | 2/2016 | Dixon | G06Q 20/32 |
| 9,311,643 B2 * | 4/2016 | Dixon | G06Q 20/20 |
| 9,392,008 B1 * | 7/2016 | Michel | H04L 63/1416 |
| D769,296 S | 10/2016 | Grecia | |
| 9,626,664 B2 | 4/2017 | Bouey et al. | |
| 9,691,056 B2 | 6/2017 | Bouey et al. | |
| 9,747,598 B2 | 8/2017 | Mogollon et al. | |
| 9,898,739 B2 | 2/2018 | Monastyrsky et al. | |
| 10,015,670 B2 | 7/2018 | Woodward et al. | |
| D826,955 S | 8/2018 | Grecia | |
| 10,049,349 B1 * | 8/2018 | Grassadonia | G06Q 20/40 |
| 10,055,735 B2 * | 8/2018 | Dixon | G06Q 20/0855 |
| D857,054 S | 8/2019 | Grecia | |
| D857,712 S | 8/2019 | Grecia | |
| 2002/0023054 A1 | 2/2002 | Gillespie | |
| 2002/0029193 A1 | 3/2002 | Ranjan et al. | |
| 2002/0052852 A1 | 5/2002 | Bozeman | |
| 2002/0091635 A1 | 7/2002 | Dilip et al. | |
| 2002/0128932 A1 | 9/2002 | Yung et al. | |
| 2002/0143634 A1 | 10/2002 | Kumar et al. | |
| 2002/0194119 A1 * | 12/2002 | Wright | G06Q 30/0609 |
| | | | 705/38 |
| 2002/0194503 A1 | 12/2002 | Faith et al. | |
| 2003/0014316 A1 | 1/2003 | Jaalinoja et al. | |
| 2003/0097331 A1 | 5/2003 | Cohen | |
| 2003/0115151 A1 | 6/2003 | Wheeler et al. | |
| 2003/0126094 A1 | 7/2003 | Fisher et al. | |
| 2003/0130919 A1 | 7/2003 | Templeton et al. | |
| 2003/0138084 A1 | 7/2003 | Lynam et al. | |
| 2003/0165328 A1 | 9/2003 | Grecia | |
| 2003/0220875 A1 | 11/2003 | Lam et al. | |
| 2003/0220876 A1 | 11/2003 | Burger et al. |
| 2003/0236728 A1 | 12/2003 | Sunderji et al. |
| 2004/0006532 A1 | 1/2004 | Lawrence et al. |
| 2004/0034594 A1 | 2/2004 | Thomas et al. |
| 2004/0089711 A1 | 5/2004 | Sandru |
| 2004/0158522 A1 | 8/2004 | Brown et al. |
| 2004/0193522 A1 | 9/2004 | Binet et al. |
| 2004/0230489 A1 | 11/2004 | Goldthwaite et al. |
| 2004/0259626 A1 | 12/2004 | Akram et al. |
| 2005/0008148 A1 | 1/2005 | Jacobson |
| 2005/0010523 A1 | 1/2005 | Myklebust et al. |
| 2005/0010786 A1 | 1/2005 | Michener et al. |
| 2005/0021476 A1 | 1/2005 | Candella et al. |
| 2005/0065891 A1 | 3/2005 | Lee et al. |
| 2005/0069135 A1 | 3/2005 | Brickell |
| 2005/0071283 A1 | 3/2005 | Randle et al. |
| 2005/0080716 A1 | 4/2005 | Belyi et al. |
| 2005/0108102 A1 | 5/2005 | York |
| 2005/0108151 A1 | 5/2005 | York |
| 2005/0108178 A1 | 5/2005 | York |
| 2005/0125347 A1 | 6/2005 | Akialis et al. |
| 2005/0137948 A1 | 6/2005 | Kissner et al. |
| 2005/0144452 A1 | 6/2005 | Lynch et al. |
| 2005/0149455 A1 | 7/2005 | Bruesewitz et al. |
| 2005/0187873 A1 | 8/2005 | Labrou |
| 2005/0203959 A1 | 9/2005 | Muller et al. |
| 2005/0246292 A1 | 11/2005 | Sarcanin |
| 2005/0273842 A1 | 12/2005 | Wright et al. |
| 2005/0274793 A1 | 12/2005 | Cantini et al. |
| 2005/0279827 A1 | 12/2005 | Mascavage et al. |
| 2005/0289061 A1 | 12/2005 | Kulakowski |
| 2006/0000892 A1 | 1/2006 | Bonalle |
| 2006/0014532 A1 | 1/2006 | Seligmann |
| 2006/0022048 A1 | 2/2006 | Johnson |
| 2006/0080727 A1 | 4/2006 | Hammons et al. |
| 2006/0085357 A1 | 4/2006 | Pizarro |
| 2006/0106717 A1 | 5/2006 | Randle et al. |
| 2006/0116949 A1 | 6/2006 | Wehunt et al. |
| 2006/0149632 A1 | 7/2006 | Bhatti et al. |
| 2006/0149635 A1 | 7/2006 | Bhatti et al. |
| 2006/0161772 A1 | 7/2006 | Talstra et al. |
| 2006/0165060 A1 | 7/2006 | Dua |
| 2006/0212401 A1 | 9/2006 | Ameerally et al. |
| 2006/0224470 A1 | 10/2006 | Ruano et al. |
| 2006/0258397 A1 | 11/2006 | Kaplan et al. |
| 2006/0280339 A1 | 12/2006 | Cho |
| 2006/0287004 A1 | 12/2006 | Fuqua |
| 2006/0287963 A1 | 12/2006 | Steeves et al. |
| 2007/0046456 A1 | 3/2007 | Edwards et al. |
| 2007/0061590 A1 | 3/2007 | Boye et al. |
| 2007/0106892 A1 | 5/2007 | Engberg |
| 2007/0108269 A1 | 5/2007 | Benco et al. |
| 2007/0136167 A1 | 6/2007 | Dilip et al. |
| 2007/0136168 A1 | 6/2007 | Dilip et al. |
| 2007/0136169 A1 | 6/2007 | Dilip et al. |
| 2007/0156726 A1 | 7/2007 | Levy |
| 2007/0168281 A1 | 7/2007 | Bishop et al. |
| 2007/0174164 A1 | 7/2007 | Biffle et al. |
| 2007/0174189 A1 | 7/2007 | Bishop et al. |
| 2007/0179885 A1 | 8/2007 | Bird et al. |
| 2007/0198264 A1 | 8/2007 | Chang |
| 2007/0198405 A1 | 8/2007 | Bishop et al. |
| 2007/0198406 A1 | 8/2007 | Bishop et al. |
| 2007/0230371 A1 | 10/2007 | Tumminaro |
| 2007/0233615 A1 | 10/2007 | Tumminaro |
| 2007/0236330 A1 | 10/2007 | Cho et al. |
| 2007/0244811 A1 | 10/2007 | Tumminaro |
| 2007/0255620 A1 | 11/2007 | Tumminaro et al. |
| 2007/0255652 A1 | 11/2007 | Tumminaro et al. |
| 2007/0255653 A1 | 11/2007 | Tumminaro et al. |
| 2007/0255662 A1 | 11/2007 | Tumminaro |
| 2008/0010685 A1 | 1/2008 | Holtzman et al. |
| 2008/0015982 A1 | 1/2008 | Sokolic et al. |
| 2008/0015985 A1 | 1/2008 | Abhari et al. |
| 2008/0015994 A1 | 1/2008 | Bonalle et al. |
| 2008/0032741 A1 | 2/2008 | Tumminaro |
| 2008/0033880 A1 | 2/2008 | Fiebiger et al. |
| 2008/0040171 A1 | 2/2008 | Albers |
| 2008/0046362 A1 | 2/2008 | Easterly |

(56) References Cited

U.S. PATENT DOCUMENTS

| | | |
|---|---|---|
| 2008/0082454 A1 | 4/2008 | Dilip et al. |
| 2008/0082828 A1 | 4/2008 | Jennings et al. |
| 2008/0086403 A1 | 4/2008 | Dilip et al. |
| 2008/0086426 A1 | 4/2008 | Dilip et al. |
| 2008/0091596 A1 | 4/2008 | Labaton |
| 2008/0091606 A1 | 4/2008 | Grecia |
| 2008/0097873 A1 | 4/2008 | Cohen et al. |
| 2008/0097899 A1 | 4/2008 | Jackson et al. |
| 2008/0109392 A1 | 5/2008 | Nandy |
| 2008/0127319 A1* | 5/2008 | Galloway .............. G06F 21/31 726/9 |
| 2008/0140564 A1 | 6/2008 | Tal et al. |
| 2008/0141033 A1 | 6/2008 | Ginter et al. |
| 2008/0147536 A1 | 6/2008 | Breen |
| 2008/0177661 A1 | 7/2008 | Mehra |
| 2008/0179394 A1* | 7/2008 | Dixon ................. G06Q 20/382 235/380 |
| 2008/0179395 A1* | 7/2008 | Dixon ................. G06Q 20/204 235/380 |
| 2008/0183565 A1* | 7/2008 | Dixon ................. G06Q 20/20 705/13 |
| 2008/0183589 A1* | 7/2008 | Dixon ................. G06Q 20/32 705/17 |
| 2008/0183622 A1* | 7/2008 | Dixon ................. G06Q 20/204 705/44 |
| 2008/0189209 A1 | 8/2008 | Loomis et al. |
| 2008/0208737 A1 | 8/2008 | Dilip et al. |
| 2008/0208742 A1* | 8/2008 | Arthur ................. G06Q 20/20 705/41 |
| 2008/0208743 A1 | 8/2008 | Arthur et al. |
| 2008/0210751 A1 | 9/2008 | Kim |
| 2008/0210752 A1 | 9/2008 | March |
| 2008/0222048 A1 | 9/2008 | Higgins et al. |
| 2008/0222199 A1 | 9/2008 | Tiu et al. |
| 2008/0227471 A1 | 9/2008 | Dankar et al. |
| 2008/0238610 A1* | 10/2008 | Rosenberg ......... G06Q 30/0281 340/5.7 |
| 2008/0242274 A1* | 10/2008 | Swanburg ............ G06Q 30/00 455/414.1 |
| 2008/0244271 A1 | 10/2008 | Yu |
| 2008/0244277 A1 | 10/2008 | Orsini et al. |
| 2008/0249936 A1 | 10/2008 | Miller et al. |
| 2008/0255993 A1 | 10/2008 | Blinbaum |
| 2008/0288405 A1 | 11/2008 | John |
| 2008/0294563 A1 | 11/2008 | Boutahar et al. |
| 2008/0306872 A1 | 12/2008 | Felsher |
| 2008/0313264 A1 | 12/2008 | Pestoni |
| 2008/0313714 A1 | 12/2008 | Fetterman et al. |
| 2008/0319887 A1* | 12/2008 | Pizzi ................... G06Q 40/02 705/35 |
| 2009/0006861 A1* | 1/2009 | Bemmel ............... G06F 21/445 713/189 |
| 2009/0006920 A1* | 1/2009 | Munson ............... H04L 1/0017 714/748 |
| 2009/0018909 A1 | 1/2009 | Grecia |
| 2009/0030843 A1 | 1/2009 | Hoffman et al. |
| 2009/0043705 A1 | 2/2009 | Bishop et al. |
| 2009/0048885 A1 | 2/2009 | Bishop et al. |
| 2009/0048886 A1 | 2/2009 | Bishop et al. |
| 2009/0048887 A1 | 2/2009 | Bishop et al. |
| 2009/0048951 A1 | 2/2009 | Bishop et al. |
| 2009/0048952 A1 | 2/2009 | Bishop et al. |
| 2009/0048963 A1 | 2/2009 | Bishop et al. |
| 2009/0048966 A1 | 2/2009 | Bishop et al. |
| 2009/0048968 A1 | 2/2009 | Bishop et al. |
| 2009/0048969 A1 | 2/2009 | Bishop et al. |
| 2009/0048971 A1* | 2/2009 | Hathaway ............ G07F 7/1008 705/41 |
| 2009/0068982 A1* | 3/2009 | Chen .................... H04W 12/03 455/407 |
| 2009/0070272 A1 | 3/2009 | Jain |
| 2009/0076956 A1 | 3/2009 | Bishop et al. |
| 2009/0076957 A1 | 3/2009 | Bishop et al. |
| 2009/0076958 A1 | 3/2009 | Bishop et al. |
| 2009/0083181 A1 | 3/2009 | Bishop et al. |
| 2009/0083541 A1 | 3/2009 | Levine |
| 2009/0089193 A1 | 4/2009 | Paintin |
| 2009/0089205 A1 | 4/2009 | Bayne |
| 2009/0089209 A1 | 4/2009 | Bixler et al. |
| 2009/0099961 A1 | 4/2009 | Ogilvy |
| 2009/0112658 A1 | 4/2009 | Mullen et al. |
| 2009/0112659 A1 | 4/2009 | Mullen et al. |
| 2009/0112660 A1 | 4/2009 | Mullen et al. |
| 2009/0112661 A1 | 4/2009 | Mullen et al. |
| 2009/0112662 A1 | 4/2009 | Mullen et al. |
| 2009/0112747 A1 | 4/2009 | Mullen et al. |
| 2009/0119190 A1 | 5/2009 | Realini |
| 2009/0119207 A1 | 5/2009 | Grecia |
| 2009/0119212 A1 | 5/2009 | Liu et al. |
| 2009/0125323 A1 | 5/2009 | Lakshmanan et al. |
| 2009/0125426 A1 | 5/2009 | Bishop et al. |
| 2009/0132392 A1 | 5/2009 | Davis et al. |
| 2009/0132423 A1 | 5/2009 | Liu |
| 2009/0138388 A1 | 5/2009 | Bishop et al. |
| 2009/0150269 A1 | 6/2009 | Bishop et al. |
| 2009/0150270 A1 | 6/2009 | Bishop et al. |
| 2009/0150271 A1 | 6/2009 | Bishop et al. |
| 2009/0150288 A1 | 6/2009 | Bishop et al. |
| 2009/0157518 A1 | 6/2009 | Bishop et al. |
| 2009/0157519 A1 | 6/2009 | Bishop et al. |
| 2009/0164324 A1 | 6/2009 | Bishop et al. |
| 2009/0164325 A1 | 6/2009 | Bishop et al. |
| 2009/0164326 A1 | 6/2009 | Bishop et al. |
| 2009/0164327 A1 | 6/2009 | Bishop et al. |
| 2009/0164328 A1 | 6/2009 | Bishop et al. |
| 2009/0164329 A1 | 6/2009 | Bishop et al. |
| 2009/0164330 A1 | 6/2009 | Bishop et al. |
| 2009/0164331 A1 | 6/2009 | Bishop et al. |
| 2009/0171682 A1 | 7/2009 | Dixon et al. |
| 2009/0204457 A1 | 8/2009 | Buhrmann et al. |
| 2009/0204815 A1 | 8/2009 | Dennis et al. |
| 2009/0228365 A1 | 9/2009 | Tomchek et al. |
| 2009/0265241 A1 | 10/2009 | Bishop et al. |
| 2009/0265249 A1 | 10/2009 | Bishop et al. |
| 2009/0265250 A1 | 10/2009 | Bishop et al. |
| 2009/0265252 A1 | 10/2009 | Fletcher |
| 2009/0271277 A1 | 10/2009 | Bishop et al. |
| 2009/0271278 A1 | 10/2009 | Bishop et al. |
| 2009/0271303 A1 | 10/2009 | Wang et al. |
| 2009/0282259 A1 | 11/2009 | Skorik et al. |
| 2009/0287564 A1 | 11/2009 | Bishop et al. |
| 2009/0287565 A1 | 11/2009 | Bishop et al. |
| 2009/0287601 A1 | 11/2009 | Tumminaro et al. |
| 2009/0289106 A1 | 11/2009 | Bishop et al. |
| 2009/0299841 A1 | 12/2009 | Bishop et al. |
| 2009/0307072 A1 | 12/2009 | Morales-Lema |
| 2009/0313134 A1 | 12/2009 | Faith et al. |
| 2009/0319425 A1 | 12/2009 | Tumminaro et al. |
| 2009/0327133 A1 | 12/2009 | Aharoni et al. |
| 2010/0010906 A1 | 1/2010 | Grecia |
| 2010/0030687 A1 | 2/2010 | Panthaki et al. |
| 2010/0031022 A1 | 2/2010 | Kramer |
| 2010/0042537 A1 | 2/2010 | Smith et al. |
| 2010/0042539 A1 | 2/2010 | Dheer et al. |
| 2010/0057622 A1 | 3/2010 | Faith et al. |
| 2010/0063935 A1 | 3/2010 | Thomas et al. |
| 2010/0094765 A1 | 4/2010 | Nandy |
| 2010/0100480 A1 | 4/2010 | Altman et al. |
| 2010/0100899 A1 | 4/2010 | Bradbury et al. |
| 2010/0115610 A1 | 5/2010 | Tredoux et al. |
| 2010/0127822 A1* | 5/2010 | Devadas ............... H04L 9/3278 340/5.8 |
| 2010/0131415 A1 | 5/2010 | Sartipi |
| 2010/0161736 A1 | 6/2010 | Picknelly |
| 2010/0185868 A1 | 7/2010 | Grecia |
| 2010/0198729 A1 | 8/2010 | Kavounas |
| 2010/0223186 A1 | 9/2010 | Hogan et al. |
| 2010/0269166 A1 | 10/2010 | Awad et al. |
| 2010/0293090 A1* | 11/2010 | Domenikos .......... G06Q 40/025 705/38 |
| 2010/0306107 A1* | 12/2010 | Nahari ................. H04W 12/10 705/44 |
| 2010/0312617 A1 | 12/2010 | Cowen |

(56) References Cited

U.S. PATENT DOCUMENTS

| | | |
|---|---|---|
| 2010/0320266 A1 | 12/2010 | White |
| 2011/0016054 A1* | 1/2011 | Dixon ............... G06Q 20/027 |
| | | 705/75 |
| 2011/0047075 A1 | 2/2011 | Fourez |
| 2011/0055078 A1 | 3/2011 | Nandy |
| 2011/0055083 A1 | 3/2011 | Grinhute |
| 2011/0066523 A1 | 3/2011 | Harrison |
| 2011/0066551 A1 | 3/2011 | Bruesewitz et al. |
| 2011/0078078 A1 | 3/2011 | Meier et al. |
| 2011/0099382 A1 | 4/2011 | Grecia |
| 2011/0110508 A1 | 5/2011 | LaFreniere et al. |
| 2011/0112945 A1 | 5/2011 | Cullen, III et al. |
| 2011/0112954 A1 | 5/2011 | Bruesewitz et al. |
| 2011/0131130 A1* | 6/2011 | Griffin ................ G06Q 40/00 |
| | | 705/38 |
| 2011/0145149 A1* | 6/2011 | Valdes ............... G06Q 20/405 |
| | | 705/44 |
| 2011/0173116 A1* | 7/2011 | Yan .................... G06Q 40/02 |
| | | 705/38 |
| 2011/0184838 A1 | 7/2011 | Winters et al. |
| 2011/0191160 A1 | 8/2011 | Blackhurst et al. |
| 2011/0191162 A1 | 8/2011 | Blackhurst et al. |
| 2011/0196782 A1* | 8/2011 | Allen ................. G06Q 20/10 |
| | | 705/39 |
| 2011/0202407 A1 | 8/2011 | Buhrmann et al. |
| 2011/0202982 A1 | 8/2011 | Alexander et al. |
| 2011/0247058 A1 | 10/2011 | Kisters |
| 2011/0251869 A1 | 10/2011 | Shekhter |
| 2011/0251952 A1 | 10/2011 | Kelly et al. |
| 2011/0258111 A1 | 10/2011 | Raj et al. |
| 2011/0264543 A1 | 10/2011 | Taveau et al. |
| 2011/0264583 A1 | 10/2011 | Cooper et al. |
| 2011/0270749 A1 | 11/2011 | Bennett et al. |
| 2011/0276479 A1 | 11/2011 | Thomas |
| 2011/0282778 A1* | 11/2011 | Wright ............... G06Q 30/0609 |
| | | 705/38 |
| 2011/0282789 A1 | 11/2011 | Carroll et al. |
| 2011/0288946 A1 | 11/2011 | Baiya et al. |
| 2011/0295746 A1 | 12/2011 | Thomas et al. |
| 2011/0313921 A1 | 12/2011 | Dheer et al. |
| 2011/0320347 A1 | 12/2011 | Tumminaro et al. |
| 2012/0005749 A1 | 1/2012 | Zoldi et al. |
| 2012/0016731 A1 | 1/2012 | Smith et al. |
| 2012/0018511 A1* | 1/2012 | Hammad ........... G06Q 20/385 |
| | | 235/380 |
| 2012/0041876 A1 | 2/2012 | Nosek et al. |
| 2012/0066121 A1 | 3/2012 | Shahbazi et al. |
| 2012/0109802 A1* | 5/2012 | Griffin ............... G06Q 40/00 |
| | | 705/35 |
| 2012/0116953 A1 | 5/2012 | Klein et al. |
| 2012/0130898 A1 | 5/2012 | Snyder et al. |
| 2012/0151220 A1 | 6/2012 | Grecia |
| 2012/0173409 A1 | 7/2012 | Hu |
| 2012/0173417 A1 | 7/2012 | Lohman et al. |
| 2012/0197802 A1 | 8/2012 | Smith et al. |
| 2012/0203695 A1 | 8/2012 | Morgan et al. |
| 2012/0203698 A1 | 8/2012 | Duncan et al. |
| 2012/0209766 A1 | 8/2012 | Kitchen et al. |
| 2012/0226613 A1 | 9/2012 | Adjaoute |
| 2012/0231814 A1 | 9/2012 | Calman et al. |
| 2012/0239574 A1 | 9/2012 | Smith et al. |
| 2012/0265687 A1 | 10/2012 | Dilip et al. |
| 2012/0278239 A1 | 11/2012 | Nosek et al. |
| 2012/0284154 A1 | 11/2012 | Creighton et al. |
| 2012/0284175 A1 | 11/2012 | Wilson et al. |
| 2012/0290453 A1 | 11/2012 | Manista et al. |
| 2012/0296710 A1* | 11/2012 | Dixon ................ G06Q 20/382 |
| | | 705/13 |
| 2013/0018791 A1 | 1/2013 | Mendocino et al. |
| 2013/0024375 A1 | 1/2013 | Choudhuri et al. |
| 2013/0036000 A1 | 2/2013 | Giordano et al. |
| 2013/0054452 A1 | 2/2013 | Au et al. |
| 2013/0060708 A1 | 3/2013 | Oskolkov et al. |
| 2013/0073455 A1 | 3/2013 | McLaughlin et al. |
| 2013/0080368 A1 | 3/2013 | Nandy |
| 2013/0085936 A1 | 4/2013 | Law et al. |
| 2013/0103576 A1 | 4/2013 | Ackley |
| 2013/0110658 A1* | 5/2013 | Lyman ............... G06Q 20/327 |
| | | 705/18 |
| 2013/0117178 A1 | 5/2013 | Mullen et al. |
| 2013/0124405 A1 | 5/2013 | Hamzeh |
| 2013/0124406 A1 | 5/2013 | Poplawski et al. |
| 2013/0138557 A1 | 5/2013 | Mullen et al. |
| 2013/0151384 A1 | 6/2013 | Mullen et al. |
| 2013/0197998 A1* | 8/2013 | Buhrmann ......... G06Q 20/4016 |
| | | 705/14.53 |
| 2013/0212010 A1 | 8/2013 | Mullen et al. |
| 2013/0218758 A1 | 8/2013 | Koenigsbrueck et al. |
| 2013/0226627 A1 | 8/2013 | Kubovcik et al. |
| 2013/0232071 A1 | 9/2013 | Dilip et al. |
| 2013/0232074 A1 | 9/2013 | Carlson et al. |
| 2013/0238488 A1 | 9/2013 | Bouey et al. |
| 2013/0238489 A1 | 9/2013 | Bouey et al. |
| 2013/0238490 A1 | 9/2013 | Bouey et al. |
| 2013/0238491 A1 | 9/2013 | Bouey et al. |
| 2013/0238492 A1 | 9/2013 | Muthu et al. |
| 2013/0246280 A1 | 9/2013 | Kirsch |
| 2013/0262296 A1 | 10/2013 | Thomas et al. |
| 2013/0262311 A1* | 10/2013 | Buhrmann ........... G06Q 20/326 |
| | | 705/44 |
| 2013/0282588 A1 | 10/2013 | Hruska |
| 2014/0006184 A1 | 1/2014 | Godsey |
| 2014/0012724 A1 | 1/2014 | O'leary et al. |
| 2014/0032691 A1 | 1/2014 | Barton et al. |
| 2014/0040069 A1 | 2/2014 | Tomasofsky et al. |
| 2014/0046820 A1 | 2/2014 | Sunderji et al. |
| 2014/0058862 A1 | 2/2014 | Celkonas |
| 2014/0059693 A1 | 2/2014 | Stecher |
| 2014/0067677 A1 | 3/2014 | Ali et al. |
| 2014/0081783 A1 | 3/2014 | Paranjape et al. |
| 2014/0122325 A1 | 5/2014 | Zoldi et al. |
| 2014/0164246 A1 | 6/2014 | Thomas et al. |
| 2014/0164253 A1 | 6/2014 | Dominguez |
| 2014/0187205 A1 | 7/2014 | Dankar et al. |
| 2014/0188697 A1 | 7/2014 | Bruesewitz et al. |
| 2014/0188728 A1 | 7/2014 | Dheer et al. |
| 2014/0244515 A1 | 8/2014 | Garfinkle et al. |
| 2014/0273965 A1 | 9/2014 | Raleigh et al. |
| 2014/0304778 A1 | 10/2014 | Grecia |
| 2014/0310142 A1 | 10/2014 | Mak |
| 2014/0310176 A1 | 10/2014 | Saunders et al. |
| 2014/0337230 A1* | 11/2014 | Bacastow .......... G06Q 20/4016 |
| | | 705/44 |
| 2014/0351137 A1 | 11/2014 | Chisholm |
| 2014/0365350 A1* | 12/2014 | Shvarts ............... G06Q 40/00 |
| | | 705/35 |
| 2014/0372308 A1 | 12/2014 | Sheets |
| 2015/0026061 A1* | 1/2015 | Siegel ................ G06Q 20/4016 |
| | | 705/44 |
| 2015/0046181 A1 | 2/2015 | Adjaoute |
| 2015/0046216 A1 | 2/2015 | Adjaoute |
| 2015/0046224 A1 | 2/2015 | Adjaoute |
| 2015/0066738 A1 | 3/2015 | Tian et al. |
| 2015/0073975 A1* | 3/2015 | Bornhofen ............ G06Q 40/02 |
| | | 705/38 |
| 2015/0073977 A1* | 3/2015 | Ghosh ................. G06Q 40/025 |
| | | 705/38 |
| 2015/0073981 A1 | 3/2015 | Adjaoute |
| 2015/0081324 A1 | 3/2015 | Adjaoute |
| 2015/0081461 A1 | 3/2015 | Adrangi et al. |
| 2015/0089568 A1* | 3/2015 | Sprague ................ H04L 63/06 |
| | | 726/1 |
| 2015/0095990 A1 | 4/2015 | Ranganathan et al. |
| 2015/0106260 A1 | 4/2015 | Andrews et al. |
| 2015/0112866 A1 | 4/2015 | Muthu et al. |
| 2015/0127547 A1 | 5/2015 | Powell et al. |
| 2015/0186994 A1* | 7/2015 | He ..................... G06Q 20/4014 |
| | | 705/44 |
| 2015/0193776 A1 | 7/2015 | Douglas et al. |
| 2015/0235207 A1 | 8/2015 | Murphy, Jr. et al. |
| 2015/0269578 A1 | 9/2015 | Subramanian et al. |
| 2016/0014603 A1 | 1/2016 | Woodward et al. |

(56) References Cited

U.S. PATENT DOCUMENTS

| | | | |
|---|---|---|---|
| 2016/0034932 A1* | 2/2016 | Sion | G06Q 30/0207 705/14.1 |
| 2016/0078443 A1* | 3/2016 | Tomasofsky | G06Q 20/363 705/14.3 |
| 2016/0078444 A1 | 3/2016 | Tomasofsky et al. | |
| 2016/0087952 A1 | 3/2016 | Tartz et al. | |
| 2016/0092872 A1* | 3/2016 | Prakash | G06Q 20/3265 705/65 |
| 2016/0104133 A1* | 4/2016 | Davis | G06Q 50/01 705/39 |
| 2016/0188317 A1* | 6/2016 | Hilliar | H04W 4/60 717/172 |
| 2016/0203485 A1 | 7/2016 | Subramanian et al. | |
| 2016/0203490 A1 | 7/2016 | Gupta et al. | |
| 2016/0267280 A1* | 9/2016 | Mansour | H04L 9/0861 |
| 2016/0283918 A1 | 9/2016 | Weinflash | |
| 2016/0300206 A1 | 10/2016 | Novac et al. | |
| 2016/0300207 A1 | 10/2016 | Novac et al. | |
| 2016/0300225 A1 | 10/2016 | Novac et al. | |
| 2016/0300226 A1 | 10/2016 | Novac et al. | |
| 2016/0321625 A1 | 11/2016 | Gilliam, III et al. | |
| 2016/0364727 A1 | 12/2016 | DeLawter et al. | |
| 2016/0364728 A1 | 12/2016 | DeLawter et al. | |
| 2017/0024719 A1 | 1/2017 | Finch et al. | |
| 2017/0024744 A1 | 1/2017 | Finch et al. | |
| 2017/0024828 A1* | 1/2017 | Michel | G06Q 40/12 |
| 2017/0103399 A1* | 4/2017 | Napsky | G06Q 30/0609 |
| 2017/0193514 A1 | 7/2017 | Chen | |

FOREIGN PATENT DOCUMENTS

| | | |
|---|---|---|
| AU | 8870801 | 4/2002 |
| AU | 2002252137 | 9/2002 |
| BR | PI0710021 | 8/2011 |
| BR | PI0710089 | 8/2011 |
| CA | 2229012 | 3/1997 |
| CA | 2239875 | 6/1997 |
| CA | 2323500 | 9/1999 |
| CA | 2329348 | 11/1999 |
| CA | 2316090 | 2/2001 |
| CA | 2402353 | 9/2001 |
| CA | 2423048 | 3/2002 |
| CA | 2437949 | 8/2002 |
| CA | 2436319 | 2/2004 |
| CA | 2647602 | 3/2008 |
| CA | 2647636 | 3/2008 |
| CN | 101454794 | 6/2009 |
| CN | 101454795 | 6/2009 |
| EP | 865010 | 9/1998 |
| EP | 820620 | 3/1999 |
| EP | 998731 | 5/2000 |
| EP | 1107198 | 6/2001 |
| EP | 1184823 | 3/2002 |
| EP | 1208513 | 5/2002 |
| EP | 1400053 | 3/2004 |
| EP | 1416455 | 5/2004 |
| EP | 1504393 | 2/2005 |
| EP | 2008237 | 12/2008 |
| EP | 2013842 | 1/2009 |
| EP | 2266083 | 12/2010 |
| EP | 2304678 | 4/2011 |
| EP | 2344994 | 7/2011 |
| EP | 2387772 | 11/2011 |
| EP | 2407918 | 1/2012 |
| EP | 2407919 | 1/2012 |
| EP | 2438562 | 4/2012 |
| GB | 2297856 | 8/1996 |
| GB | 2384084 | 7/2003 |
| GB | 2454614 | 5/2009 |
| JP | 09282367 | 10/1997 |
| JP | H11265413 | 9/1999 |
| JP | 2000311209 | 11/2000 |
| JP | 2002049872 | 2/2002 |
| JP | 2002298041 | 10/2002 |
| JP | 2003308437 | 10/2003 |
| JP | 2004192437 | 7/2004 |
| JP | 2004532448 | 10/2004 |
| JP | 2005512173 | 4/2005 |
| JP | 2006285329 | 10/2006 |
| JP | 2007128192 | 5/2007 |
| JP | 2008102914 | 5/2008 |
| JP | 2008262601 | 10/2008 |
| JP | 2014132474 | 7/2014 |
| KR | 1020120075590 | 7/2012 |
| KR | 1020140099676 | 8/2014 |
| MX | 2008012503 | 12/2008 |
| MX | 2008012504 | 5/2009 |
| NL | 1018913 | 3/2003 |
| SE | 9703800 | 4/1999 |
| TW | 200919343 | 5/2009 |
| WO | 1997002539 | 1/1997 |
| WO | 1997016798 | 5/1997 |
| WO | 1999024891 | 5/1999 |
| WO | 1999034311 | 7/1999 |
| WO | 1999046720 | 9/1999 |
| WO | 2000055793 | 9/2000 |
| WO | 2000058876 | 10/2000 |
| WO | 2001033522 | 5/2001 |
| WO | 2001055984 | 8/2001 |
| WO | 2001067364 | 9/2001 |
| WO | 2002025534 | 3/2002 |
| WO | 2002025605 | 3/2002 |
| WO | 2002035429 | 5/2002 |
| WO | 2002069561 | 9/2002 |
| WO | 2002073483 | 9/2002 |
| WO | 2003091849 | 11/2003 |
| WO | 2005004026 | 1/2005 |
| WO | 2005057455 | 6/2005 |
| WO | 2007116368 | 10/2007 |
| WO | 2008011102 | 1/2008 |
| WO | 2008027620 | 3/2008 |
| WO | 2008027621 | 3/2008 |
| WO | 2008110791 | 9/2008 |
| WO | 2009058526 | 5/2009 |
| WO | 2009097215 | 8/2009 |
| WO | 2009114876 | 9/2009 |
| WO | 2009152184 | 12/2009 |
| WO | 2009158420 | 12/2009 |
| WO | 2010082960 | 7/2010 |
| WO | 2010083113 | 7/2010 |
| WO | 2010138358 | 12/2010 |
| WO | 2010138359 | 12/2010 |
| WO | 2010138611 | 12/2010 |
| WO | 2010138613 | 12/2010 |
| WO | 2010138615 | 12/2010 |
| WO | 2010141662 | 12/2010 |
| WO | 2011008625 | 1/2011 |
| WO | 2011137082 | 11/2011 |
| WO | 2011163525 | 12/2011 |
| WO | 2012075187 | 6/2012 |
| WO | 2017011596 | 1/2017 |
| WO | 2017014815 | 1/2017 |

OTHER PUBLICATIONS

Burr, Becky and Russell, Adam "Maximizing Consumer Contacts while Mitigating TCPA Risk," Neustar, available at https://www.neustar.biz/resources/videos/mitigate-tcpa-risk-and-collections-video Mar. 12, 2014.

"Enterprise HLR Loockup Portal and API," published at blog YTD2525, citing hlr-lookups.com as the source, available at https://ytd2525.wordpress.com/2014/05/30/enterprise-hlr-lookup-portal-and-api/ May 30, 2014.

Dryburgh, Lee and Hewett, Jeff, "Signaling System No. 7 (SS7/C7): Protocol, Architecture, and Services," Cisco Press, available at http://techbus.safaribooksonline.com/book/electrical-engineering/communications-engineering/1587050404/introductions-and-overviews/ch03 Aug. 2, 2004.

Malphrus, Steve, "Perspectives on Retail Payments Fraud," Economic Perspectives, vol. XXXIII, No. 1, 2009, avaialble at https://papers.ssrn.com/sol3/papers.cfm?abstract_id=1341233 Feb. 11, 2009.

(56) References Cited

OTHER PUBLICATIONS

International Search Report for PCT/US2016/042163, dated Sep. 26, 2016.
International Search Report and Written Opinion for PCT/US2016/026000, dated Jul. 13, 2016.
International Search Report and Written Opinion for PCT/US11/33828, dated Jul. 12, 2011, 11 pages.
International Search Report for PCT/US10/36231, dated Nov. 8, 2010, 8 pages.
International Search Report for PCT/US10/36233, dated Jul. 28, 2010, 7 pages.
International Search Report for PCT/US10/36229, dated Jul. 28, 2010, 12 pages.
International Search Report for PCT/US10/35465, dated Jul. 13, 2010, 7 pages.
International Search Report for PCT/US09/48490, dated Jul. 31, 2009, 1 page.
"Greg's diary", Aug. 2009, available at http://www.lemis.com/grog/diary-aug2009.php?dirdate=20090807&imagesizes=1111111111111111113#Photo-19.
Trusted Computing Platform Alliance (TCPA), Main Specification Version 1. 1b, Published by the Trusted Computing Group, 2003, 332 pages.
Benson, Carol Coye, "Faster, Better, Cheaper—Like it or Not," http://paymentsviews.com/2013/03/13/faster-better-cheaper-like-it-or-not/, Mar. 13, 2013.
Fiserv, Inc., "Popmoney(R): Instant Payments—Now You Can Deliver Funds in Real Time," Feb. 6, 2014 [retrieved online from https://www.fiserv.com/resources/Popmoney_Instant_Payments_2_06_2014.pdf on Aug. 7, 2015].
Gayle C. Avery, Ellen Baker; Reframing the Infomated Household-Workplace; Information & Organization, 2002, vol. 12, Aug. 2001.
Mark Bernkopf; Electronic Cash and Monetary Policy; First Monday, vol. 1, No. 1-6, May 1996.
Electronic Payment Systems in European Countries; Country Synthesis Report; Böhle, Rader, Riehm, Institut far Technikfolgenabschatzung and Systemanalyse for the European Science and Technology Observatory Network (ESTO); Final Version, Sep. 1999.
Mark E. Budnitz; Electronic Money in the 1990s: A Net Benefit or Merely a Trade-Off?; 9 Ga. St. U. L. Rev. 747, 1992-1993.
Chida, Mambo, Shizuya; Digital Money—A Survey; Received Jun. 15, 2001; Revised Aug. 21, 2001; Interdisciplinary Information Sciences. vol. 7, No. 2, pp. 135-165 (2001).
Harold L. Frohman, William R. Ledder; Defense Transportation's EDI Program: A Security Risk Assessment; PL205LN5; Logistics Management Institute; May 1993.
Aryya Gangopadhyay; Managing Business with Electronic Commerce: Issues & Trends; Idea Group Publishing (2002).
Hans van der Heijden; Factors Affecting the Successful Introduction of Mobile Payment Systems; Vrije Universiteit Amsterdam; 15th Bled Electronic Commerce Conference eReality; Constructing the eEconomy; Bled, Solvenia, Jun. 17-19, 2002.
Lorin M. Hitt and Frances X. Frei; Do Better Customers Utilize Electronic Distribution Channels? The Case of PC Banking; Dec. 2001.
Eun Kim, Petra Schubert, Dorian Seltz and Bumtae Kim; The EBMG Reference Model on Electronic Markets: The Korean Case of JODAL (2007).
Glenbrook Partners; PayPal in the Air!—A look at PayPal Mobile; Payment News; Glenbrook eCommerce Market Analysis Reports (2006).
Sangjo Oh, Heejin Lee, Sherah Kurnia, Robert B. Johnston, Ben Lim; A Stakeholder Perspective on Successful Electronic Payment Systems Diffusion; Proceedings of the 39th Hawaii International Conference on Systems Sciences, 2006.
John R. Palumbo; Naval Postgraduate School, Monterey, California; Thesis, Financial Transaction Mechanisms for World Wide Web Applications, Mar. 1996.
Hua-Fu Pao; Naval Postgraduate School, Monterey, California; Thesis, Security Management of Electronic Data Interchange; Jun. 1993.
Tobern P. Pedersen; Electronic Payments of Small Amounts; Aarhus University (1998).
Eveline Franco Veloso; The Business Revolution through B2B Market Tone and its Impacts over the Financial System gong into 21st Century; The Institute of Brazilian Business and Management Issues; XII Minerva Program—Fall 2000, 2000.
Alladi Venkatesh and Nicholas Vitalari; Households and Technology: The Case of Home Computers—Some Conceptual and Theoretical Issues; originally appeared in M.L. Roberts and L. Wortzel (eds.) Marketing to the Changing Household, Ballinger Publishing, 1985, pp. 187-203.
A. Vilmos and S. Narnouskos; SEMOPS: Design of a New Payment Service; International Workshop on Mobile Commerce Technologies & Applications (MCTA 2003), In proceedings of the 14th International Conference DEXA 2003, Sep. 1-5, 2003, Prague, Czech Republic.
Raja Mohn Rosli bin Raja Zulkifli; Building a World Class Infrastructure to Support E-Commerce in Malaysia; 1997 Telekom Malaysia, 1997.
Chang, et al., "Smart Phone for Mobile Commerce," Computer Standards & Interfaces 31.4, pp. 740-747, 2009.
Nacha (Business-to-Business EIPP: Presentment Models and Payment Options, http://euro.ecom.cmu.edu/resources/elibrary/epay/B2BPaymentOptions.pdf, 2001), (Year: 2001).
NoPass, "No Password Login | Touch ID Fingerprint iPhone App," available at https://web.archive.org/web/20150328095715/http://www.nopassapp.com/, Mar. 28, 2015.
Constant Contact Tech Blog, "iOS Security: How Apple Protects Data on iOS Devices—Part 1," available at https://web.archive.org/web/20150403175348/https://techblog.constantcontact.com/software-development/ios-security/, Dec. 8, 2014.
NoPass, "Register," available at https://web.archive.org/web/20141222172212/http://www.nopassapp.com/register/, Dec. 22, 2014.
NoPass, "Login," available at https://web.archive.org/web/20141222170523/http://www.nopassapp.com/login/, Dec. 22, 2014.
Apple, "iOS Security," available at https://web.archive.org/web/20140226213513/http://images.apple.com/iphone/business/docs/iOS_Security_Feb14.pdf, Feb. 2014.
EBay Developers Program, "eBay Web Services XML API Guide," 2005.
International Trade Administration (export.gov), "Chapter 1: Methods of Payment in International Trade," https://2016.export.gov/tradefinanceguide/eg_main_043221.asp, Nov. 7, 2012 (Year: 2012).
Federal Financial Institutions Examination Council (Wholesale Payment System, https://ithandbook.ffiec.gov/media/274899/ffiec_itbooklet_wholesalepaymentsystems.pdf, Section 4, Jul. 2004.
Oldfield et al., "The Place of Risk Management in Financial Institutions," The Wharton School, Financial Institutional Center, University of Pennsylvania, 1995.
"Wireless Local Number Portability (WLNP)—frequently asked questions," FCC, May 18, 2016, available at https://www.fcc.gov/general/wireless-local-number-portability-wlnp (Year: 2016).
"Maximizing Consumer Contacts while Mitigating TCPA Risk," Neustar, Mar. 12, 2014, Becky Burr and Adam Russell, available at https://www.home.neustar/resources/webinar/mitigate-tcpa-risk-and-collections-video, 2014.
"Enterprise HLR Lookup Portal and API," published May 30, 2014 at blog YTD2525, citing hlr-lookups.com as the source, available at https://ytd2525.wordpress.com/2014/05/30/enterprise-hlr-lookup-portal-and-api/, 2014.
"Signaling System No. 7 (SS7/C7): Protocol, Architecture, and Services," by Lee Dryburgh and Jeff Hewett, Cisco Press, Aug. 2, 2004, available at http://techbus.safaribooksonline.com/book/electrical-engineering/communications-engineering/1587050404/introductions-and-overviews/ch03, 2004.
"Perspectives on Retail Payments Fraud," Steve Malphrus, Feb. 11, 2009, Economic Perspectives, vol. XXXIII, No. 1, 2009, available at https://papers.ssrn.com/sol3/papers.cfm?abstract_id=1341233, 2009.

\* cited by examiner

AUTHENTICATION AND FRAUD PREVENTION IN PROVISIONING A MOBILE WALLET

CROSS-REFERENCE TO RELATED APPLICATIONS

This application claims the benefit of U.S. Provisional Application No. 62/396,684, filed Sep. 19, 2016. U.S. Provisional Application No. 62/396,684 is incorporated herein by reference in its entirety.

TECHNICAL FIELD

This disclosure relates generally to financial transaction processing, and relates more particularly to authentication and fraud prevention in provisioning a mobile wallet.

BACKGROUND

A mobile wallet is a service that allows a user of a mobile device to send and/or receive money using the mobile device. The mobile wallet typically includes an application that resides on the mobile device and communicates with a mobile wallet provider. To setup the mobile wallet, the user of the mobile device generally adds one or more underlying accounts, such as checking accounts, savings accounts, credit card accounts, or debit card accounts, to the mobile wallet by uploading the account information to the mobile wallet provider. The process of uploading the underlying account to the mobile wallet provider to allow for future transactions in which the mobile wallet uses the underlying account is referred to as "provisioning." After the account has been provisioned to the mobile wallet, the mobile wallet can perform secure financial transactions, typically using tokenized information, such that the underlying account information is not transferred between transacting parties.

BRIEF DESCRIPTION OF THE DRAWINGS

To facilitate further description of the embodiments, the following drawings are provided in which.

Figure 1:
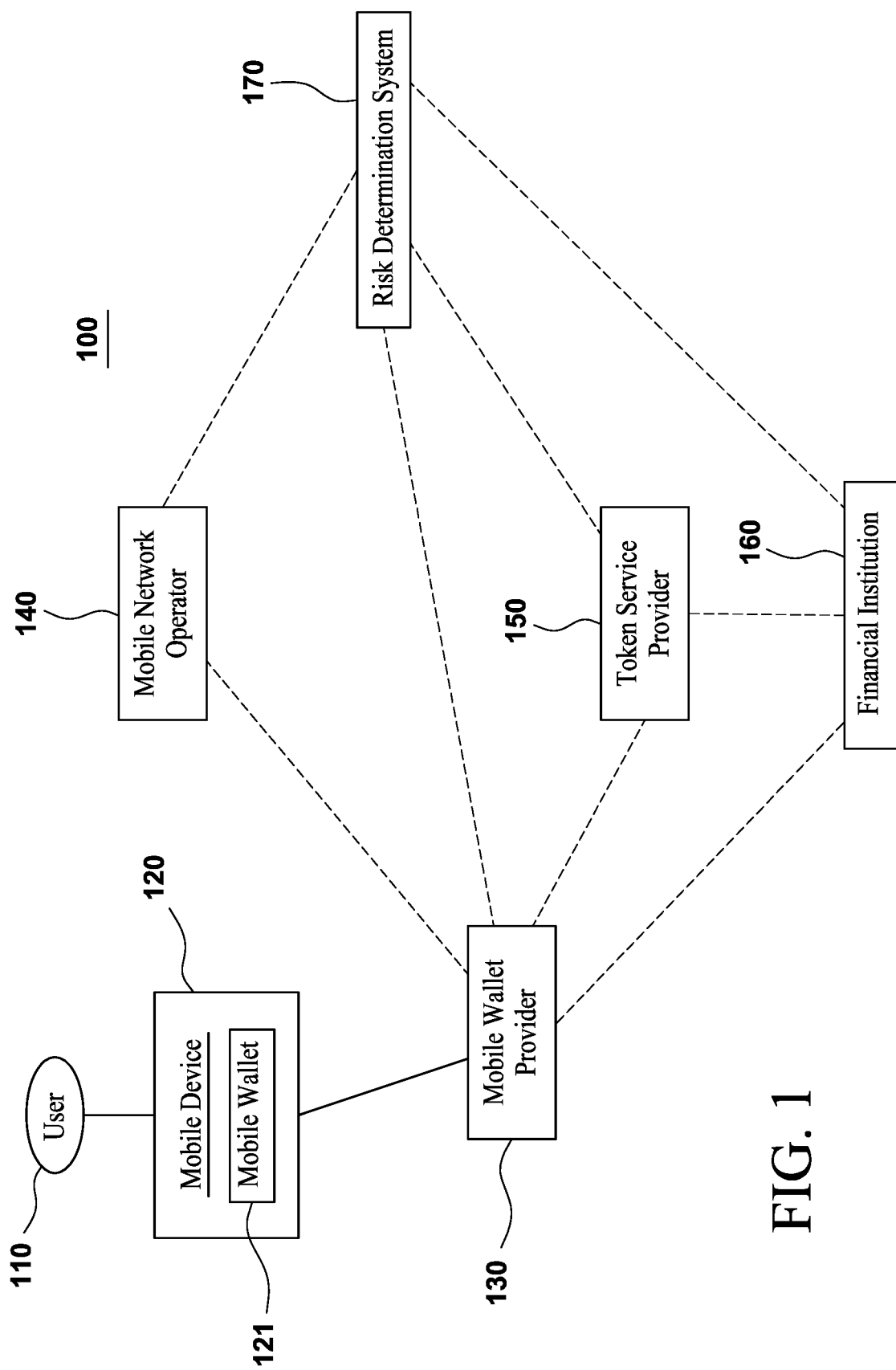
FIG. 1 illustrates a block diagram of a system that can be employed for provisioning an account to a mobile wallet.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, two minutes, or five minutes.

DESCRIPTION OF EXAMPLES OF EMBODIMENTS

Various embodiments include a system. The system can include one or more processors in data communication through a network with a provider and one or more non-transitory computer-readable media storing computing instructions configured to run on the one or more processors and perform certain acts. The acts can include receiving an inquiry from the provider to authenticate a provisioning of an account to a mobile wallet. The inquiry can include: account information about the account, and device information about a mobile device that operates the mobile wallet. The acts also can include determining device ownership information for the mobile device, account ownership information for the account, device risk information associated with the mobile device, and account risk information associated with the account. The acts additionally can include determining an ownership correlation between the device ownership information and the account ownership information. The acts further can include generating a fraud risk level by applying business rules and one or more statistical modeling techniques to at least a portion of the ownership correlation, the device risk information, and the account risk information. The business rules can define one or more fraud risks based on at least a portion of the ownership correlation, the device risk information, and the account risk information. The acts additionally can include providing a response to the provider based on the fraud risk level, such that the provider sends to the mobile device information about the provisioning of the account to the mobile wallet, and such that the mobile wallet updates a user interface display on the mobile device based on the information about the provisioning of the account to the mobile wallet.

A number of embodiments include a method. The method can be implemented via execution of computer instructions configured to run at one or more processors and configured to be stored at one or more non-computer-readable media.

The method can include receiving an inquiry from a provider to authenticate a provisioning of an account to a mobile wallet. The inquiry can include: account information about the account, and device information about a mobile device that operates the mobile wallet. The method also can include determining device ownership information for the mobile device, account ownership information for the account, device risk information associated with the mobile device, and account risk information associated with the account. The method additionally can include determining an ownership correlation between the device ownership information and the account ownership information. The method further can include generating a fraud risk level by applying business rules and one or more statistical modeling techniques to at least a portion of the ownership correlation, the device risk information, and the account risk information. The business rules can define one or more fraud risks based on at least a portion of the ownership correlation, the device risk information, and the account risk information. The method additionally can include providing a response to the provider based on the fraud risk level, such that the provider sends to the mobile device information about the provisioning of the account to the mobile wallet, and such that the mobile wallet updates a user interface display on the mobile device based on the information about the provisioning of the account to the mobile wallet.

Additional embodiments include a system. The system can include one or more processors in data communication through a network with a provider and one or more non-transitory computer-readable media storing computing instructions configured to run on the one or more processors and perform certain acts. The acts can include receiving a request from a mobile wallet operating on the mobile device to perform a provisioning of an account to the mobile wallet. The acts also can include generating account information about the account. The acts additionally can include generating device information about the mobile device. The acts further can include sending an inquiry to the risk determination system to authenticate the provisioning of the account to the mobile wallet. The inquiry can include the account information and the device information. The risk determination system can generate a fraud risk level by applying business rules and one or more statistical modeling techniques to at least a portion of: (a) an ownership correlation between device ownership information for the mobile device and account ownership information for the account, (b) device risk information associated with the mobile device, and (c) account risk information associated with the account. The business rules can define one or more fraud risks based on at least a portion of the ownership correlation, the device risk information, and the account risk information. The acts additionally can include receiving from the risk determination system a first response based on the fraud risk level. The acts further can include determining whether to proceed with the provisioning of the account to the mobile wallet or to perform an additional verification based at least in part on the first response received from the risk determination system. The acts additionally can include sending a second response to the mobile wallet in response to the request to perform the provisioning of the account to the mobile wallet, such that the mobile wallet updates a user interface display on the mobile device based on the second response to display information about the provisioning of the account to the mobile wallet.

Further embodiments include a method. The method can be implemented via execution of computer instructions configured to run at one or more processors and configured to be stored at one or more non-computer-readable media. The method can include receiving a request from a mobile wallet operating on a mobile device to perform a provisioning of an account to the mobile wallet. The method also can include generating account information about the account. The method additionally can include generating device information about the mobile device. The method further can include sending an inquiry to a risk determination system to authenticate the provisioning of the account to the mobile wallet. The inquiry can include the account information and the device information. The risk determination system can generate a fraud risk level by applying business rules and one or more statistical modeling techniques to at least a portion of: (a) an ownership correlation between device ownership information for the mobile device and account ownership information for the account, (b) device risk information associated with the mobile device, and (c) account risk information associated with the account. The business rules can define one or more fraud risks based on at least a portion of the ownership correlation, the device risk information, and the account risk information. The method additionally can include receiving from the risk determination system a first response based on the fraud risk level. The method further can include determining whether to proceed with the provisioning of the account to the mobile wallet or to perform an additional verification based at least in part on the first response received from the risk determination system. The method additionally can include sending a second response to the mobile wallet in response to the request to perform the provisioning of the account to the mobile wallet, such that the mobile wallet updates a user interface display on the mobile device based on the second response to display information about the provisioning of the account to the mobile wallet.

Additional embodiments include a system. The system can include one or more processors in data communication through a network with a provider and one or more non-transitory computer-readable media storing computing instructions configured to run on the one or more processors and perform certain acts. The acts can include receiving a request from the provider to perform a provisioning of an account to a mobile wallet operating on a mobile device. The acts also can include sending an inquiry to the risk determination system to authenticate the provisioning of the account to the mobile wallet. The inquiry can include account information about the account and device information about the mobile device. The risk determination system can generate a fraud risk level by applying business rules and one or more statistical modeling techniques to at least a portion of: (a) an ownership correlation between device ownership information for the mobile device and account ownership information for the account, (b) device risk information associated with the mobile device, and (c) account risk information associated with the account. The business rules can define one or more fraud risks based on at least a portion of the ownership correlation, the device risk information, and the account risk information. The acts additionally can include receiving from the risk determination system a response based on the fraud risk level. The acts further can include determining whether to proceed with the provisioning of the account to the mobile wallet based at least in part on the response received from the risk determination system. The acts additionally can include providing a token to the provider in response to the request to perform the provisioning of the account to the mobile wallet when the fraud risk level is below a predetermined threshold, such that the provider sends to the mobile device information about the provisioning of the account to the mobile wallet, and such that the mobile wallet updates a user interface display on the mobile device based on the information about the provisioning of the account to the mobile wallet. The token can be linked to the account.

Further embodiments include a method. The method can be implemented via execution of computer instructions configured to run at one or more processors and configured to be stored at one or more non-computer-readable media. The method can include receiving a request from a provider to perform a provisioning of an account to a mobile wallet operating on a mobile device. The method also can include sending an inquiry to a risk determination system to authenticate the provisioning of the account to the mobile wallet. The inquiry can include account information about the account and device information about the mobile device. The risk determination system can generate a fraud risk level by applying business rules and one or more statistical modeling techniques to at least a portion of: (a) an ownership correlation between device ownership information for the mobile device and account ownership information for the account, (b) device risk information associated with the mobile device, and (c) account risk information associated with the account. The business rules can define one or more fraud risks based on at least a portion of the ownership correlation, the device risk information, and the account risk information. The method additionally can include receiving from the risk determination system a response based on the fraud risk level. The method further can include determining whether to proceed with the provisioning of the account to the mobile wallet based at least in part on the response received from the risk determination system. The method additionally can include providing a token to the provider in response to the request to perform the provisioning of the account to the mobile wallet when the fraud risk level is below a predetermined threshold, such that the provider sends to the mobile device information about the provisioning of the account to the mobile wallet, and such that the mobile wallet updates a user interface display on the mobile device based on the information about the provisioning of the account to the mobile wallet. The token can be linked to the account.

Turning to the drawings, FIG. 1 illustrates a block diagram of a system 100 that can be employed for provisioning an account to a mobile wallet. System 100 is merely exemplary, and embodiments of the system are not limited to the embodiments presented herein. The system can be employed in many different embodiments or examples not specifically depicted or described herein. In some embodiments, certain elements or modules of system 100 can perform various procedures, processes, and/or activities. In other embodiments, the procedures, processes, and/or activities can be performed by other suitable elements or modules of system 100.

Figure 11:
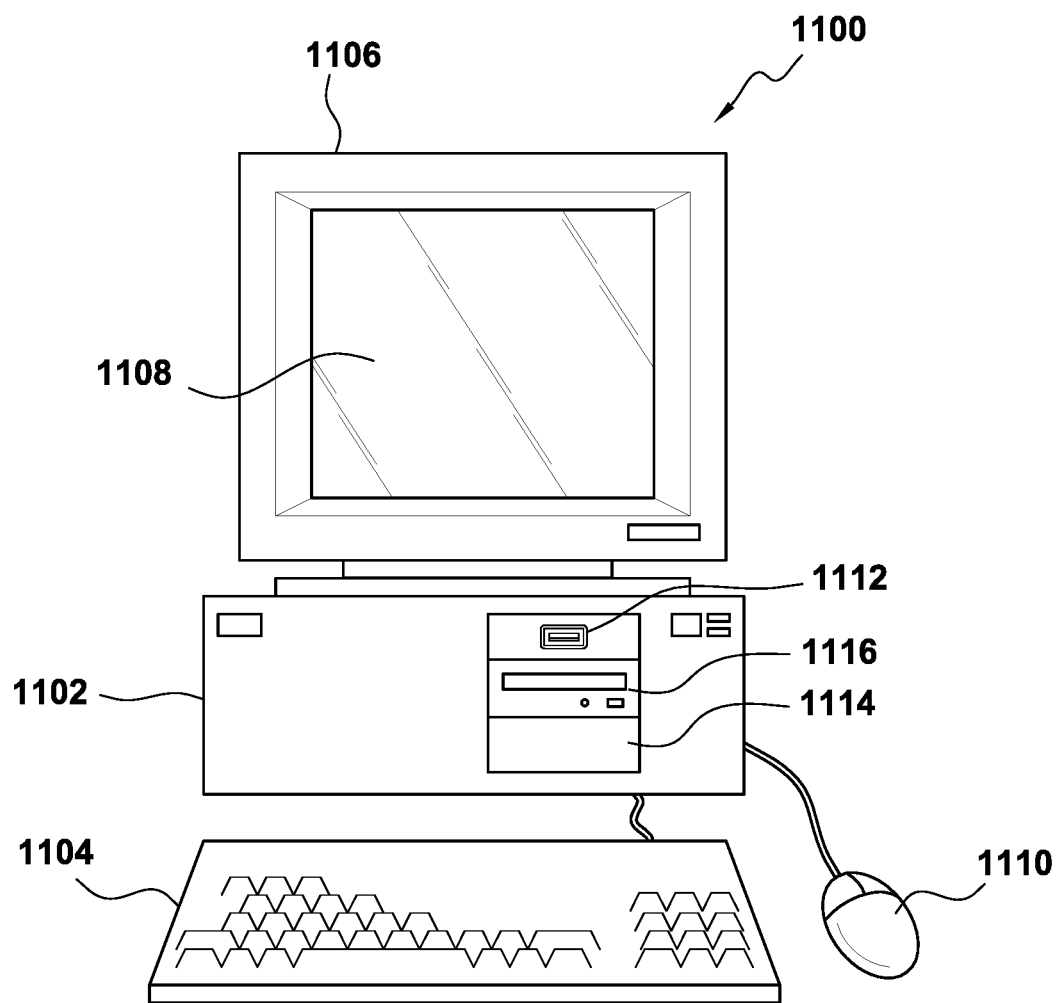
FIG. 11 illustrates a computer that is suitable for implementing an embodiment of the systems shown in FIG. 1.

In some embodiments, system 100 can include one or more mobile devices, such as mobile device 120; one or more mobile wallet providers, such as mobile wallet provider 130; one or more mobile network operators, such as mobile network operator 140; one or more token service providers, such as token service provider 150; one or more financial institutions, such as financial institution 160; and/or a risk determination system 170. In a number of embodiments, each of the mobile devices, mobile wallet providers, mobile network operators, token service providers, financial institutions, and the risk determination system can include a computer system, such as computer system 1100, as shown in FIG. 11 and described below, and can be a single computer, a single server, or a cluster or collection of computers or servers, or a cloud of computers or servers. In many embodiments, various components (e.g., 120, 130, 140, 150, 160, 170) of system 100 can be in data communication with various other components (e.g., 110, 120, 130, 140, 150, 160) of system 100, such as through one or more networks. The networks can be the Internet and/or other suitable data communication networks.

In a number of embodiments, mobile device 120 can be used by a user 110 to initiate provisioning of an account to mobile wallet 121 residing on mobile device 120. In various embodiments, mobile device 120 can run a mobile application, such as a mobile wallet 121, to allow user 110 of mobile device 120 to send and/or receive money using mobile device 120. Mobile wallet 121 can be an application that resides on mobile device 120 and communicates with mobile wallet provider 130.

In several embodiments, to setup mobile wallet 121, user 110 of mobile device 120 can add one or more underlying accounts, such as checking accounts, savings accounts, credit card accounts, or debit card accounts, to mobile wallet 121 by uploading account information (e.g., card number, account number, etc.) for the one or more accounts through mobile wallet 121 to mobile wallet provider 130. The process of uploading an underlying account to mobile wallet provider 130 to allow for future transactions in which mobile wallet 121 uses the underlying account is referred to as "provisioning." After the account has been provisioned to mobile wallet 121, mobile wallet 121 can perform secure financial transactions, typically using tokenized information, such that the underlying account information is not transferred between transacting parties. For example, mobile wallet 121 can communicate with mobile wallet provider 130 to obtain one or more to tokens, which can be obtained by mobile wallet provider 130 from token service provider 150. The provisioning of the underlying account allows token service provider 150 to provide tokens that are linked to that underlying account.

In many embodiments, mobile wallet provider 130 can be a server or other computing system that communicates with mobile wallet 121 on mobile device 120 to manage services on mobile wallet 120. For example, mobile wallet providers (e.g., 130) have been created by financial institutions (e.g., Chase Pay, Wells Fargo Wallet), merchant associations (e.g., Merchant Customer Exchange (MCX) CurrentC), and mobile device hardware and/or software manufacturers (e.g., Google Wallet, Android Pay, Apple Pay, Samsung Pay).

In various embodiments, mobile network operator 140 can provide mobile network services (e.g., wireless data communication) for mobile device 120. Mobile network operators (e.g., 140) also are referred to as wireless service providers, wireless carriers, cellular carriers, etc. Examples of mobile network operators (e.g., 140) include Verizon Wireless, AT&T Mobility, T-Mobile, Sprint, etc. Mobile network operators (e.g., 140) can manage mobile network services accounts for mobile devices (e.g., 120), and generally have information about the ownership and/or status of a mobile device (e.g., 120).

In several embodiments, token service provider 150 can provide tokens to token requestors, such as mobile wallet providers (e.g., 130). The token is a unique digital identifier that acts as digital credentials and is linked within token service provider 150 to the underlying account. The token can allow payment transactions to be processed without exposing actual account details of underlying accounts, which can prevent those underlying accounts from being compromised. Once the account is provisioned, tokens provided by token service providers (e.g., 150) are considered secure in payment transactions, as the underlying account information is kept secret within the token service provider and the financial institution (e.g., 160) that maintains the underlying account. Examples of current token service providers (e.g., 150) include card network providers, such as Visa, American Express, MasterCard, and First Data Corporation (i.e., STAR network).

In a number of embodiments, the financial institutions, such as financial institution 160, can be depository financial institutions, such as savings banks, credit unions, savings and loan associations, card issuing financial institutions, or other forms of financial institutions. In many embodiments, financial institution 160 can be the card issuer for the underlying account. The underlying account can be a deposit account, such as a checking account or savings account, or a lending account, such as a charge account or credit account. Financial institution 160 can have information about the ownership of the underlying account. In some embodiments, financial institution 160 can be replaced by or supplemented by a card processor, which can have access to information about the underlying account.

Figure 4:
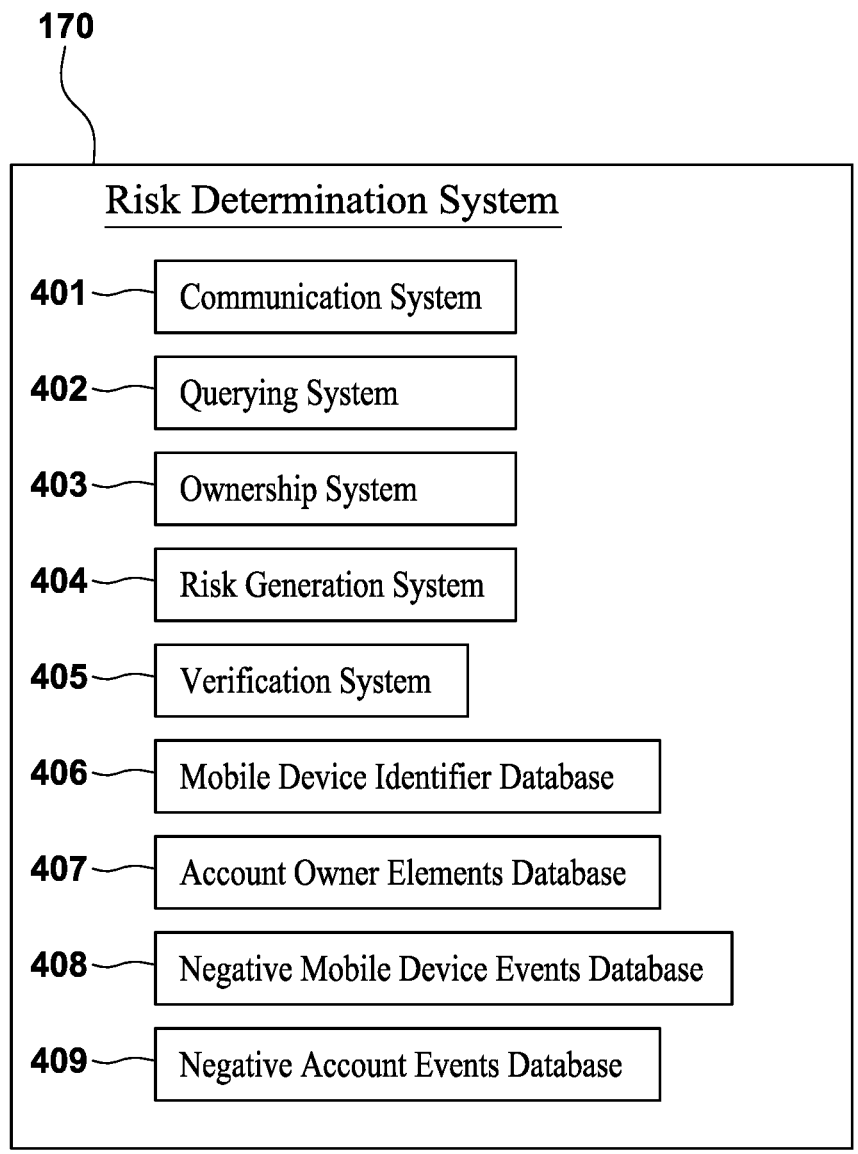
FIG. 4 illustrates a block diagram of a risk determination system of FIG. 1 that can be employed for facilitating a risk determination as part of provisioning an account to the mobile wallet of FIG. 1, according to an embodiment.

In several embodiments, risk determination system 170 can be in communication with one or more other systems, such as mobile wallet provider 130, mobile network operator 140, token service provider 150, and/or financial institution 160, and can be queried by one or more of those systems to generate and provide a fraud risk level for a provisioning transaction. In a number of embodiments, risk determination system 170 can communicate, such as through call-outs, with one or more other systems, such as mobile wallet provider 130, mobile network operator 140, token service provider 150, and/or financial institution 160, to determine additional information to be used as part of risk determination system 170 determining the fraud risk level. In various embodiments, risk determination system 170 can include a number of systems, as shown in FIG. 4 and described below. The systems in risk determination system 170 can be implemented in software, hardware, or a combination thereof.

Provisioning an underlying account to the mobile wallet can raise several possibilities of fraud. For example, user 110 can misrepresent the true and correct identity of the user of mobile device 120 and mobile wallet 121. In some cases, the account information can be stolen or otherwise used by user 110 when user 110 does not have legitimate access to the account. In the same or other cases, mobile device 120 can be a stolen device, a device bought on the black market, or a device used by someone without authorization. Fraud occurs in over five percent of all account provisioning activities, which is extremely high. In many embodiments, risk determination system 170 can beneficially determine a risk of fraud using a combination of data sources to ensure that user 110 that is performing the provisioning of the account is authorized to access the account and has legitimate access to mobile device 120. In many cases, risk determination system 170 can ensure that the provisioning of the account is done by someone who is both the account holder and the owner of mobile device 120.

In some cases, the person or entity that owns mobile device 120 or is the account holder can be different from authorized users of mobile device 120 or the account. For example, corporate plans or family plans for mobile devices (e.g., 120) often involve owners who are different from those you are authorized to use the mobile devices (e.g., 120). In such cases, risk determination system 170 can ensure that the provisioning of the account is done by someone who is authorized on the account and mobile device 120.

Conventional methods of provisioning a mobile wallet can present difficulties in authentication and fraud prevention. These problems specifically arise in the context of computer networks, as provisioning a mobile wallet necessarily involves a mobile wallet resident on a mobile devices that communicates through one or more computer networks to other systems, such as one or more of a mobile wallet provider (e.g., 130) and/or a financial institution (e.g., 160) to provision the mobile wallet. These communications over one or more computer networks allow the user (e.g., 110) of the mobile device (e.g., 120) to misrepresent various pieces of information in the provisioning process. In conventional methods of provisioning a mobile wallet, the mobile wallet provider (e.g., 130) will generally determine if the account is already verified with another service provided by the mobile wallet provider (e.g., 130) and if the mobile device (e.g., 120) has been rooted or jailbroken. For example, if the mobile wallet provider (e.g., 130) is Apple Pay, and the user (e.g., 110) has already registered the account (e.g., a credit card) in Apple iTunes, then Apple will determine that the provisioning of the account in Apple Pay is low risk if the mobile device (e.g., 120) is not jailbroken. If the mobile device (e.g., 120) is jailbroken, Apple will determine that the provisioning of the account in Apple Pay is high risk and block the provisioning. If the account is new to Apple and has not been used previously, such as in iTunes, Apple will determine that there is medium risk and use a call center to call and authenticate the user (e.g., 110) in order to verify that the user (e.g., 110) is authorized to provision the account on the mobile device (e.g., 120). In some cases, Apple sends the provisioning request to a token service provider (e.g., 150) associated with the card (e.g., the Visa network for a Visa card) and/or a financial institution (e.g., 160) maintaining the account, which will often use a call center to call and authenticate the user (e.g., 110), unless the account has been closed or blocked from future transactions, in which case the provisioning request is blocked. In the case of medium risk, call centers are typically used to attempt to authenticate the user (e.g., 110) and prevent fraud. However, call centers are expensive and are subject to fraud by adept fraudsters. Further, users (e.g., 110) often do not want to use call centers to authenticate when attempting to provision an account.

In many embodiments, risk determination system 170 can advantageously help address the cases that are conventionally considered medium risk and sent to call centers for further authentication. In several of these "medium risk" cases, risk determination system 170 can determine that the risk of fraud is low so that the provisioning request does not warrant further authentication. In other of these "medium risk" cases, risk determination system 170 can determine that the risk of fraud is high so that the provisioning request should likely be blocked. In other cases, risk determination system 170 can determine that the risk of fraud is still medium and should involve further authentication, but the number of such cases can be less than when using conventional methods. In many embodiments, the implementation of solutions involving risk determination system 170 can be necessarily rooted in computer technology. For example, the aggregation of the data, particularly on the scale of hundreds of thousands, millions, tens of millions, or hundreds of millions of accounts and/or mobile device can be infeasible without computer technology. Further, the response time, such as real-time responses and/or real-time call-outs can be infeasible without computer technology.

Figure 2:
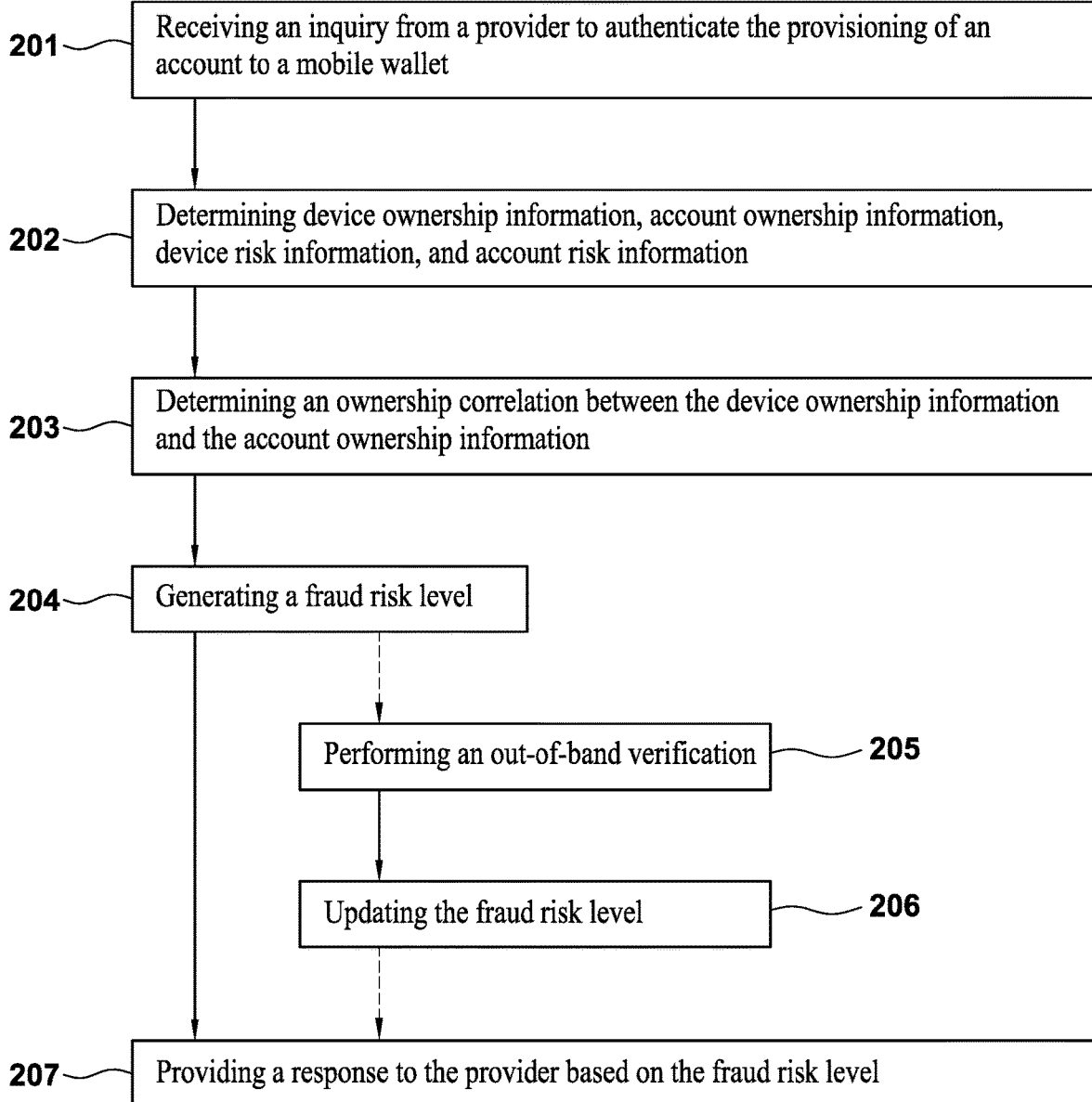
FIG. 2 illustrates a flow chart for a method, according to an embodiment.

Turning ahead in the drawings, FIG. 2 illustrates a flow chart for a method 200. In some embodiments, method 200 can be a method of determining a risk level in provisioning an account to a mobile wallet. Method 200 is merely exemplary and is not limited to the embodiments presented herein. Method 200 can be employed in many different embodiments or examples not specifically depicted or described herein. In some embodiments, the procedures, the processes, and/or the activities of method 200 can be performed in the order presented. In other embodiments, the procedures, the processes, and/or the activities of method 200 can be performed in any suitable order. In still other embodiments, one or more of the procedures, the processes, and/or the activities of method 200 can be combined or skipped. In some embodiments, method 200 can be performed by risk determination system 170 (FIG. 1).

Referring to FIG. 2, method 200 can include a block 201 of receiving an inquiry from a provider to authenticate the provisioning of an account to a mobile wallet. The mobile wallet can be similar or identical to mobile wallet 121 (FIG. 1). In various embodiments, the account can be at least one of a demand deposit account, a debit card account, or a credit card account. In many embodiments, the provider can be at least one of a mobile wallet provider for the mobile wallet, a financial institution that maintains the account, a token service provider that provides tokenization services for the mobile wallet provider, or a mobile network operator that provides mobile network services for the mobile device. The mobile wallet provider can be similar or identical to mobile wallet provider 130 (FIG. 1). The financial institution can be similar or identical to financial institution 160 (FIG. 1). The token service provider can be similar or identical to token service provider 150 (FIG. 1). The mobile network operator can be similar or identical to mobile network operator 140 (FIG. 1).

Figure 5:
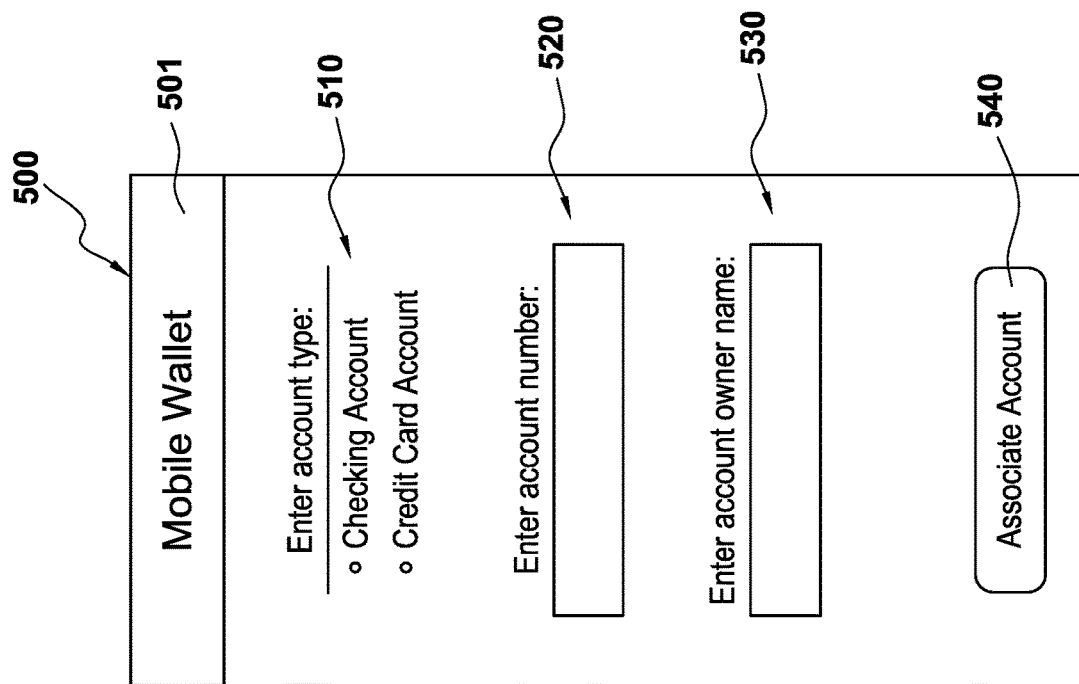
FIG. 5 illustrates an exemplary user interface display to allow the user of FIG. 1 to request associating an account with the mobile wallet of FIG. 1 on the mobile device of FIG. 1, according to an embodiment.

As an example, a user (e.g., user 110 (FIG. 1)) can attempt to provision an account (e.g., a credit card) to a mobile wallet (e.g., in a mobile device (e.g., mobile device 120 (FIG. 1)) of the user, such as by using user interface display 500, as shown in FIG. 5 and described below. The provisioning request can be sent by the mobile wallet (e.g., 121 (FIG. 1)) from the mobile device (e.g., 120 (FIG. 1) to the mobile wallet provider (e.g., 130 (FIG. 1)). In some embodiments, mobile wallet provider 130 (FIG. 1) can be separate from the mobile network operator 140 (FIG. 1), token service provider 150 (FIG. 1), and financial institution 160 (FIG. 1). In other embodiments, mobile wallet provider 130 (FIG. 1) can be part of, or managed by, one of the other entities. For example, if mobile wallet provider 130 (FIG. 1) is Chase Pay, then financial institution 160 (FIG. 1) can be Chase Bank, and mobile wallet provider 130 (FIG. 1) can be part of financial institution 160 (FIG. 1). In other examples, mobile wallet provider 130 can be part of or controlled by mobile network operator 140 (FIG. 1), or token service provider 150 (FIG. 1).

In many embodiments, mobile wallet provider 130 (FIG. 1) can be the provider sending the inquiry that is received by risk determination system 170 (FIG. 1) in block 201. In other embodiments, after mobile wallet provider 130 (FIG. 1) receives the provisioning request, it can send one or more requests for information, provisioning, or authentication to other entities, such as mobile network operator 140 (FIG. 1), token service provider 150 (FIG. 1), and/or financial institution 160 (FIG. 1), after which the one or more entities that received the one or more requests can send the inquiry that is received by risk determination system 170 (FIG. 1) in block 201. As an example, mobile wallet provider 130 (FIG.

1) can receive the provisioning request and can send the provisioning request to token service provider 150 (FIG. 1), after which token service provider 150 (FIG. 1) can send the inquiry to risk determination system 170 (FIG. 1) that is received in block 201. As another example, mobile wallet provider 130 (FIG. 1) can receive the provisioning request and can send the provisioning request to token service provider 150 (FIG. 1), after which token service provider 150 (FIG. 1) can send to financial institution 160 (FIG. 1) a request for information in order to authenticate the account, after which financial institution 160 (FIG. 1) can then send the inquiry that is received in block 201 to risk determination system 170 (FIG. 1). In yet another example, mobile wallet provider 130 (FIG. 1) can send a request to financial institution 160 (FIG. 1), which can then send the inquiry that is received in block 201 to risk determination system 170 (FIG. 1). In still other examples, the inquiry received in block 201 can be received based on other processing flows of the provisioning transaction.

In some embodiments, the inquiry can include multiple inquiries from one or more systems, such as mobile wallet provider 130 (FIG. 1), mobile network operator 140 (FIG. 1), token service provider 150 (FIG. 1), and/or financial institution 160 (FIG. 1). For example, in some embodiments, after mobile wallet provider 130 (FIG. 1) receives a provisioning request, mobile wallet provider 130 (FIG. 1) can send sent a request to mobile network operator 140 (FIG. 1) to authenticate that user 110 (FIG. 1) is the owner of mobile device 120 (FIG. 1), and mobile network operator 140 (FIG. 1) can send part of the inquiry to risk determination system 170 (FIG. 1) that is received in block 201. Further, mobile wallet provider 130 (FIG. 1) can send a request to token service provider 150 (FIG. 1). In many embodiments, token service provider 150 (FIG. 1) can send part of the inquiry to risk determination system 170 (FIG. 1) that is received in block 201. In many embodiments, risk determination system 170 (FIG. 1) can be separate from mobile wallet provider 130 (FIG. 1), mobile network operator 140 (FIG. 1), token service provider 150 (FIG. 1), and financial institution 160 (FIG. 1). In other embodiments, risk determination system 170 (FIG. 1) can be part of, or managed by an entity that manages one of, mobile wallet provider 130 (FIG. 1), mobile network operator 140 (FIG. 1), token service provider 150 (FIG. 1), and/or financial institution 160 (FIG. 1).

In some embodiments, the inquiry received in block 201 can include account information about the account and/or device information about a mobile device that operates that mobile wallet. In many embodiments, the mobile device can be similar or identical to mobile device 120 (FIG. 1)). In many embodiments, the account information can include information about the account that the user (e.g., 110 (FIG. 1)) is attempting to provision. For example, when the user (e.g., 110 (FIG. 1)) attempts to add an account, such as a credit card to a mobile wallet (e.g., 120 (FIG. 1)), the user (e.g., 110 (FIG. 1)) can be asked to input account information, and this account information can be sent to risk determination system 170 (FIG. 1) in the inquiry received in block 201. For example, the account information can include the primary account number (PAN); the first, middle and last name of the account owner; the street address, city, state, and ZIP code of the residence of the account owner; and/or other information of the account owner, such as email address, phone number, or other personally identifiable information (PII), such as driver's license number, birth date, birthplace, social security number, etc.

In several embodiments, the device information can include information about the mobile device (e.g., 120 (FIG. 1)) of the user (e.g., 110 (FIG. 1)), information about the mobile wallet (e.g., 121 (FIG. 1)) on the mobile device (e.g., 120 (FIG. 1)), and/or information about the provisioning request on the mobile wallet (e.g., 121 (FIG. 1)). For example, the device information can include the information about the identity of the mobile wallet provider (e.g., 130 (FIG. 1)); a wallet provider identifier (ID), which can be hashed in many embodiments; a secure element ID, if the mobile device (e.g., 120 (FIG. 1)) includes a secure element (e.g., a tamper-resistant security/cryptographic chip/processing element); a device ID; a SIM (subscriber identity mobile) ID; the full phone number of the mobile device (e.g., 120 (FIG. 1)); device fingerprint (e.g., information about the operating system and software running on the mobile device (e.g., 120 (FIG. 1)), and/or unique identifiers on the mobile device (e.g., 120 (FIG. 1)), such as the MAC (media access control) address or other unique serial numbers assigned to the mobile device); the date and time (e.g., timestamp) of the provisioning request; information about the type of provisioning record/request (e.g., adding an account, changing an account, deleting an account, etc.); and/or other suitable information.

Figure 3:
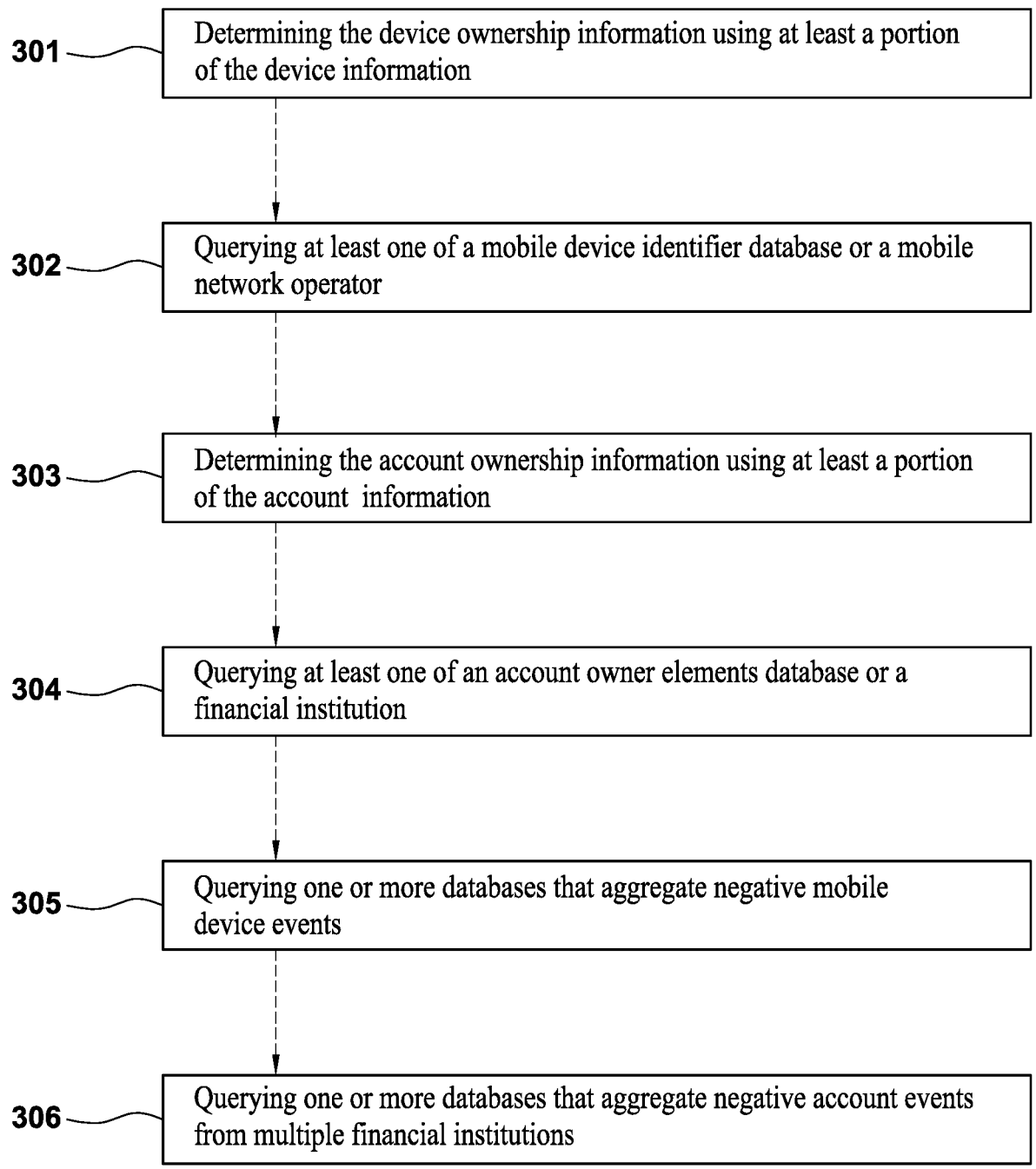
FIG. 3 illustrates a flow chart of a block of the method of FIG. 2 of determining device ownership information for a mobile device that operates the mobile wallet, account ownership information for the account, device risk information associated with the mobile device, and account risk information associated with the account, according to an embodiment.

In a number of embodiments, method 200 also can include a block 202 of determining device ownership information for the mobile device that operates the mobile wallet, account ownership information for the account, device risk information associated with the mobile device, and account risk information associated with the account. In various embodiments, device ownership information can include information about the actual owner of the mobile device (e.g., 120 (FIG. 1). In several embodiments, account ownership information can include information about the actual owner of the account. In many embodiments, device risk information can include information about known risks or historical negative events that involved mobile device 120 (FIG. 1). In several embodiments, account risk information can include information about known risks or historical negative events that involved the account and/or the account owner. In some embodiments, block 202 can be implemented as shown in FIG. 3 and described below.

In several embodiments, method 200 additionally can include a block 203 of determining an ownership correlation between the device ownership information and the account ownership information. The ownership correlation can be based on a determination of whether the actual owner of the mobile device (e.g., 120 (FIG. 1)) is the same as the actual owner of the account. For example, if the actual owner of the mobile device (e.g., 120 (FIG. 1)) is the same as the actual owner of the account, there can be an ownership correlation, but if the actual owner of the mobile device (e.g., 120 (FIG. 1)) is not the same as the actual owner of the account, then there can be a lack of ownership correlation. Sometimes, the account ownership information and/or the device ownership information can involve a family plan or corporate plan for a mobile device (e.g., 120 (FIG. 1)), or authorized users for an account (e.g., a business account with authorized users), and the ownership correlation can determine whether there is a correlation between authorized individuals for the account and the mobile device (e.g., 120 (FIG. 1)). In such cases, even though the actual owner of the mobile device (e.g., 120 (FIG. 1)) is not the same as the actual owner of the account, then there can be a lack of ownership correlation, there can be an ownership correlation, based on the family plan or corporate plan for the mobile device (e.g., 120 (FIG. 1)), and/or based on the authorized users for an account (e.g., a business account with authorized users).

In a number of embodiments, method 200 further can include a block 204 of generating a fraud risk level by applying business rules and one or more statistical modeling techniques to at least a portion of the ownership correlation, the device risk information, and the account risk information. In many embodiments, risk determination system can perform business rules to help determine a risk of fraud. For example, a business rule can be that the owner (or authorized user) of the mobile device (e.g., 120 (FIG. 1)) must be the same as the owner (or authorized user) of the account. The ownership correlation can be used to determine whether this business rule is satisfied. In some embodiments, other or additional business rules can be used. The business rules can define one or more fraud risks based on at least a portion of the ownership correlation, the device risk information, and the account risk information. For example, in many embodiments, the business rules can be rules provided and/or imposed by one or more of the businesses involved with the provisioning, such as mobile wallet provider 130 (FIG. 1), mobile network operator 140 (FIG. 1), token service provider 150 (FIG. 1), and/or financial institution 160 (FIG. 1). In other embodiments, the business rules can be developed internally for risk determination system 170 (FIG. 1), and can be based on the knowledge and experience of the owners and/or operators of risk determination system 170 (FIG. 1). A further example of a business rule can be, "if the ownership of the mobile device has changed in the last 3 months, then flag the provisioning request for further investigation." Yet another example of a business rule can "if the account ownership is less than 3 months old, then return all the negative information related to the account owner in the response."

In many embodiments, risk determination system 170 can perform statistical modeling techniques, such as machine algorithms, to determine the fraud risk level. The machine algorithms can identify patterns that indicate likely fraud, and use those patterns to detect when a provisioning request likely is fraudulent. For example, the machine algorithms can "learn" that, when the user (e.g., 110 (FIG. 1)) changes the home address on the account, but the home address information known to the mobile network operator (e.g., 140 (FIG. 1)) does not change, then there is an 85% chance of fraud. Accordingly, the machine algorithm can flag the provisioning request if those parameters are met. The machine algorithms can change over time as the machine "learns" more and more. In some embodiments, the machine algorithms can include statistical modeling techniques, such as logistic regression. In the same or other embodiments, the machine algorithms can include machine learning algorithms, such as clustering, neural networks, or other suitable machine learning algorithms.

In many embodiments, the business rules and/or one or more statistical modeling techniques can use various pieces of information as inputs, such as the ownership correlation, the device risk information, the account risk information, and/or other information obtained by or determined by risk determination system 170 (FIG. 1). Examples of additional information that can be used by risk determination system 170 (FIG. 1) can include information about mobile device 120 (FIG. 1), such as account status (active, shut-down, canceled, etc.); if mobile device 120 (FIG. 1) is rooted or jailbroken; changes to mobile device 120 (FIG. 1), such as a change of the mobile network operator (e.g., 140 (FIG. 1)) that is associated with mobile device 120 (FIG. 1), a change of ownership, a change of SIM cards, etc.; data from mobile device 120 (FIG. 1), such as device information (e.g., applications on the device, data used, device fingerprint, etc.) collected by collector software in mobile wallet 121 (FIG. 1); data from mobile network operator 140 (FIG. 1) about user 110 (FIG. 1), such as CRM (customer relationship management data), including name, address, status of the device, if the device has been ported (i.e., the same phone number moved to a new mobile device (e.g., 120 (FIG. 1)), etc.; the device information and account information included in the inquiry; information obtained from mobile wallet provider 130 (FIG. 1), mobile network operator 140 (FIG. 1), token service provider 150 (FIG. 1), and/or financial institution 160 (FIG. 1); information available in databases within risk determination system 170 (FIG. 1), as shown in FIG. 4 and described below; and/or other suitable information.

In a number of embodiments, the business rules and/or one or more statistical modeling techniques can be applied to some, but not all of the information listed above. In other embodiments, all of the information listed above can be used as inputs to the business rules and/or one or more statistical modeling techniques. In some embodiments, the business rules and/or one or more statistical modeling techniques can be performed in a step-wise fashion on various different inputs. In one example, the business rules can be used on certain types of information and the statistical modeling techniques can be used on different types of information. In many embodiments, the inputs can be weighted in the machine algorithms, such that certain pieces of information have a greater effect on the output than other pieces of information. In some embodiments, the risk determination performed by risk determination system 170 (FIG. 1) can depend on who the provider is and at what point of the provisioning process the provider sends the inquiry to risk determination system 170 (FIG. 1).

In several embodiments, the business rules and/or one or more statistical modeling techniques can generate as output one or more pieces of information, which can, in some embodiments, include a fraud risk level. In many embodiments, the fraud risk level can be represented by a risk score, such as numeric score, an alphabetical score, a color score (e.g., green for low risk, yellow for medium risk, or red for high risk), or another suitable type of score. In some embodiments, a low fraud risk level can indicate that no negative or suspicious events were associated with the account, the mobile device (e.g., 120 (FIG. 1)), and/or the provisioning request. In several embodiments, a medium fraud risk level can indicate that there are some negative or suspicious events that were associated with the account, the mobile device (e.g., 120 (FIG. 1)), and/or the provisioning request. In many embodiments, a high risk level can indicate that there are major risks associated with the account, the mobile device (e.g., 120 (FIG. 1)), and/or the provisioning request, such as a credit card being compromised, an account having negative history, or a phone number of the mobile device (e.g., 120 (FIG. 1)) that does not match the phone number associated with the account.

In some embodiments, the outputs of the business rules and/or one or more statistical modeling techniques can include additional information to explain the reason for the risk score, such as factors that were relevant to generating the risk score, raw data that was relevant in generating the risk score, the results of execution of one or more business rules that resulted in the risk score, the results of the machine algorithm that resulted in the risk score, or other information that resulted in the risk score, such as an identification of the portions of the device ownership information that were relevant to determining the risk score, the account ownership information, the device risk information, the account risk information, and/or the ownership correlation.

In several embodiments, method 200 optionally can include a block 205 of performing an out-of-band verification based on the fraud risk level. In some embodiments, block 205 is performed only if the fraud risk level is medium risk. In other embodiments, block 205 can be performed if the fraud risk level is medium or high risk. In many embodiments, the out-of-band verification can involve contacting the user (e.g., 110) through a different channel of communication than the channel through which the provisioning request was initiated. For example, the user (e.g., 110) can be contacted by phone, email, text message, or another suitable method using contact information previously stored for the user at one or more of mobile wallet provider 130 (FIG. 1), mobile network operator 140 (FIG. 1), token service provider 150 (FIG. 1), financial institution 160 (FIG. 1), and/or risk determination system 170 (FIG. 1) to determine that the user (e.g., 110) that initiated the provisioning request is the same person as the user is purported to be in the provisioning request.

In a number of embodiments, method 200 can include, after block 205, a block 206 of updating the fraud risk level based on the out-of-band verification. For example, if the out-of-band verification determines that the user is legitimate (e.g., not likely a fraudster), the fraud risk level can be updated to be lowered to low risk. If the out-of-band verification determines that the user is not legitimate, the fraud risk level can be updated to be raised to high risk.

Figure 6:
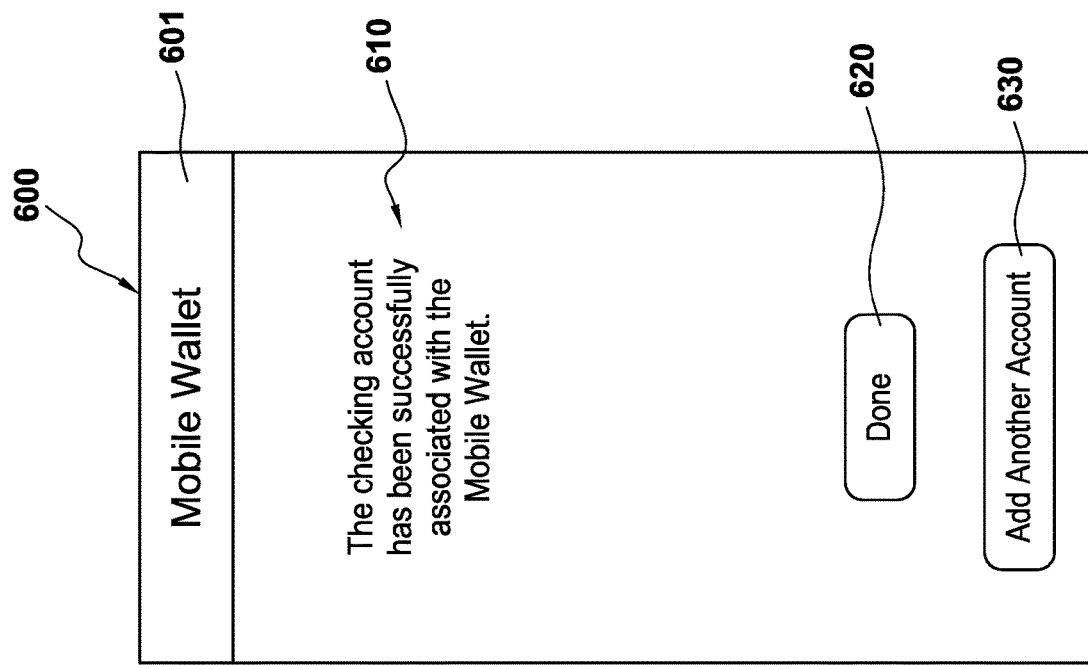
FIG. 6 illustrates an exemplary user interface display to display to the user of FIG. 1 the results of the provisioning request initiated using the user interface display of FIG. 5, according to an embodiment.

In several embodiments, method 200 additionally can include a block 207 of providing a response to the provider based on the fraud risk level, such that the provider sends to the mobile device information about the provisioning of the account to the mobile wallet, and such that the mobile wallet updates a user interface display on the mobile device based on the information about the provisioning of the account to the mobile wallet. In many embodiments, the response can include the fraud risk level and other outputs of the business rules and/or one or more statistical modeling techniques. In some embodiments, the response can include a risk score, as explained above, and in many embodiments can include one or more factors that indicate reasons for the risk score. In many embodiments, after the provider receives the response, the provider can determine how to handle the provisioning request. For example, the provider can successfully complete the provisioning request if the fraud risk level is low; can perform additional authentication if the fraud risk level is medium; and can block the provisioning request if the fraud risk level is high. In many embodiments, the response to the provider of a medium fraud risk level can be eliminated by risk determination system 170 performing the out-of-band verification in block 205 and updating the fraud risk level in block 206. In other embodiments, blocks 205 and 206 are not performed by risk determination system 170 (FIG. 1), and additional verification is performed by the provider after receiving a certain type of response, such as a medium fraud risk level response. In a number of embodiments, the information sent from the provider to the mobile device can include the outcome of the provisioning request. In several embodiments, the user interface display on the mobile device can be similar or identical to user interface display 600, as shown in FIG. 6 and described below.

Turning ahead in the drawings, FIG. 3 illustrates a flow chart of a block 202 of determining device ownership information for a mobile device that operates the mobile wallet, account ownership information for the account, device risk information associated with the mobile device, and account risk information associated with the account, according to an embodiment. Block 202 is merely exemplary and is not limited to the embodiments presented herein. Block 202 can be employed in many different embodiments or examples not specifically depicted or described herein. In some embodiments, the procedures, the processes, and/or the activities of block 202 can be performed in the order presented. In other embodiments, the procedures, the processes, and/or the activities of block 202 can be performed in any suitable order. In still other embodiments, one or more of the procedures, the processes, and/or the activities of block 202 can be combined or skipped.

Referring to FIG. 3, in some embodiments, block 202 optionally can include a block 301 of determining the device ownership information using at least a portion of the device information. The device information can be received in the inquiry, as described above.

In a number of embodiments, block 202 also optionally can include a block 302 of querying at least one of a mobile device identifier database or a mobile network operator that provides mobile network services for the mobile device to determine the device ownership information. The mobile device identifier database can be similar or identical to mobile device identifier database 406, as shown in FIG. 4 and described below. The mobile network operator can be similar or identical to mobile network operator 140 (FIG. 1). For example, risk determination system 170 (FIG. 1) can determine the device ownership information by querying information in the mobile device identifier database and/or making a call out, such as in real-time, to mobile network operator 140 (FIG. 1) to receive current device ownership information from mobile network operator 140 (FIG. 1).

In many embodiments, determining the device ownership information in block 202 (FIG. 2) can include only one of block 301 of determining the device ownership information using at least a portion of the device information or block 302 of querying at least one of a mobile device identifier database or a mobile network operator that provides mobile network services for the mobile device to determine the device ownership information. In other embodiments, determining the device ownership information in block 202 (FIG. 2) can include both of block 301 of determining the device ownership information using at least a portion of the device information and block 302 of querying at least one of a mobile device identifier database or a mobile network operator that provides mobile network services for the mobile device to determine the device ownership information. For example, the device ownership information received from the mobile device identifier database and/or the mobile network operator can supplement and/or correct the device ownership information determined using at least a portion of the device information.

In several embodiments, block 202 additionally optionally can include a block 303 of determining the account ownership information using at least a portion of the account information. The account information can be received in the inquiry, as described above.

In a number of embodiments, block 202 further optionally can include a block 304 of querying at least one of an account owner elements database or a financial institution that maintains the account to determine the account ownership information. The account owner elements database can be similar or identical to account owner elements database 407, as shown in FIG. 4 and described below. The financial institution can be similar or identical to financial institution 160 (FIG. 1). For example, risk determination system 170 (FIG. 1) can determine the account ownership information by querying information in the account owner elements database and/or making a call out, such as in real-time to financial institution 160 (FIG. 1) to receive current account ownership information from financial institution 160 (FIG. 1).

In many embodiments, determining the account ownership information in block 202 (FIG. 2) can include only one of a block 303 of determining the account ownership information using at least a portion of the account information or block 304 of querying at least one of an account owner elements database or a financial institution that maintains the account to determine the account ownership information. In other embodiments, determining the account ownership information in a block 303 of determining the account ownership information using at least a portion of the account information and block 304 of querying at least one of an account owner elements database or a financial institution that maintains the account to determine the account ownership information. For example, the account ownership information received from the account owner elements database and/or the financial institution can supplement and/or correct the account ownership information determined using at least a portion of the account information.

In several embodiments, block 202 additionally optionally can include a block 305 of querying one or more databases that aggregate negative mobile device events. The one or more databases that aggregate negative mobile device events can be similar or identical to negative mobile device events database 408, as shown in FIG. 4 and described below. In many embodiments, the information obtained from the one or more databases that aggregate negative mobile device events can be used at least in part to determine the device risk information. For example, risk determination system 170 (FIG. 1) can determine the device risk information by querying information in negative mobile device events database 408 (FIG. 4).

In a number of embodiments, block 202 further optionally can include a block 306 of querying one or more databases that aggregate negative account events from multiple financial institutions. The one or more databases that aggregate negative account events from multiple financial institutions can be similar or identical to negative account events database 409, as shown in FIG. 4 and described below. In many embodiments, the information obtained from the one or more databases that aggregate negative account events can be used at least in part to determine the account risk information. For example, risk determination system 170 (FIG. 1) can determine the account risk information by querying information in negative account events database 409 (FIG. 4).

Turning ahead in the drawings, FIG. 4 illustrates a block diagram of risk determination system 170 that can be employed for facilitating a risk determination as part of provisioning an account to a mobile wallet (e.g., 121 (FIG. 1)), according to an embodiment. Risk determination system 170 is merely exemplary, and embodiments of the risk determination system are not limited to the embodiments presented herein. The risk determination system can be employed in many different embodiments or examples not specifically depicted or described herein. In some embodiments, certain elements or modules of risk determination system 170, as shown in FIG. 4, can perform various procedures, processes, and/or activities. In other embodiments, the procedures, processes, and/or activities can be performed by other suitable elements or modules of risk determination system 170.

In several embodiments, risk determination system 170 can include a communication system 401, a querying system 402, an ownership system 403, a risk generation system 404, a verification system 405, a mobile device identifier database 406, an account owner elements database 407, a negative mobile device events database 408, and/or a negative account events database 409.

In many embodiments, communication system 401 can at least partially perform block 201 (FIG. 2) of receiving an inquiry from a provider to authenticate the provisioning of an account to a mobile wallet, and/or block 207 (FIG. 2) of providing a response to the provider based on the fraud risk level.

In a number of embodiments, querying system 402 can at least partially perform block 202 (FIG. 2) of determining device ownership information for a mobile device that operates the mobile wallet, account ownership information for the account, device risk information associated with the mobile device, and account risk information associated with the account; block 301 (FIG. 3) of determining the device ownership information using at least a portion of the device information; block 302 (FIG. 3) of querying at least one of a mobile device identifier database or a mobile network operator that provides mobile network services for the mobile device; block 303 (FIG. 3) of determining the account ownership information using at least a portion of the account information; block 304 (FIG. 3) of querying at least one of an account owner elements database or a financial institution that maintains the account; block 305 (FIG. 3) of querying one or more databases that aggregate negative mobile device events; and/or block 306 (FIG. 3) of querying one or more databases that aggregate negative account events from multiple financial institutions.

In several embodiments, ownership system 403 can at least partially perform block 203 (FIG. 2) of determining an ownership correlation between the device ownership information and the account ownership information.

In a number of embodiments, risk generation system 404 can at least partially perform block 204 (FIG. 2) of generating a fraud risk level by applying business rules and one or more statistical modeling techniques to at least a portion of the ownership correlation, the device risk information, and the account risk information.

In several embodiments, verification system 405 can at least partially perform block 205 (FIG. 2) of performing an out-of-band verification based on the fraud risk level, and/or block 206 (FIG. 2) of updating the fraud risk level based on the out-of-band verification.

In a number of embodiments, mobile device identifier database 406 can include information about mobile devices (e.g., mobile device 120 (FIG. 1)), such as mobile network service provider account data and mobile device data. The mobile network service provider account data can include information such as mobile device account numbers, PII for mobile device account holders, current mobile device account status (e.g., good standing, closed, reported stolen, etc.), phone number changes, service provider changes, and/or other suitable information The mobile device data can include SIM card status, changes in location (e.g., roaming, home, international), device ID, device status, biometrics, previous verification information for the mobile device (e.g., 120 (FIG. 1)), phone number, and/or other suitable information. In some embodiments, the information in mobile device identifier database 406 can be updated periodically from data received from mobile network operators (e.g., mobile network operator 140 (FIG. 1)), and/or can be obtained through real-time call-outs to one or more mobile network operators (e.g., mobile network operator 140 (FIG. 1).

In several embodiments, account owner elements database 407 can include account information, such as PII and account attributes, which can be aggregated from one or more financial institutions (e.g., 160 (FIG. 1). In many embodiments, the account information can be aggregated from multiple financial institutions. The PII can include the first, middle and last name of account holders; the street address, city, state, and ZIP code of the residence of the account holders; and/or other information of the account holders, such as email address, phone number, driver's license number, birth date, birthplace, social security number, etc. The account attributes can include information about each of the accounts, such as the type of account (e.g., credit card account), the account ID, the date on which the account was opened, previous changes to the account, the name of the financial institution (e.g., 160 (FIG. 1)) that maintains the account, the balance in the account, information about declined or approved account applications, information about previous authentication of the account owner, previous changes to credit limits, additional account holders on the account, previous address changes on the account, reported income, Metro 2 files (i.e., information sent from financial institutions to credit bureaus about credit card accounts), cross-reference information linking card account numbers (e.g., debit card numbers) to underlying account numbers (e.g., checking account numbers), and/or other suitable information. In some embodiments, the information in account owner elements database 407 can be updated periodically from data received from financial institutions (e.g., financial institution 160 (FIG. 1)), and/or can be obtained through real-time call-outs to one or more financial institution (e.g., financial institution 160 (FIG. 1)).

In a number of embodiments, negative mobile device events database 408 can include information about mobile devices (e.g., 120 (FIG. 1)) that have been reported stolen, information about stolen SIM cards, information about fraudulent use by mobile devices (e.g., 120 (FIG. 1)) for payments, account applications, or other transactions, information about negative account activity, previous provisioning activity on the mobile device (e.g., 120 (FIG. 1)) that resulted in fraud, and/or information about other negative events associated with a mobile device (e.g., 120 (FIG. 1)).

In several embodiments, negative account events database 409 can include negative events recorded, common points of purchase data, credit card abuse data, third-party fraud contribution data, and/or other suitable information about negative account activity. The negative events recorded can include returned checks, not sufficient funds, previous fraudulent activity, etc. The common points of purchase data can include accounts that have possibly been compromised, as determined based on whether the account was present at a time and location (e.g., a merchant) in which other accounts (including accounts maintained by other financial institutions) have been compromised (e.g., Target data breach, Internal Revenue Service (IRS) data breaches, or other fraudulent activity). The credit card abuse data can include PII of credit card holders and information about charge-offs, credit being revoked, principal balance utilization abuse, customer disputes, loss fees and interest, and/or other suitable information. The third party fraud contribution data can include PII of the card holders and information about lost cards, stolen cards, fraudulent credit card applications, account takeovers, counterfeit cards, and/or other suitable information.

In many embodiments, the systems and method of authentication and fraud prevention in provisioning a mobile wallet can beneficially provide a significant reduction in the level of third-party fraud originating from mobile wallets (e.g., 120 (FIG. 1)). In several embodiments, the systems and method of authentication and fraud prevention in provisioning mobile wallet can advantageously use data collected from many different entities, such as through periodic reporting and/or real-time call-outs. In several embodiments, the systems and method of authentication and fraud prevention in provisioning a mobile wallet can beneficially use risk indicators, such as the risk of data compromise under the common points of purchase data and other negative event information contributed from multiple financial institution (e.g., financial institution 160 (FIG. 1)). In many embodiments, the information can be queried from databases (e.g., 406-409 (FIG. 4)) and/or obtained through real-time call-outs, and business rules and/or machine algorithms can be applied to the queries, such as individually or collectively. In several embodiments, the holistic use of data aggregated from several sources, including mobile wallet providers (e.g., 130 (FIG. 1)), mobile network operators (e.g., 140 (FIG. 1)), token service providers (e.g., 150 (FIG. 1)), and/or financial institutions 160 (FIG. 1) can more accurately predict the level of risk, which can significantly decrease the number of out-of-band verifications performed during the provisioning of an account to a mobile wallet.

Turning ahead in the drawings, FIG. 5 illustrates an exemplary user interface display 500 to allow a user (e.g., 110 (FIG. 1)) to request associating an account with a mobile wallet (e.g., 121 (FIG. 1)) on a mobile device (e.g., 120 (FIG. 1)). User interface display 500 is merely exemplary, and embodiments of the user interface display are not limited to the embodiments presented herein. The user interface display can be employed in many different embodiments or examples not specifically depicted or described herein, and can include other suitable elements. In many embodiments, mobile wallet 121 (FIG. 1) can provide an interface for display on mobile device 120 (FIG. 1), which can include user interface display 500. In a number of embodiments, the interface can allow user 110 (FIG. 1) to initiate a provisioning request, such as by interfacing with user interface display 500.

In a number of embodiments, user interface display 500 can include a title bar 501, an account type selector 510, an account number field 520, an account owner field 530, and/or a selection button 540. In many embodiments, title bar 501 can indicate include the name of the mobile wallet. In a number of embodiments, user interface display 500 can include various input fields, such as, for example, account type selector 510, account number field 520, and/or account owner field 530, through which user 110 (FIG. 1) can input information about the account to be provisioned to the mobile wallet. For example, account type selector 510 can allow user 110 (FIG. 1) to enter the type of the account, such as "Checking Account" or "Credit Card Account" for the account that user 110 (FIG. 1) would like to be associated with mobile wallet 121 (FIG. 1). As another example, account number field 520 can allow user 110 (FIG. 1) to enter the account number for the account that user 110 (FIG. 1) would like to be associated with mobile wallet 121 (FIG. 1). As yet another example, account owner field 530 can allow user 110 (FIG. 1) to enter the name of the account owner for the account that user 110 (FIG. 1) would like to be associated with mobile wallet 121 (FIG. 1). In other embodiments, the input fields in user interface display 500 can include additional or other suitable input fields. In several embodiments, selection button 540 can include a description of the action that is requested by selecting selection button 540, such as "Associate Account." In many embodiments, once user 110 (FIG. 1) has entered the requested information in the input fields (e.g., 510, 520, 530), user 110 (FIG. 1) can select selection button 540 to request provisioning of the account that user 110 (FIG. 1) would like to be associated with mobile wallet 121 (FIG. 1), and mobile wallet 121 (FIG. 1) can send the request from mobile device 120 (FIG. 1) to mobile wallet provider 130 (FIG. 1).

Turning ahead in the drawings, FIG. 6 illustrates an exemplary user interface display 600 to display to a user (e.g., 110 (FIG. 1)) the results of the provisioning request initiated using user interface display 500 (FIG. 5). User interface display 600 is merely exemplary, and embodiments of the user interface display are not limited to the embodiments presented herein. The user interface display can be employed in many different embodiments or examples not specifically depicted or described herein, and can include other suitable elements. User interface display 600 can be similar to user interface display 500 (FIG. 5), and various elements of user interface display 600 can be similar or identical to various elements of user interface display 500 (FIG. 5). In many embodiments, the interface provided by mobile wallet 121 (FIG. 1) on mobile device 120 (FIG. 1) can include user interface display 600. In a number of embodiments, the interface can display to user 110 (FIG. 1) the results of the provisioning request, such as through user interface display 600.

In a number of embodiments, user interface display 600 can include a title bar 601, a provisioning outcome field 610, a completion selection button 620, and/or a repeat selection button 630. In many embodiments, title bar 601 can indicate include the name of the mobile wallet. Title bar 601 can be similar or identical to title bar 501 (FIG. 5). In a number of embodiments, provisioning outcome field 610 can display information about the outcome of the provisioning request initiated by user 110 (FIG. 1) through user interface display 500 (FIG. 5). For example, provisioning outcome field 610 can display text indicating that "The Checking Account has been successfully associated with the Mobile Wallet." Alternatively, if the outcome of the provisioning request was unsuccessful, provisioning outcome field 610 can display text indicating that "The Checking Account was unable to be associated with the Mobile Wallet," and/or additional information about why the provisioning was unsuccessful and/or how to address the reasons for the unsuccessful provisioning. In many embodiments, once user 110 (FIG. 1) has read the information in provisioning outcome field 610, user 110 (FIG. 1) can select selection button 620 to complete the provisioning process, or can select selection button 630 to return to user display interface 500 (FIG. 5) to attempt to add another account to mobile wallet 121 (FIG. 1) (or to retry adding the same account to mobile wallet 121 (FIG. 1)).

Figure 7:
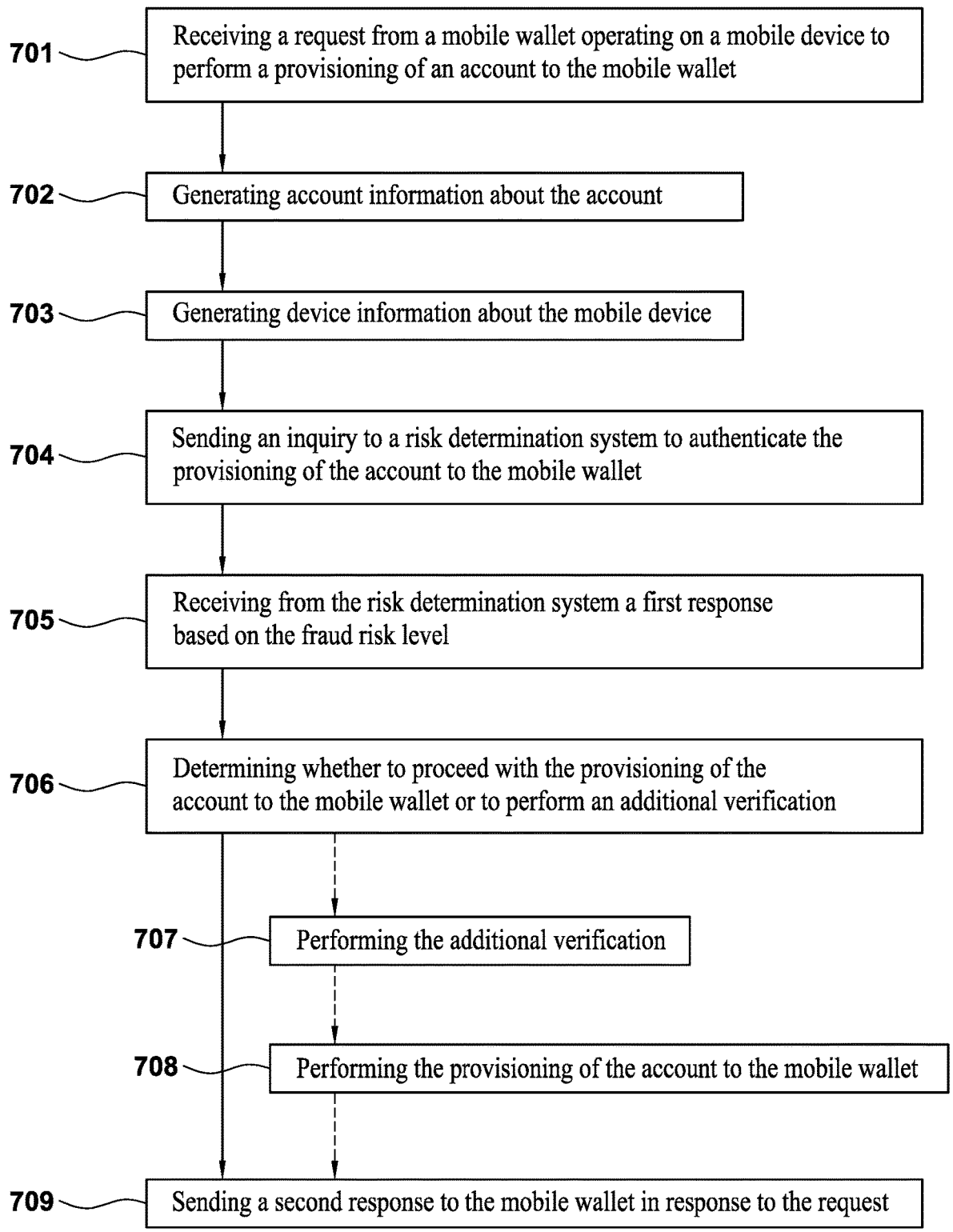
FIG. 7 illustrates a flow chart for a method, according to an embodiment.

Turning ahead in the drawings, FIG. 7 illustrates a flow chart for a method 700. In some embodiments, method 700 can be a method of determining a risk level in provisioning an account to a mobile wallet. Method 700 is merely exemplary and is not limited to the embodiments presented herein. Method 700 can be employed in many different embodiments or examples not specifically depicted or described herein. In some embodiments, the procedures, the processes, and/or the activities of method 700 can be performed in the order presented. In other embodiments, the procedures, the processes, and/or the activities of method 700 can be performed in any suitable order. In still other embodiments, one or more of the procedures, the processes, and/or the activities of method 700 can be combined or skipped. In some embodiments, method 700 can be performed by mobile wallet provider 130 (FIG. 1).

Referring to FIG. 7, method 700 can include a block 701 of receiving a request from a mobile wallet operating on a mobile device to perform a provisioning of an account to the mobile wallet. The mobile wallet can be similar or identical to mobile wallet 121 (FIG. 1). The mobile device can be similar or identical to mobile device 120 (FIG. 1). In many embodiments, the account can be at least one of a demand deposit account, a debit card account, or a credit card account. As an example, a user (e.g., user 110 (FIG. 1)) can attempt to provision an account (e.g., a credit card) to a mobile wallet (e.g., in a mobile device (e.g., mobile device 120 (FIG. 1)) of the user, such as by using user interface display 500 (FIG. 5). The provisioning request can be sent by the mobile wallet (e.g., 121 (FIG. 1)) from the mobile device (e.g., 120 (FIG. 1)), and received by the mobile wallet provider (e.g., 130 (FIG. 1)).

In a number of embodiments, method 700 also can include a block 702 of generating account information about the account. In many embodiments, the account information can include information about the account that the user (e.g., 110 (FIG. 1)) is attempting to provision. For example, when the user (e.g., 110 (FIG. 1)) attempts to add an account, such as a credit card to the mobile wallet (e.g., 120 (FIG. 1)), the user (e.g., 110 (FIG. 1)) can be asked to input account information, such as in the input fields (e.g., 510, 520, 530) in FIG. 5, and this account information can be sent by the mobile wallet (e.g., 121 (FIG. 1)) from the mobile device (e.g., 120 (FIG. 1)), and received by the mobile wallet provider (e.g., 130 (FIG. 1)) in the request received in block 701. In some embodiments, additional account information can be determined by the mobile wallet provider (e.g., 130 (FIG. 1)) using information already stored in the mobile wallet provider (e.g., 130 (FIG. 1)), based on the account information received in the request received in block 701 For example, the account information can include the primary account number (PAN); the first, middle and last name of the account owner; the street address, city, state, and ZIP code of the residence of the account owner; and/or other information of the account owner, such as email address, phone number, or other personally identifiable information (PII), such as driver's license number, birth date, birthplace, social security number, etc.

In several embodiments, method 700 additionally can include a block 703 of generating device information about the mobile device. In many embodiments, the device information can include information about the mobile device (e.g., 120 (FIG. 1)) of the user (e.g., 110 (FIG. 1)), information about the mobile wallet (e.g., 121 (FIG. 1)) on the mobile device (e.g., 120 (FIG. 1)), and/or information about the provisioning request on the mobile wallet (e.g., 121 (FIG. 1)). In various embodiments, some of this information can be received by the mobile wallet provider (e.g., 130 (FIG. 1)) from the mobile device (e.g., 120 (FIG. 1)) and/or the mobile wallet (e.g., 121 (FIG. 1)). For example, the device information can include the information about the identity of the mobile wallet provider (e.g., 130 (FIG. 1)); a wallet provider identifier (ID), which can be hashed in many embodiments; a secure element ID, if the mobile device (e.g., 120 (FIG. 1)) includes a secure element (e.g., a tamper-resistant security/cryptographic chip/processing element); a device ID; a SIM (subscriber identity mobile) ID; the full phone number of the mobile device (e.g., 120 (FIG. 1)); device fingerprint (e.g., information about the operating system and software running on the mobile device (e.g., 120 (FIG. 1)), and/or unique identifiers on the mobile device (e.g., 120 (FIG. 1)), such as the MAC (media access control) address or other unique serial numbers assigned to the mobile device); the date and time (e.g., timestamp) of the provisioning request; information about the type of provisioning record/request (e.g., adding an account, changing an account, deleting an account, etc.); and/or other suitable information.

In a number of embodiments, method 700 further can include a block 704 of sending an inquiry to a risk determination system to authenticate the provisioning of the account to the mobile wallet. The risk determination system can be similar or identical to risk determination system 170 (FIG. 1). In some embodiments, the inquiry can include the account information and the device information. In many embodiments, the risk determination system can generate a fraud risk level by applying business rules and one or more statistical modeling techniques to at least a portion of: (a) an ownership correlation between device ownership information for the mobile device and account ownership information for the account, (b) device risk information associated with the mobile device, and (c) account risk information associated with the account. In many embodiments, the inquiry can be sent directly to the risk determination system. In other embodiments, the inquiry can be sent to the risk determination system through at least one of a financial institution that maintains the account, a token service provider that provides tokenization services for the account, or a mobile network operator that provides mobile network services for the mobile device. The financial institution can be similar or identical to financial institution 160 (FIG. 1). The token service provider can be similar or identical to token service provider 150 (FIG. 1). The mobile network operator can be similar or identical to mobile network operator 140 (FIG. 1).

In various embodiments, the device ownership information can include information about the actual owner of the mobile device (e.g., 120 (FIG. 1). In many embodiments, the device ownership information can be determined by the risk determination system based on at least one of: (a) at least a portion of the device information, or (b) the risk determination system querying at least one of: (i) a mobile device identifier database in the risk determination system, or (ii) a mobile network operator that provides mobile network services for the mobile device.

In several embodiments, the account ownership information can include information about the actual owner of the account. In some embodiments, the account ownership information can be determined by the risk determination system based on at least one of: (1) at least a portion of the account information, or (b) the risk determination system querying at least one of: (i) an account owner elements database in the risk determination system, or (ii) a financial institution that maintains the account.

In some embodiments, the ownership correlation can be based on a determination of whether the actual owner of the mobile device (e.g., 120 (FIG. 1)) is the same as the actual owner of the account. For example, if the actual owner of the mobile device (e.g., 120 (FIG. 1)) is the same as the actual owner of the account, there can be an ownership correlation, but if the actual owner of the mobile device (e.g., 120 (FIG. 1)) is not the same as the actual owner of the account, then there can be a lack of ownership correlation. Sometimes, the account ownership information and/or the device ownership information can involve a family plan or corporate plan for a mobile device (e.g., 120 (FIG. 1)), or authorized users for an account (e.g., a business account with authorized users), and the ownership correlation can determine whether there is a correlation between authorized individuals for the account and the mobile device (e.g., 120 (FIG. 1)). In such cases, even though the actual owner of the mobile device (e.g., 120 (FIG. 1)) is not the same as the actual owner of the account, then there can be a lack of ownership correlation, there can be an ownership correlation, based on the family plan or corporate plan for the mobile device (e.g., 120 (FIG. 1)), and/or based on the authorized users for an account (e.g., a business account with authorized users).

In many embodiments, the device risk information can include information about known risks or historical negative events that involved the mobile device (e.g., 120 (FIG. 1)). In a number of embodiments, the device risk information can be determined by the risk determination system querying one or more databases in the risk determination system that aggregate negative mobile device events.

In several embodiments, the account risk information can include information about known risks or historical negative events that involved the account and/or the account owner. In some embodiments, the account risk information can be determined by the risk determination system querying one or more databases in the risk determination system that aggregate negative account events from multiple financial institutions.

In various embodiments, the business rules can define one or more fraud risks based on at least a portion of the ownership correlation, the device risk information, and the account risk information. For example, a business rule can be that the owner (or authorized user) of the mobile device (e.g., 120 (FIG. 1)) must be the same as the owner (or authorized user) of the account. The ownership correlation can be used to determine whether this business rule is satisfied. In some embodiments, other or additional business rules can be used. The business rules can define one or more fraud risks based on at least a portion of the ownership correlation, the device risk information, and the account risk information. For example, in many embodiments, the business rules can be rules provided and/or imposed by one or more of the businesses involved with the provisioning, such as mobile wallet provider 130 (FIG. 1), mobile network operator 140 (FIG. 1), token service provider 150 (FIG. 1), and/or financial institution 160 (FIG. 1). In other embodiments, the business rules can be developed for the risk determination system (e.g., 170 (FIG. 1)), and can be based on the knowledge and experience of the owners and/or operators of the risk determination system (e.g., 170 (FIG. 1)). A further example of a business rule can be, "if the ownership of the mobile device has changed in the last 3 months, then flag the provisioning request for further investigation." Yet another example of a business rule can "if the account ownership is less than 3 months old, then return all the negative information related to the account owner in the response."

In some embodiments, the one or more one or more statistical modeling techniques can include logistic regression. In many embodiments, machine algorithms can identify patterns that indicate likely fraud, and use those patterns to detect when a provisioning request likely is fraudulent. For example, the machine algorithms can "learn" that, when the user (e.g., 110 (FIG. 1)) changes the home address on the account, but the home address information known to the mobile network operator (e.g., 140 (FIG. 1)) does not change, then there is an 85% chance of fraud. Accordingly, the machine algorithm can flag the provisioning request if those parameters are met. The machine algorithms can change over time as the machine "learns" more and more. In some embodiments, the machine algorithms can include statistical modeling techniques, such as logistic regression. In the same or other embodiments, the machine algorithms can include machine learning algorithms, such as clustering, neural networks, or other suitable machine learning algorithms.

In many embodiments, the business rules and/or the one or more statistical modeling techniques can use various pieces of information as inputs, such as the ownership correlation, the device risk information, the account risk information, and/or other information obtained by or determined by the risk determination system (e.g., 170 (FIG. 1)). Examples of additional information that can be used by the risk determination system (e.g., 170 (FIG. 1)) can include information about the mobile device (e.g., 120 (FIG. 1)), such as account status (active, shut-down, canceled, etc.); if the mobile device (e.g., 120 (FIG. 1)) is rooted or jailbroken; changes to the mobile device (e.g., 120 (FIG. 1)), such as a change of the mobile network operator (e.g., 140 (FIG. 1)) that is associated with the mobile device (e.g., 120 (FIG. 1)), a change of ownership, a change of SIM cards, etc.; data from the mobile device (e.g., 120 (FIG. 1)), such as device information (e.g., applications on the device, data used, device fingerprint, etc.) collected by collector software in the mobile wallet (e.g., 121 (FIG. 1)); data from the mobile network operator (e.g., 140 (FIG. 1)) about the user (e.g., 110 (FIG. 1)), such as CRM (customer relationship management data), including name, address, status of the device, if the device has been ported (i.e., the same phone number moved to a new mobile device (e.g., 120 (FIG. 1)), etc.; the device information and account information included in the inquiry; information obtained from the mobile wallet provider (e.g., 130 (FIG. 1)), the mobile network operator (e.g., 140 (FIG. 1)), the token service provider (e.g., 150 (FIG. 1)), and/or the financial institution (e.g., 160 (FIG. 1)); information available in databases (e.g., 406-409 (FIG. 4)) within the risk determination system (e.g., 170 (FIGS. 1 and 4)); and/or other suitable information.

In a number of embodiments, the business rules and/or one or more statistical modeling techniques can be applied to some, but not all of the information listed above. In other embodiments, all of the information listed above can be used as inputs to the business rules and/or one or more statistical modeling techniques. In some embodiments, the business rules and/or one or more statistical modeling techniques can be performed in a step-wise fashion on various different inputs. In one example, the business rules can be used on certain types of information and the statistical modeling techniques can be used on different types of information. In many embodiments, the inputs can be weighted in the machine algorithms, such that certain pieces of information have a greater effect on the output than other pieces of information. In some embodiments, the risk determination performed by the risk determination system (e.g., 170 (FIG. 1)) can depend on who the provider is and at what point of the provisioning process the provider sends the inquiry to the risk determination system (e.g., 170 (FIG. 1)).

In several embodiments, the business rules and/or one or more statistical modeling techniques can generate as output one or more pieces of information, which can, in some embodiments, include a fraud risk level. In many embodiments, the fraud risk level can be represented by a risk score, such as numeric score, an alphabetical score, a color score (e.g., green for low risk, yellow for medium risk, or red for high risk), or another suitable type of score. In some embodiments, a low fraud risk level can indicate that no negative or suspicious events were associated with the account, the mobile device (e.g., 120 (FIG. 1)), and/or the provisioning request. In several embodiments, a medium fraud risk level can indicate that there are some negative or suspicious events that were associated with the account, the mobile device (e.g., 120 (FIG. 1)), and/or the provisioning request. In many embodiments, a high risk level can indicate that there are major risks associated with the account, the mobile device (e.g., 120 (FIG. 1)), and/or the provisioning request, such as a credit card being compromised, an account having negative history, or a phone number of the mobile device (e.g., 120 (FIG. 1)) that does not match the phone number associated with the account.

In some embodiments, the outputs of the business rules and/or one or more statistical modeling techniques can include additional information to explain the reason for the risk score, such as factors that were relevant to generating the risk score, raw data that was relevant in generating the risk score, the results of execution of one or more business rules that resulted in the risk score, the results of the machine algorithm that resulted in the risk score, or other information that resulted in the risk score, such as an identification of the portions of the device ownership information that were relevant to determining the risk score, the account ownership information, the device risk information, the account risk information, and/or the ownership correlation.

In some embodiments, the risk determination system (e.g., 170 (FIG. 1)), in generating the fraud risk level, can perform an out-of-band verification based on the fraud risk level. In some embodiments, the out-of-band verification can be performed only if the fraud risk level is medium risk. In other embodiments, the out-of-band verification can be performed if the fraud risk level is medium or high risk. In many embodiments, the out-of-band verification can involve contacting the user (e.g., 110) through a different channel of communication than the channel through which the provisioning request was initiated. For example, the user (e.g., 110) can be contacted by phone, email, text message, or another suitable method using contact information previously stored for the user at one or more of the mobile wallet provider (e.g., 130 (FIG. 1)), the mobile network operator (e.g., 140 (FIG. 1)), the token service provider (e.g., 150 (FIG. 1)), the financial institution (e.g., 160 (FIG. 1)), and/or the risk determination system (e.g., 170 (FIG. 1)) to determine that the user (e.g., 110) that initiated the provisioning request is the same person as the user is purported to be in the provisioning request.

In a number of embodiments, the risk determination system (e.g., 170 (FIG. 1)), in generating the fraud risk level, after performing the out-of-band verification, can update the fraud risk level based on the out-of-band verification. For example, if the out-of-band verification determines that the user is legitimate (e.g., not likely a fraudster), the fraud risk level can be updated to be lowered to low risk. If the out-of-band verification determines that the user is not legitimate, the fraud risk level can be updated to be raised to high risk.

In several embodiments, method 700 additionally can include a block 705 of receiving from the risk determination system a first response based on the fraud risk level. In many embodiments, the first response can be received directly from the risk determination system. In other embodiments, the first response can be received from the risk determination system through at least one of the financial institution that maintains the account, the token service provider that provides tokenization services for the account, or the mobile network operator that provides mobile network services for the mobile device. In many embodiments, the response can include a risk score, as explained above, and in some embodiments, can include one or more factors that indicate reasons for the risk score.

In a number of embodiments, method 700 further can include a block 706 of determining whether to proceed with the provisioning of the account to the mobile wallet or to perform an additional verification based at least in part on the first response received from the risk determination system. In many embodiments, if the fraud risk level is low, the determination can be made to proceed with the provisioning of the account to the mobile wallet; if the fraud risk level is medium, the determination can be made to proceed with performing the additional verification; and if the fraud risk level is high, the determination can be made to block the provisioning request. In some embodiments, the determination cab be made to perform the additional verification after receiving a certain type of response, such as a medium fraud risk level response, such as if the out-of-band verification was not performed by the risk determination system (e.g., 170 (FIG. 1)).

In several embodiments, method 700 optionally can include a block 707 of performing the additional verification based at least in part on the response received from the risk determination system. For example, block 707 can be performed when block 706 determines that to perform the additional verification. In some embodiments, block 706 can include block 707. In many embodiments, the additional verification can be similar or identical to the out-of-band verification procedure that can be performed by the risk determination system (e.g., 170 (FIG. 1)). For example, the additional verification can involve contacting the user (e.g., 110) through a different channel of communication than the channel through which the provisioning request was initiated. For example, the user (e.g., 110) can be contacted by phone, email, text message, or another suitable method using contact information previously stored for the user at one or more of mobile wallet provider 130 (FIG. 1), mobile network operator 140 (FIG. 1), token service provider 150 (FIG. 1), financial institution 160 (FIG. 1), and/or risk determination system 170 (FIG. 1) to determine that the user (e.g., 110) that initiated the provisioning request is the same person as the user is purported to be in the provisioning request.

In a number of embodiments, method 700 further optionally can include a block 708 of performing the provisioning of the account to the mobile wallet. In many embodiments, the provisioning of the account to the mobile wallet can be performed when the fraud risk level is determined to be below a predetermined threshold. For example, the provisioning can proceed if the fraud risk level is determined to be low and below the predetermined threshold of medium risk. In other embodiments, other suitable predetermined thresholds can be used. In many embodiments, provisioning the account to the mobile wallet can include authorizing use of the account with the mobile wallet, such as storing information that the account has now been authorized for use in mobile wallet transactions, and can receive token that are linked to the account. In many embodiments, provisioning the account can involve communicating with the token service provider (e.g., 150 (FIG. 1)) and/or receiving one or more tokens that are linked to the account.

In several embodiments, method 700 additionally can include a block 709 of sending a second response to the mobile wallet in response to the request to perform the provisioning of the account to the mobile wallet. In several embodiments, the mobile wallet can update a user interface display on the mobile device based on the second response to display information about the provisioning of the account to the mobile wallet. The user interface display on the mobile device can be similar or identical to user interface display 600 (FIG. 6). In a number of embodiments, the second response can include an indication of whether the provisioning of the account to the mobile wallet was successful. In many embodiments, the second response can include one or more tokens that are linked to the account, which the mobile wallet can use in one or more transactions using the account in the mobile wallet.

Figure 8:
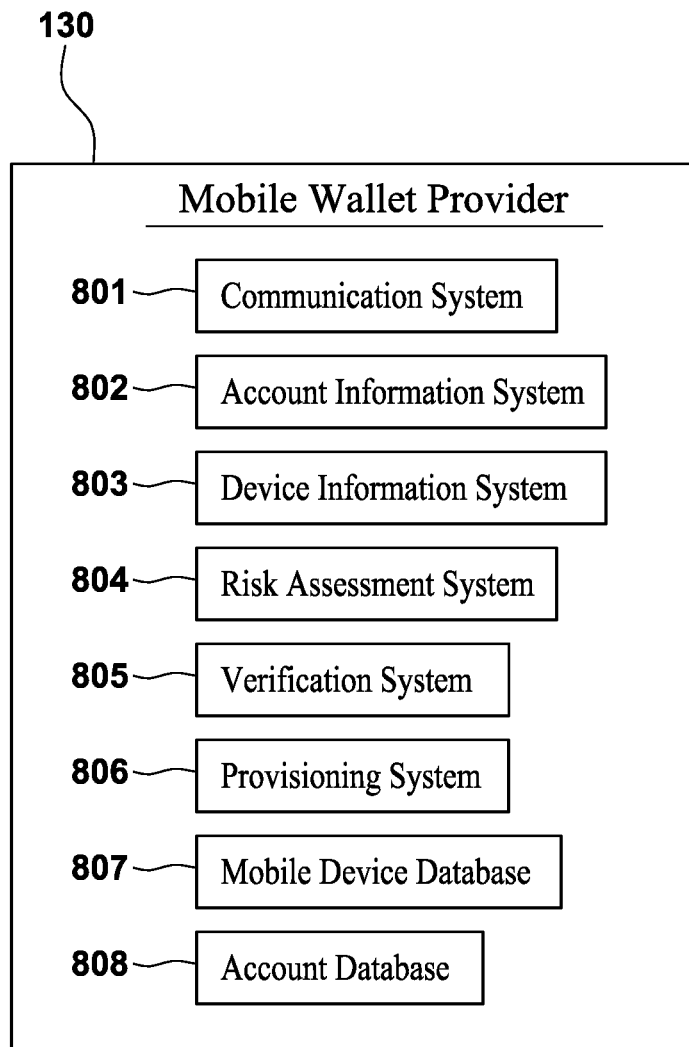
FIG. 8 illustrates a block diagram the mobile wallet provider of FIG. 1 that can be employed for facilitating a risk determination as part of provisioning an account to the mobile wallet of FIG. 1, according to an embodiment.

Turning ahead in the drawings, FIG. 8 illustrates a block diagram of mobile wallet provider 130 that can be employed for facilitating a risk determination as part of provisioning an account to a mobile wallet (e.g., 121 (FIG. 1)), according to an embodiment. Mobile wallet provider 130 is merely exemplary, and embodiments of the mobile wallet provider are not limited to the embodiments presented herein. The mobile wallet provider can be employed in many different embodiments or examples not specifically depicted or described herein. In some embodiments, certain elements or modules of mobile wallet provider 130, as shown in FIG. 8, can perform various procedures, processes, and/or activities. In other embodiments, the procedures, processes, and/or activities can be performed by other suitable elements or modules of mobile wallet provider 130.

In several embodiments, mobile wallet provider 130 can include a communication system 801, an account information system 802, a device information system 803, a risk assessment system 804, a verification system 805, a provisioning system 806, a mobile device database 807, and/or an account database 808.

In many embodiments, communication system 801 can at least partially perform block 701 (FIG. 7) of receiving a request from a mobile wallet operating on a mobile device to perform a provisioning of an account to the mobile wallet, block 704 (FIG. 7) of sending an inquiry to a risk determination system to authenticate the provisioning of the account to the mobile wallet, block 705 (FIG. 7) of receiving from the risk determination system a first response based on the fraud risk level, and/or block 709 (FIG. 7) of sending a second response to the mobile wallet in response to the request to perform the provisioning of the account to the mobile wallet.

In a number of embodiments, account information system 802 can at least partially perform block 702 (FIG. 7) of generating account information about the account.

In several embodiments, device information system 803 can at least partially perform block 703 (FIG. 7) of generating device information about the mobile device.

In a number of embodiments, risk assessment system 804 can at least partially perform block 706 (FIG. 7) of determining whether to proceed with the provisioning of the account to the mobile wallet or to perform an additional verification based at least in part on the first response received from the risk determination system.

In several embodiments, verification system 805 can at least partially perform block 707 (FIG. 7) of performing the additional verification based at least in part on the response received from the risk determination system.

In a number of embodiments, provisioning system 806 can at least partially perform block 708 (FIG. 7) of performing the provisioning of the account to the mobile wallet.

In several embodiments, mobile device database 807 can information about mobile devices (e.g., mobile device 120 (FIG. 1)), such as the information generated in block 703 (FIG. 7).

In a number of embodiments, account database 808 can include account information, such as the information generated in block 702 (FIG. 7).

Figure 9:
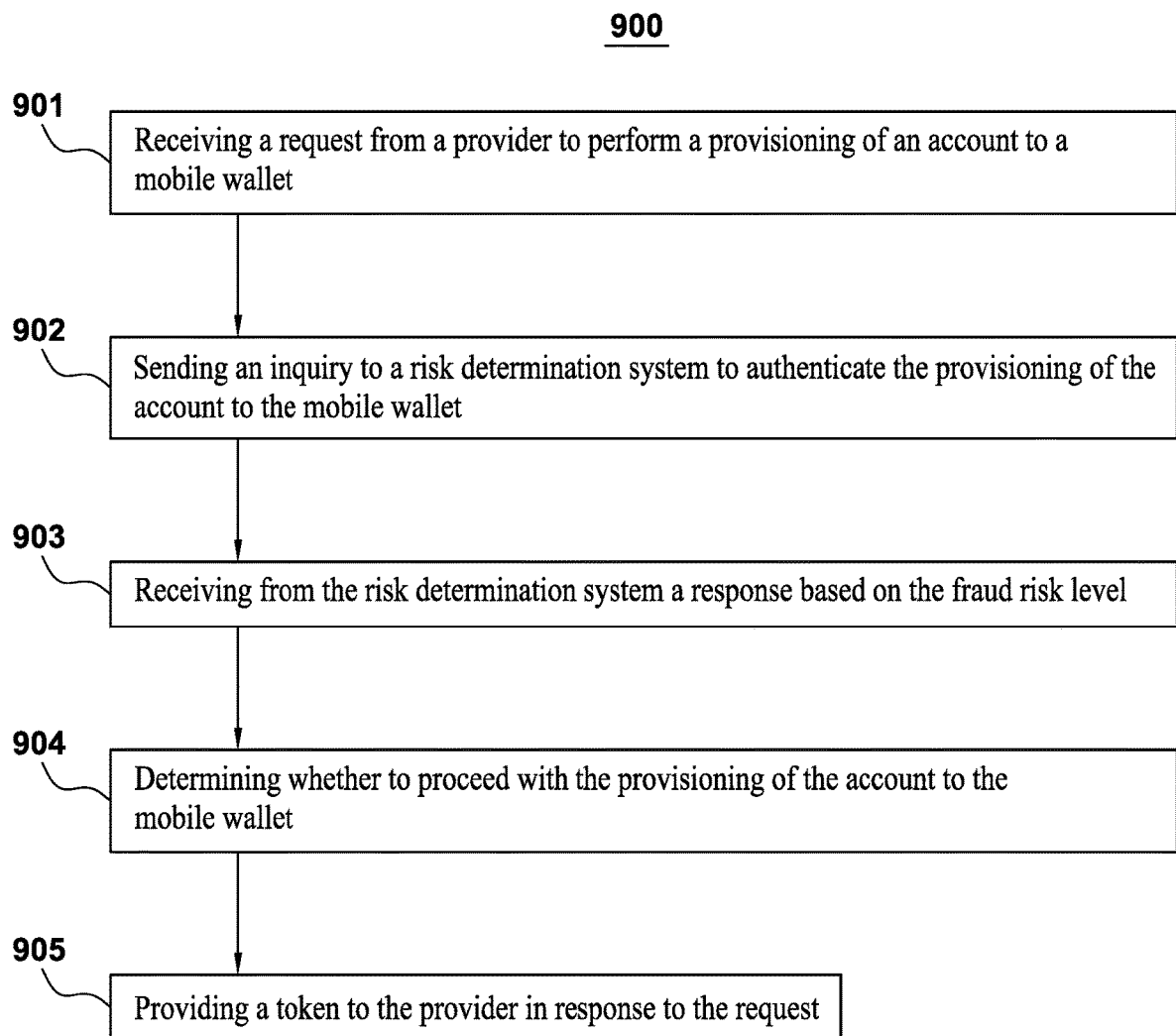
FIG. 9 illustrates a flow chart for a method, according to an embodiment.

Turning ahead in the drawings, FIG. 9 illustrates a flow chart for a method 900.

In some embodiments, method 900 can be a method of determining a risk level in provisioning an account to a mobile wallet. Method 900 is merely exemplary and is not limited to the embodiments presented herein. Method 900 can be employed in many different embodiments or examples not specifically depicted or described herein. In some embodiments, the procedures, the processes, and/or the activities of method 900 can be performed in the order presented. In other embodiments, the procedures, the processes, and/or the activities of method 900 can be performed in any suitable order. In still other embodiments, one or more of the procedures, the processes, and/or the activities of method 900 can be combined or skipped. In some embodiments, method 900 can be performed by token service provider 150 (FIG. 1).

Referring to FIG. 9, method 900 can include a block 901 of receiving a request from a provider to perform a provisioning of an account to a mobile wallet operating on a mobile device. The mobile wallet can be similar or identical to mobile wallet 121 (FIG. 1). The mobile device can be similar or identical to mobile device 120 (FIG. 1). In several embodiments, the account can be at least one of a demand deposit account, a debit card account, or a credit card account. In many embodiments, the provider can be at least one of a mobile wallet provider for the mobile wallet, a financial institution that maintains the account, or a mobile network operator that provides mobile network services for the mobile device. As an example, a user (e.g., user 110 (FIG. 1)) can attempt to provision an account (e.g., a credit card) to a mobile wallet (e.g., in a mobile device (e.g., mobile device 120 (FIG. 1)) of the user, such as by using user interface display 500 (FIG. 5). The provisioning request can be sent by the mobile wallet (e.g., 121 (FIG. 1)) from the mobile device (e.g., 120 (FIG. 1)) to the mobile wallet provider (e.g., 130 (FIG. 1)), and the mobile wallet provider can send the request to perform the provisioning, which can be received by the token service provider (e.g., 150 (FIG. 1)).

In a number of embodiments, method 900 also can include a block 902 of sending an inquiry to a risk determination system to authenticate the provisioning of the account to the mobile wallet. The risk determination system can be similar or identical to risk determination system 170 (FIG. 1). In many embodiments, the inquiry can include account information about the account and device information about the mobile device.

In many embodiments, the account information can include information about the account that the user (e.g., 110 (FIG. 1)) is attempting to provision. For example, when the user (e.g., 110 (FIG. 1)) attempts to add an account, such as a credit card to the mobile wallet (e.g., 120 (FIG. 1)), the user (e.g., 110 (FIG. 1)) can be asked to input account information, such as in the input fields (e.g., 510, 520, 530) in FIG. 5, and this account information can be sent by the mobile wallet (e.g., 121 (FIG. 1)) from the mobile device (e.g., 120 (FIG. 1)) to the mobile wallet provider (e.g., 130 (FIG. 1)). In many embodiments, mobile wallet provider (e.g., 130 (FIG. 1) can send the account information received from the mobile wallet (e.g., 121 (FIG. 1)) and/or supplemented by mobile wallet provider 130 FIG. 1)) to token service provider (e.g., 150 (FIG. 1)), and the token service provider (e.g., 150 (FIG. 1)) can receive at least some of the account information in the request received in block 901. In some embodiments, additional account information can be determined by the token service provider (e.g., 150 (FIG. 1)) using information already stored in the token service provider (e.g., 150 (FIG. 1)), based on the account information received in the request received in block 701 For example, the account information can include the primary account number (PAN); the first, middle and last name of the account owner; the street address, city, state, and ZIP code of the residence of the account owner; and/or other information of the account owner, such as email address, phone number, or other personally identifiable information (PII), such as driver's license number, birth date, birthplace, social security number, etc.

In various embodiments, the device information can include information about the mobile device (e.g., 120 (FIG. 1)) of the user (e.g., 110 (FIG. 1)), information about the mobile wallet (e.g., 121 (FIG. 1)) on the mobile device (e.g., 120 (FIG. 1)), and/or information about the provisioning request on the mobile wallet (e.g., 121 (FIG. 1)). In a number of embodiments, at least some of this information can be received by the token service provider (e.g., 150 (FIG. 1)) in block 901 from the mobile wallet provider (e.g., 130 (FIG. 1)). In many embodiments, the device information can be received by the mobile wallet provider (e.g., 130 (FIG. 1)) from the mobile device (e.g., 120 (FIG. 1)) and/or the mobile wallet (e.g., 121 (FIG. 1)). For example, the device information can include the information about the identity of the mobile wallet provider (e.g., 130 (FIG. 1)); a wallet provider identifier (ID), which can be hashed in many embodiments; a secure element ID, if the mobile device (e.g., 120 (FIG. 1)) includes a secure element (e.g., a tamper-resistant security/cryptographic chip/processing element); a device ID; a SIM (subscriber identity mobile) ID; the full phone number of the mobile device (e.g., 120 (FIG. 1)); device fingerprint (e.g., information about the operating system and software running on the mobile device (e.g., 120 (FIG. 1)), and/or unique identifiers on the mobile device (e.g., 120 (FIG. 1)), such as the MAC (media access control) address or other unique serial numbers assigned to the mobile device); the date and time (e.g., timestamp) of the provisioning request; information about the type of provisioning record/request (e.g., adding an account, changing an account, deleting an account, etc.); and/or other suitable information.

In some embodiments, the risk determination system can generate a fraud risk level by applying business rules and one or more statistical modeling techniques to at least a portion of: (a) an ownership correlation between device ownership information for the mobile device and account ownership information for the account, (b) device risk information associated with the mobile device, and (c) account risk information associated with the account.

In various embodiments, the device ownership information can include information about the actual owner of the mobile device (e.g., 120 (FIG. 1). In many embodiments, the device ownership information can be determined by the risk determination system based on at least one of: (a) at least a portion of the device information, or (b) the risk determination system querying at least one of: (i) a mobile device identifier database in the risk determination system, or (ii) a mobile network operator that provides mobile network services for the mobile device.

In several embodiments, the account ownership information can include information about the actual owner of the account. In some embodiments, the account ownership information can be determined by the risk determination system based on at least one of: (1) at least a portion of the account information, or (b) the risk determination system querying at least one of: (i) an account owner elements database in the risk determination system, or (ii) a financial institution that maintains the account.

In some embodiments, the ownership correlation can be based on a determination of whether the actual owner of the mobile device (e.g., 120 (FIG. 1)) is the same as the actual owner of the account. For example, if the actual owner of the mobile device (e.g., 120 (FIG. 1)) is the same as the actual owner of the account, there can be an ownership correlation, but if the actual owner of the mobile device (e.g., 120 (FIG. 1)) is not the same as the actual owner of the account, then there can be a lack of ownership correlation. Sometimes, the account ownership information and/or the device ownership information can involve a family plan or corporate plan for a mobile device (e.g., 120 (FIG. 1)), or authorized users for an account (e.g., a business account with authorized users), and the ownership correlation can determine whether there is a correlation between authorized individuals for the account and the mobile device (e.g., 120 (FIG. 1)). In such cases, even though the actual owner of the mobile device (e.g., 120 (FIG. 1)) is not the same as the actual owner of the account, then there can be a lack of ownership correlation, there can be an ownership correlation, based on the family plan or corporate plan for the mobile device (e.g., 120 (FIG. 1)), and/or based on the authorized users for an account (e.g., a business account with authorized users).

In many embodiments, the device risk information can include information about known risks or historical negative events that involved the mobile device (e.g., 120 (FIG. 1)). In a number of embodiments, the device risk information can be determined by the risk determination system querying one or more databases in the risk determination system that aggregate negative mobile device events.

In several embodiments, the account risk information can include information about known risks or historical negative events that involved the account and/or the account owner. In some embodiments, the account risk information can be determined by the risk determination system querying one or more databases in the risk determination system that aggregate negative account events from multiple financial institutions.

In various embodiments, the business rules can define one or more fraud risks based on at least a portion of the ownership correlation, the device risk information, and the account risk information. For example, a business rule can be that the owner (or authorized user) of the mobile device (e.g., 120 (FIG. 1)) must be the same as the owner (or authorized user) of the account. The ownership correlation can be used to determine whether this business rule is satisfied. In some embodiments, other or additional business rules can be used. The business rules can define one or more fraud risks based on at least a portion of the ownership correlation, the device risk information, and the account risk information. For example, in many embodiments, the business rules can be rules provided and/or imposed by one or more of the businesses involved with the provisioning, such as mobile wallet provider 130 (FIG. 1), mobile network operator 140 (FIG. 1), token service provider 150 (FIG. 1), and/or financial institution 160 (FIG. 1). In other embodiments, the business rules can be developed for the risk determination system (e.g., 170 (FIG. 1)), and can be based on the knowledge and experience of the owners and/or operators of the risk determination system (e.g., 170 (FIG. 1)). A further example of a business rule can be, "if the ownership of the mobile device has changed in the last 3 months, then flag the provisioning request for further investigation." Yet another example of a business rule can "if the account ownership is less than 3 months old, then return all the negative information related to the account owner in the response."

In some embodiments, the one or more one or more statistical modeling techniques can include logistic regression. In many embodiments, machine algorithms can identify patterns that indicate likely fraud, and use those patterns to detect when a provisioning request likely is fraudulent. For example, the machine algorithms can "learn" that, when the user (e.g., 110 (FIG. 1)) changes the home address on the account, but the home address information known to the mobile network operator (e.g., 140 (FIG. 1)) does not change, then there is an 85% chance of fraud. Accordingly, the machine algorithm can flag the provisioning request if those parameters are met. The machine algorithms can change over time as the machine "learns" more and more. In some embodiments, the machine algorithms can include statistical modeling techniques, such as logistic regression. In the same or other embodiments, the machine algorithms can include machine learning algorithms, such as clustering, neural networks, or other suitable machine learning algorithms.

In many embodiments, the business rules and/or the one or more statistical modeling techniques can use various pieces of information as inputs, such as the ownership correlation, the device risk information, the account risk information, and/or other information obtained by or determined by the risk determination system (e.g., 170 (FIG. 1)). Examples of additional information that can be used by the risk determination system (e.g., 170 (FIG. 1)) can include information about the mobile device (e.g., 120 (FIG. 1)), such as account status (active, shut-down, canceled, etc.); if the mobile device (e.g., 120 (FIG. 1)) is rooted or jailbroken; changes to the mobile device (e.g., 120 (FIG. 1)), such as a change of the mobile network operator (e.g., 140 (FIG. 1)) that is associated with the mobile device (e.g., 120 (FIG. 1)), a change of ownership, a change of SIM cards, etc.; data from the mobile device (e.g., 120 (FIG. 1)), such as device information (e.g., applications on the device, data used, device fingerprint, etc.) collected by collector software in the mobile wallet (e.g., 121 (FIG. 1)); data from the mobile network operator (e.g., 140 (FIG. 1)) about the user (e.g., 110 (FIG. 1)), such as CRM (customer relationship management data), including name, address, status of the device, if the device has been ported (i.e., the same phone number moved to a new mobile device (e.g., 120 (FIG. 1)), etc.; the device information and account information included in the inquiry; information obtained from the mobile wallet provider (e.g., 130 (FIG. 1)), the mobile network operator (e.g., 140 (FIG. 1)), the token service provider (e.g., 150 (FIG. 1)), and/or the financial institution (e.g., 160 (FIG. 1)); information available in databases (e.g., 406-409 (FIG. 4)) within the risk determination system (e.g., 170 (FIGS. 1 and 4)); and/or other suitable information.

In a number of embodiments, the business rules and/or one or more statistical modeling techniques can be applied to some, but not all of the information listed above. In other embodiments, all of the information listed above can be used as inputs to the business rules and/or one or more statistical modeling techniques. In some embodiments, the business rules and/or one or more statistical modeling techniques can be performed in a step-wise fashion on various different inputs. In one example, the business rules can be used on certain types of information and the statistical modeling techniques can be used on different types of information. In many embodiments, the inputs can be weighted in the machine algorithms, such that certain pieces of information have a greater effect on the output than other pieces of information. In some embodiments, the risk determination performed by the risk determination system (e.g., 170 (FIG. 1)) can depend on who the provider is and at what point of the provisioning process the provider sends the inquiry to the risk determination system (e.g., 170 (FIG. 1)).

In several embodiments, the business rules and/or one or more statistical modeling techniques can generate as output one or more pieces of information, which can, in some embodiments, include a fraud risk level. In many embodiments, the fraud risk level can be represented by a risk score, such as numeric score, an alphabetical score, a color score (e.g., green for low risk, yellow for medium risk, or red for high risk), or another suitable type of score. In some embodiments, a low fraud risk level can indicate that no negative or suspicious events were associated with the account, the mobile device (e.g., 120 (FIG. 1)), and/or the provisioning request. In several embodiments, a medium fraud risk level can indicate that there are some negative or suspicious events that were associated with the account, the mobile device (e.g., 120 (FIG. 1)), and/or the provisioning request. In many embodiments, a high risk level can indicate that there are major risks associated with the account, the mobile device (e.g., 120 (FIG. 1)), and/or the provisioning request, such as a credit card being compromised, an account having negative history, or a phone number of the mobile device (e.g., 120 (FIG. 1)) that does not match the phone number associated with the account.

In some embodiments, the outputs of the business rules and/or one or more statistical modeling techniques can include additional information to explain the reason for the risk score, such as factors that were relevant to generating the risk score, raw data that was relevant in generating the risk score, the results of execution of one or more business rules that resulted in the risk score, the results of the machine algorithm that resulted in the risk score, or other information that resulted in the risk score, such as an identification of the portions of the device ownership information that were relevant to determining the risk score, the account ownership information, the device risk information, the account risk information, and/or the ownership correlation.

In some embodiments, the risk determination system (e.g., 170 (FIG. 1)), in generating the fraud risk level, can perform an out-of-band verification based on the fraud risk level. In some embodiments, the out-of-band verification can be performed only if the fraud risk level is medium risk. In other embodiments, the out-of-band verification can be performed if the fraud risk level is medium or high risk. In many embodiments, the out-of-band verification can involve contacting the user (e.g., 110) through a different channel of communication than the channel through which the provisioning request was initiated. For example, the user (e.g., 110) can be contacted by phone, email, text message, or another suitable method using contact information previously stored for the user at one or more of the mobile wallet provider (e.g., 130 (FIG. 1)), the mobile network operator (e.g., 140 (FIG. 1)), the token service provider (e.g., 150 (FIG. 1)), the financial institution (e.g., 160 (FIG. 1)), and/or the risk determination system (e.g., 170 (FIG. 1)) to determine that the user (e.g., 110) that initiated the provisioning request is the same person as the user is purported to be in the provisioning request.

In a number of embodiments, the risk determination system (e.g., 170 (FIG. 1)), in generating the fraud risk level, after performing the out-of-band verification, can update the fraud risk level based on the out-of-band verification. For example, if the out-of-band verification determines that the user is legitimate (e.g., not likely a fraudster), the fraud risk level can be updated to be lowered to low risk. If the out-of-band verification determines that the user is not legitimate, the fraud risk level can be updated to be raised to high risk.

In several embodiments, method 900 additionally can include a block 903 of receiving from the risk determination system a response based on the fraud risk level. In many embodiments, the first response can be received directly from the risk determination system. In other embodiments, the first response can be received from the risk determination system through at least one of the financial institution that maintains the account or the mobile network operator that provides mobile network services for the mobile device. In many embodiments, the response can include a risk score, as explained above, and in some embodiments, can include one or more factors that indicate reasons for the risk score.

In a number of embodiments, method 900 further can include a block 904 of determining whether to proceed with the provisioning of the account to the mobile wallet based at least in part on the response received from the risk determination system. In many embodiments, if the fraud risk level is low, the determination can be made to proceed with the provisioning of the account to the mobile wallet; if the fraud risk level is medium, the determination can be made to proceed with performing the additional verification; and if the fraud risk level is high, the determination can be made to block the provisioning request. In some embodiments, the determination cab be made to perform the additional verification after receiving a certain type of response, such as a medium fraud risk level response, such as if the out-of-band verification was not performed by the risk determination system (e.g., 170 (FIG. 1)).

In several embodiments, method 900 additionally can include a block 905 of providing a token to the provider in response to the request to perform the provisioning of the account to the mobile wallet when the fraud risk level is below a predetermined threshold. For example, the provisioning can proceed if the fraud risk level is determined to be low and below the predetermined threshold of medium risk. In other embodiments, other suitable predetermined thresholds can be used. In several embodiments, when the fraud risk level is below a predetermined threshold, the token can be generated, such as by using conventional methods. In various embodiments, the token can be linked to the account within the token service provider (e.g., 150 (FIG. 1)), as described above.

In many embodiments, the provider can send to the mobile device information about the provisioning of the account to the mobile wallet, and the mobile wallet can update a user interface display on the mobile device based on the information about the provisioning of the account to the mobile wallet. The user interface display on the mobile device can be similar or identical to user interface display 600 (FIG. 6). For example, the provider can send information about the outcome of the provisioning request, and the mobile wallet can display the outcome of the provisioning attempt in user interface display 600 (FIG. 6), such as whether or not the provisioning request was successful. In many embodiments, such as in certain cases when the provisioning request was successful, the mobile wallet can receive one or more tokens that are linked to the account, which the mobile wallet can then use in one or more transactions using the account in the mobile wallet.

Figure 10:
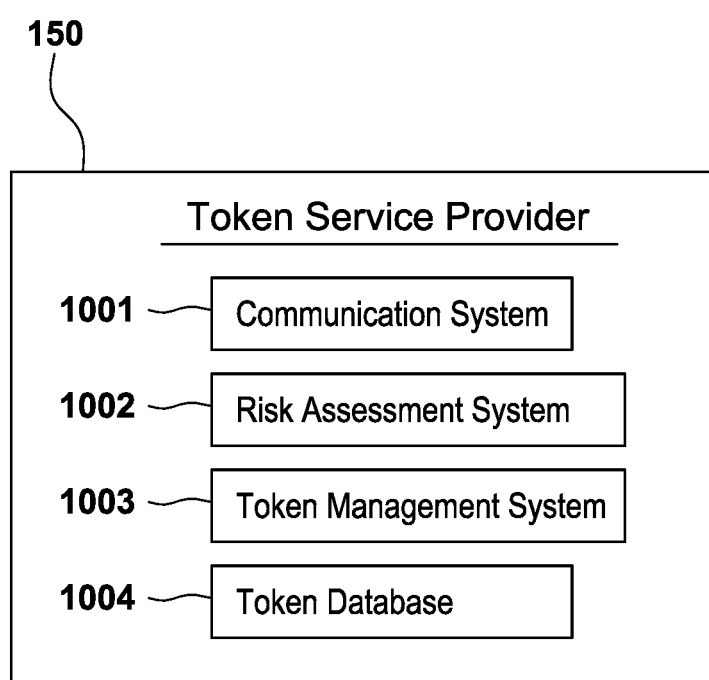
FIG. 10 illustrates a block diagram of the token service provider of FIG. 1 that can be employed for facilitating a risk determination as part of provisioning an account to the mobile wallet of FIG. 1, according to an embodiment.

Turning ahead in the drawings, FIG. 10 illustrates a block diagram of token service provider 150 that can be employed for facilitating a risk determination as part of provisioning an account to a mobile wallet (e.g., 121 (FIG. 1)), according to an embodiment. Token service provider 150 is merely exemplary, and embodiments of the token service provider are not limited to the embodiments presented herein. The token service provider can be employed in many different embodiments or examples not specifically depicted or described herein. In some embodiments, certain elements or modules of token service provider 150, as shown in FIG. 10, can perform various procedures, processes, and/or activities. In other embodiments, the procedures, processes, and/or activities can be performed by other suitable elements or modules of token service provider 150.

In several embodiments, token service provider 150 can include a communication system 1001, a risk assessment system 1002, a token management system 1003, and/or a token database 1004.

In many embodiments, communication system 1001 can at least partially perform block 901 (FIG. 9) of receiving a request from a provider to perform a provisioning of an account to a mobile wallet operating on a mobile device, block 902 (FIG. 9) of sending an inquiry to a risk determination system to authenticate the provisioning of the account to the mobile wallet, block 903 (FIG. 9) of receiving from the risk determination system a response based on the fraud risk level, and/or block 905 (FIG. 9) of providing a token to the provider in response to the request to perform the provisioning of the account to the mobile wallet when the fraud risk level is below a predetermined threshold.

In a number of embodiments, risk assessment system 1002 can at least partially perform block 904 (FIG. 9) of determining whether to proceed with the provisioning of the account to the mobile wallet based at least in part on the response received from the risk determination system.

In several embodiments, token management system 1003 can at least partially perform block 905 (FIG. 9) of providing a token to the provider in response to the request to perform the provisioning of the account to the mobile wallet when the fraud risk level is below a predetermined threshold.

In a number of embodiments, token database 1004 can store the tokens generated and/or provided by token service provider 150, which can be used by token management system 1003.

Figure 12:
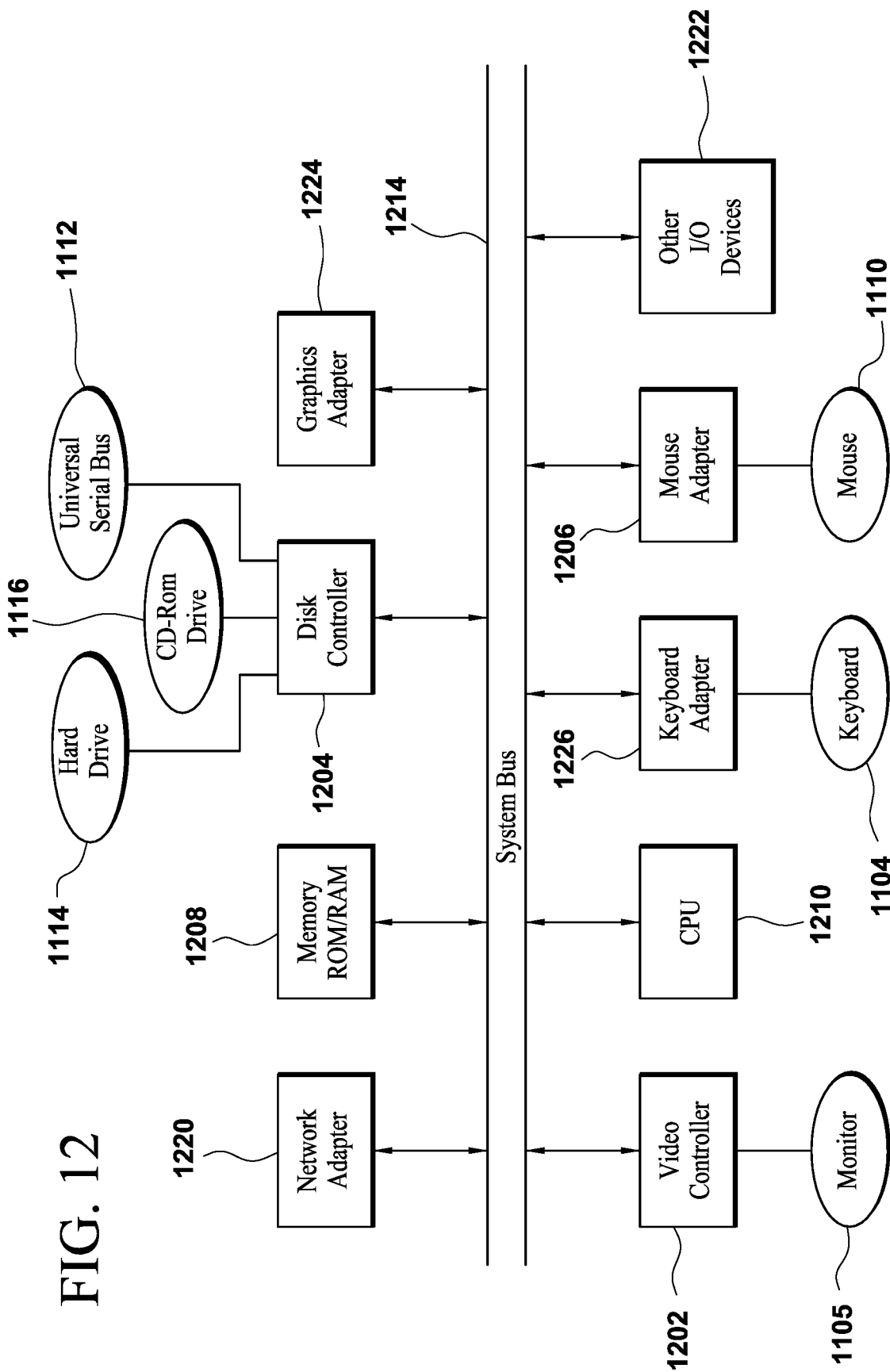
FIG. 12 illustrates a representative block diagram of an example of elements included in circuit boards inside a chassis of the computer of FIG. 12.

Turning ahead in the drawings, FIG. 11 illustrates a computer system 1100, all of which or a portion of which can be suitable for implementing an embodiment of at least a portion of mobile device 120 (FIG. 1), mobile wallet provider 130 (FIGS. 1 and 8), mobile network operator 140 (FIG. 1), token service provider 150 (FIGS. 1 and 10), financial institution 160 (FIG. 1), risk determination system 170 (FIGS. 1 and 4), method 200 (FIG. 2), block 202 (FIG. 3), method 700 (FIG. 7), and/or method 900 (FIG. 9). Computer system 1100 includes a chassis 1102 containing one or more circuit boards (not shown), a USB (universal serial bus) port 1112, a Compact Disc Read-Only Memory (CD-ROM) and/or Digital Video Disc (DVD) drive 1116, and a hard drive 1114. A representative block diagram of the elements included on the circuit boards inside chassis 1102 is shown in FIG. 12. A central processing unit (CPU) 1210 in FIG. 12 is coupled to a system bus 1214 in FIG. 12. In various embodiments, the architecture of CPU 1210 can be compliant with any of a variety of commercially distributed architecture families.

Continuing with FIG. 12, system bus 1214 also is coupled to memory 1208 that includes both read only memory (ROM) and random access memory (RAM). Non-volatile portions of memory storage unit 1208 or the ROM can be encoded with a boot code sequence suitable for restoring computer system 1100 (FIG. 11) to a functional state after a system reset. In addition, memory 1208 can include microcode such as a Basic Input-Output System (BIOS). In some examples, the one or more memory storage units of the various embodiments disclosed herein can comprise memory storage unit 1208, a USB-equipped electronic device, such as, an external memory storage unit (not shown) coupled to universal serial bus (USB) port 1112 (FIGS. 11-12), hard drive 1114 (FIGS. 11-12), and/or CD-ROM or DVD drive 1116 (FIGS. 11-12). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 1210.

In the depicted embodiment of FIG. 12, various I/O devices such as a disk controller 1204, a graphics adapter 1224, a video controller 1202, a keyboard adapter 1226, a mouse adapter 1206, a network adapter 1220, and other I/O devices 1222 can be coupled to system bus 1214. Keyboard adapter 1226 and mouse adapter 1206 are coupled to a keyboard 1104 (FIGS. 11 and 12) and a mouse 1110 (FIGS. 11 and 12), respectively, of computer system 1100 (FIG. 11). While graphics adapter 1224 and video controller 1202 are indicated as distinct units in FIG. 12, video controller 1202 can be integrated into graphics adapter 1224, or vice versa in other embodiments. Video controller 1202 is suitable for refreshing a monitor 1106 (FIGS. 11 and 12) to display images on a screen 1108 (FIG. 11) of computer system 1100 (FIG. 11). Disk controller 1204 can control hard drive 1114 (FIGS. 11 and 12), USB port 1112 (FIGS. 11 and 12), and CD-ROM or DVD drive 1116 (FIGS. 11 and 12). In other embodiments, distinct units can be used to control each of these devices separately.

In some embodiments, network adapter 1220 can comprise and/or be implemented as a WNIC (wireless network interface controller) card (not shown) plugged or coupled to an expansion port (not shown) in computer system 1100 (FIG. 11). In other embodiments, the WNIC card can be a wireless network card built into computer system 1100 (FIG. 11). A wireless network adapter can be built into computer system 1100 (FIG. 11) by having wireless communication capabilities integrated into the motherboard chipset (not shown), or implemented via one or more dedicated wireless communication chips (not shown), connected through a PCI (peripheral component interconnector) or a PCI express bus of computer system 1100 (FIG. 11) or USB port 1112 (FIG.

11). In other embodiments, network adapter 1220 can comprise and/or be implemented as a wired network interface controller card (not shown).

Although many other components of computer system 1100 (FIG. 11) are not shown, such components and their interconnection are well known to those of ordinary skill in the art. Accordingly, further details concerning the construction and composition of computer system 1100 and the circuit boards inside chassis 1102 (FIG. 11) need not be discussed herein.

When computer system 1100 in FIG. 1 is running, program instructions stored on a USB-equipped electronic device connected to USB port 1112, on a CD-ROM or DVD in CD-ROM and/or DVD drive 1116, on hard drive 1114, or in memory storage unit 1208 (FIG. 2) are executed by CPU 1210 (FIG. 2). A portion of the program instructions, stored on these devices, can be suitable for carrying out all or at least part of the techniques described herein. In various embodiments, computer system 1100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing system 1100, and can be executed by CPU 1210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 1100 is illustrated as a desktop computer in FIG. 11, there can be examples where computer system 1100 may take a different form factor while still having functional elements similar to those described for computer system 1100. In some embodiments, computer system 1100 may comprise a single computer, a single server, or a cluster or collection of computers or servers, or a cloud of computers or servers. Typically, a cluster or collection of servers can be used when the demand on computer system 1100 exceeds the reasonable capability of a single server or computer. In certain embodiments, computer system 1100 may comprise a portable computer, such as a laptop computer. In certain other embodiments, computer system 1100 may comprise a mobile device, such as a smartphone. In certain additional embodiments, computer system 1100 may comprise an embedded system.

Although authentication and fraud prevention in provisioning a mobile wallet has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-12 may be modified, and that the foregoing discussion of certain of these embodiments does not necessarily represent a complete description of all possible embodiments. For example, one or more of the procedures, processes, or activities of FIGS. 2-3, 7, and 9 may include different procedures, processes, and/or activities and be performed by many different modules, in many different orders. As another example, one or more of the procedures, processes, or activities of FIGS. 2-3, 7, and 9 may include one or more of the procedures, processes, or activities of another different one of FIGS. 2-3, 7, and 9. As yet another example, the systems within risk determination system 170 shown in FIG. 4, the systems within mobile wallet provider 130 shown in FIG. 8, and the systems within token service provider 150 shown in FIG. 10 can be interchanged in any suitable manner or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors in data communication through one or more networks with a risk determination system and a mobile device; and
   one or more non-transitory computer-readable media storing computing instructions configured to run on the one or more processors and perform:
   receiving, at a mobile wallet provider, a request from a mobile wallet operating on the mobile device to perform a provisioning of an account to the mobile wallet on the mobile device to setup one or more tokens for the account in the mobile wallet on the mobile device for use in secure financial transactions, wherein the request is received at the mobile wallet provider before the mobile device transmits any requests to process any of the secure financial transactions using the one or more tokens;
   generating, at the mobile wallet provider, account information about the account;
   generating, at the mobile wallet provider, device information about the mobile device;
   sending an inquiry from the mobile wallet provider to the risk determination system to authenticate the provisioning of the account to the mobile wallet on the mobile device, wherein the inquiry comprises the account information and the device information, wherein the inquiry causes the risk determination system to generate a fraud risk level of provisioning the account to the mobile wallet on the mobile device, wherein the fraud risk level is generated before the mobile device transmits any requests to process any of the secure financial transactions using the one or more tokens, wherein the fraud risk level is generated by performing a step-wise application of business rules and one or more statistical modeling techniques to at least a portion of: (a) an ownership correlation between device ownership information for the mobile device and account ownership information for the account, (b) device risk information associated with the mobile device, and (c) account risk information associated with the account, wherein the one or more statistical modeling techniques comprise one or more machine learning algorithms, and wherein the business rules define one or more fraud risks based on at least a portion of the ownership correlation, the device risk information, and the account risk information;

receiving, at the mobile wallet provider from the risk determination system, a first response to the inquiry, wherein the first response is based on the fraud risk level;

determining, at the mobile wallet provider, whether to proceed with the provisioning of the account to the mobile wallet on the mobile device or to perform an additional verification based at least in part on the first response received from the risk determination system; and sending a second response from the mobile wallet provider to the mobile wallet in response to the request to perform the provisioning of the account to the mobile wallet on the mobile device, to cause the mobile wallet to update a user interface display on the mobile device based on the second response to display information about the provisioning of the account to the mobile wallet on the mobile device, wherein the mobile wallet provider facilitates the provisioning of the account to the mobile wallet on the mobile device before the mobile device transmits any requests to process any of the secure financial transactions using the one or more tokens, wherein:
the device ownership information is determined by the risk determination system based on the risk determination system querying a mobile network operator that provides mobile network services for the mobile device; and the one or more statistical modeling techniques comprise logistic regression.

2. The system of claim 1, wherein the computing instructions are further configured to perform, at the mobile wallet provider, the provisioning of the account to the mobile wallet.

3. The system of claim 1, wherein the determining, at the mobile wallet provider, whether to proceed with the provisioning of the account to the mobile wallet on the mobile device or to perform the additional verification comprises performing, at the mobile wallet provider, the additional verification based at least in part on the first response received from the risk determination system.

4. The system of claim 1, wherein the second response comprises an indication of whether the provisioning of the account to the mobile wallet was successful.

5. The system of claim 1, wherein:
the device ownership information is further determined by the risk determination system based on at least one of: (a) at least a portion of the device information, or (b) the risk determination system querying a mobile device identifier database in the risk determination system;

the account ownership information is determined by the risk determination system based on at least one of: (a) at least a portion of the account information, or (b) the risk determination system querying at least one of: (i) an account owner elements database in the risk determination system, or (ii) a financial institution that maintains the account;

the device risk information is determined by the risk determination system querying one or more databases in the risk determination system that aggregate negative mobile device events; and the account risk information is determined by the risk determination system querying one or more databases in the risk determination system that aggregate negative account events from multiple financial institutions.

6. The system of claim 1, wherein the risk determination system, in generating the fraud risk level:
performs an out-of-band verification based on the fraud risk level; and updates the fraud risk level based on the out-of-band verification.

7. The system of claim 1, wherein the one or more statistical modeling techniques further comprise using the logistic regression to generate a percentage value representing the fraud risk level.

8. The system of claim 1, wherein the inquiry is sent from the mobile wallet provider to, and the first response is received at the mobile wallet provider from, the risk determination system through at least one of a financial institution that maintains the account, a token service provider that provides tokenization services for the account, or the mobile network operator.

9. The system of claim 1, wherein the account is at least one of a demand deposit account, a debit card account, or a credit card account.

10. The system of claim 1, wherein the first response comprises a risk score and one or more factors for the risk score.

11. A method being implemented via execution of computer instructions configured to run at one or more processors and configured to be stored at one or more non-computer-readable media, the method comprising:
receiving, at a mobile wallet provider comprising the one or more processors, a request from a mobile wallet operating on a mobile device to perform a provisioning of an account to the mobile wallet on the mobile device to setup one or more tokens for the account in the mobile wallet on the mobile device for use in secure financial transactions, wherein the request is received at the mobile wallet provider before the mobile device transmits any requests to process any of the secure financial transactions using the one or more tokens;

generating, at the mobile wallet provider, account information about the account;

generating, at the mobile wallet provider, device information about the mobile device;

sending an inquiry from the mobile wallet provider to a risk determination system to authenticate the provisioning of the account to the mobile wallet on the mobile device, wherein the inquiry comprises the account information and the device information, wherein the inquiry causes the risk determination system to generate a fraud risk level of provisioning the account to the mobile wallet on the mobile device, wherein the fraud risk level is generated before the mobile device transmits any requests to process any of the secure financial transactions using the one or more tokens, wherein the fraud risk level is generated by performing a step-wise application of business rules and one or more statistical modeling techniques to at least a portion of: (a) an ownership correlation between device ownership information for the mobile device and account ownership information for the account, (b) device risk information associated with the mobile device, and (c) account risk information associated with the account, wherein the one or more statistical modeling techniques comprise one or more machine learning algorithms, and wherein the business rules define one or more fraud risks based on at least a portion of the ownership correlation, the device risk information, and the account risk information;

receiving, at the mobile wallet provider from the risk determination system, a first response to the inquiry, wherein the first response is based on the fraud risk level;

determining, at the mobile wallet provider, whether to proceed with the provisioning of the account to the mobile wallet on the mobile device or to perform an additional verification based at least in part on the first response received from the risk determination system; and sending a second response from the mobile wallet provider to the mobile wallet in response to the request to perform the provisioning of the account to the mobile wallet, to cause the mobile wallet to update a user interface display on the mobile device based on the second response to display information about the provisioning of the account to the mobile wallet on the mobile device, wherein the mobile wallet provider facilitates the provisioning of the account to the mobile wallet on the mobile device before the mobile device transmits any requests to process any of the secure financial transactions using the one or more tokens, wherein:

the device ownership information is determined by the risk determination system based on the risk determination system querying a mobile network operator that provides mobile network services for the mobile device; and the one or more statistical modeling techniques comprise logistic regression.

12. The method of claim 11, further comprising:
performing, at the mobile wallet provider, the provisioning of the account to the mobile wallet.

13. The method of claim 11, wherein the determining, at the mobile wallet provider, whether to proceed with the provisioning of the account to the mobile wallet on the mobile device or to perform the additional verification comprises:
performing, at the mobile wallet provider, the additional verification based at least in part on the first response received from the risk determination system.

14. The method of claim 11, wherein the second response comprises an indication of whether the provisioning of the account to the mobile wallet was successful.

15. The method of claim 11, wherein:
the device ownership information is further determined by the risk determination system based on at least one of: (a) at least a portion of the device information, or (b) the risk determination system querying a mobile device identifier database in the risk determination system;
the account ownership information is determined by the risk determination system based on at least one of: (a) at least a portion of the account information, or (b) the risk determination system querying at least one of: (i) an account owner elements database in the risk determination system, or (ii) a financial institution that maintains the account;
the device risk information is determined by the risk determination system querying one or more databases in the risk determination system that aggregate negative mobile device events; and
the account risk information is determined by the risk determination system querying one or more databases in the risk determination system that aggregate negative account events from multiple financial institutions.

16. The method of claim 11, wherein the risk determination system, in generating the fraud risk level:
performs an out-of-band verification based on the fraud risk level; and
updates the fraud risk level based on the out-of-band verification.

17. The method of claim 11, wherein the one or more statistical modeling techniques further comprise using the logistic regression to generate a percentage value representing the fraud risk level.

18. The method of claim 11, wherein the inquiry is sent from the mobile wallet provider to, and the first response is received at the mobile wallet provider from, the risk determination system through at least one of a financial institution that maintains the account, a token service provider that provides tokenization services for the account, or the mobile network operator.

19. The method of claim 11, wherein the account is at least one of a demand deposit account, a debit card account, or a credit card account.

20. The method of claim 11, wherein the first response comprises a risk score and one or more factors for the risk score.

* * * * *